US008270492B2

(12) United States Patent
Ikeda et al.

(10) Patent No.: US 8,270,492 B2
(45) Date of Patent: Sep. 18, 2012

(54) MOVING PICTURE DECODING DEVICE

(75) Inventors: Hiroshi Ikeda, Osaka (JP); Kiyofumi Abe, Osaka (JP)

(73) Assignee: Panasonic Corporation, Osaka (JP)

( * ) Notice: Subject to any disclaimer, the term of this patent is extended or adjusted under 35 U.S.C. 154(b) by 941 days.

(21) Appl. No.: 12/300,243

(22) PCT Filed: Apr. 24, 2007

(86) PCT No.: PCT/JP2007/058826
§ 371 (c)(1),
(2), (4) Date: Nov. 10, 2008

(87) PCT Pub. No.: WO2007/132647
PCT Pub. Date: Nov. 22, 2007

(65) Prior Publication Data
US 2009/0168886 A1    Jul. 2, 2009

(30) Foreign Application Priority Data
May 12, 2006   (JP) .................................. 2006-133298

(51) Int. Cl.
H04N 7/12       (2006.01)
H04N 11/02      (2006.01)
(52) U.S. Cl. ................................. 375/240.16; 375/240.1
(58) Field of Classification Search ............. 375/240.16, 375/240.1
See application file for complete search history.

(56) References Cited

U.S. PATENT DOCUMENTS

| | | | |
|---|---|---|---|
| 5,974,184 A | 10/1999 | Eifrig et al. | |
| 6,091,767 A * | 7/2000 | Westerman | 375/240 |
| 6,600,835 B1 * | 7/2003 | Ishikawa | 382/236 |
| 6,625,667 B1 * | 9/2003 | Westerman | 710/5 |
| RE38,563 E | 8/2004 | Eifrig | |
| 7,233,621 B2 | 6/2007 | Jeon | |
| 7,688,893 B2 * | 3/2010 | Morimoto et al. | 375/240.12 |
| 7,822,116 B2 * | 10/2010 | Hinds | 375/240.03 |
| 2003/0206589 A1 | 11/2003 | Jeon | |
| 2004/0028282 A1 * | 2/2004 | Kato et al. | 382/236 |
| 2004/0052507 A1 | 3/2004 | Kondo et al. | |
| 2004/0057515 A1 * | 3/2004 | Koto et al. | 375/240.14 |

(Continued)

FOREIGN PATENT DOCUMENTS
JP            11-075191         3/1999
(Continued)

OTHER PUBLICATIONS

International Search Report issued Jul. 25, 2007 in the International (PCT) Application of which the present application in the U.S. National Stage.

(Continued)

*Primary Examiner* — Techane Gergiso
(74) *Attorney, Agent, or Firm* — Wenderoth, Lind & Ponack, L.L.P.

(57) ABSTRACT

Provided is a moving picture decoding device (100) including a direct mode availability judging unit (109), when a decoding target block should be decoded in a temporal direct mode, judging whether or not a reference picture for a decoded picture, which is in a vicinity of the decoding target block in terms of display time, is usable as a forward reference picture for the decoding target block. Further, the moving picture decoding device (100) includes a substitute process performing unit (110) decoding the decoding target block in the temporal direct mode using a picture other than the reference picture, or decoding the decoding target block in other encoding mode.

16 Claims, 44 Drawing Sheets

U.S. PATENT DOCUMENTS

| | | | |
|---|---|---|---|
| 2004/0086044 A1 | 5/2004 | Kondo et al. | |
| 2004/0091171 A1* | 5/2004 | Bone | 382/284 |
| 2004/0151248 A1* | 8/2004 | Kondo et al. | 375/240.16 |
| 2004/0190615 A1* | 9/2004 | Abe et al. | 375/240.15 |
| 2004/0247031 A1* | 12/2004 | Hagai et al. | 375/240.16 |
| 2005/0013365 A1* | 1/2005 | Mukerjee et al. | 375/240.16 |
| 2005/0141612 A1 | 6/2005 | Abe et al. | |
| 2005/0152452 A1* | 7/2005 | Suzuki | 375/240.16 |
| 2006/0120453 A1* | 6/2006 | Ikeda et al. | 375/240.16 |
| 2006/0245504 A1* | 11/2006 | Ogikubo et al. | 375/240.25 |
| 2007/0019724 A1* | 1/2007 | Tourapis et al. | 375/240.12 |
| 2007/0183499 A1* | 8/2007 | Kimata et al. | 375/240.16 |

FOREIGN PATENT DOCUMENTS

| | | |
|---|---|---|
| JP | 2003-333602 | 11/2003 |
| JP | 2004-088722 | 3/2004 |
| JP | 2004-129191 | 4/2004 |
| JP | 2004-208258 | 7/2004 |
| JP | 2004-215229 | 7/2004 |
| WO | 2004/008775 | 1/2004 |

OTHER PUBLICATIONS

International Preliminary Examination Report Nov. 3, 2008 in the International (PCT) Application of which the present application is the U.S. National Stage.

Xiangyang Ji, et al. "New Bi-prediction Techniques for B Pictures Coding", 2004 IEEE International Conference on Multimedia Expo, 2004. ICME '04. Jun. 27, 2004, vol. 1, p. 101-104.

International Standard ISO/IEC 14496-10 Information Technology—Coding of Audio-visual Objects—Part 10: Advanced Video Coding, Second Edition, Oct. 1, 2004, 8.4.2.3 Weighted Sample Prediction.

* cited by examiner

FIG. 6A

| Picture memory number | Reference attribute | Decoding number | Display number |
|---|---|---|---|
| 0 | Reference | 4 | T3 |
| 1 | Reference | 2 | T5 |
| 2 | Reference | 3 | T2 |

FIG. 6B

| Forward reference picture number | Picture memory number | Decoding number | Display number |
|---|---|---|---|
| 0 | 0 | 4 | T3 |
| 1 | 2 | 3 | T2 |
| 2 | 1 | 2 | T5 |

FIG. 10A

| Display number | Forward reference picture number |
|---|---|
| T1 | - |
| T2 | 1 |
| T3 | 0 |
| T4 | - |
| T5 | 2 |

FIG. 10B

| Decoding number | Forward reference picture number |
|---|---|
| 1 | - |
| 2 | 2 |
| 3 | 1 |
| 4 | 0 |

FIG. 10C

| Picture memory number | Decoding number | Forward reference picture number |
|---|---|---|
| 0 | 4 | 0 |
| 1 | 2 | 2 |
| 2 | 3 | 1 |

FIG. 12A

| Picture memory number | Reference attribute | Decoding number | Display number |
|---|---|---|---|
| 0 | Reference | 1 | T1 |
| 1 | Reference | 2 | T5 |
| 2 | Reference | 3 | T2 |
| 3 | Reference | 4 | T3 |

FIG. 12B

| Forward reference picture number | Picture memory number | Decoding number | Display number |
|---|---|---|---|
| 0 | 3 | 4 | T3 |

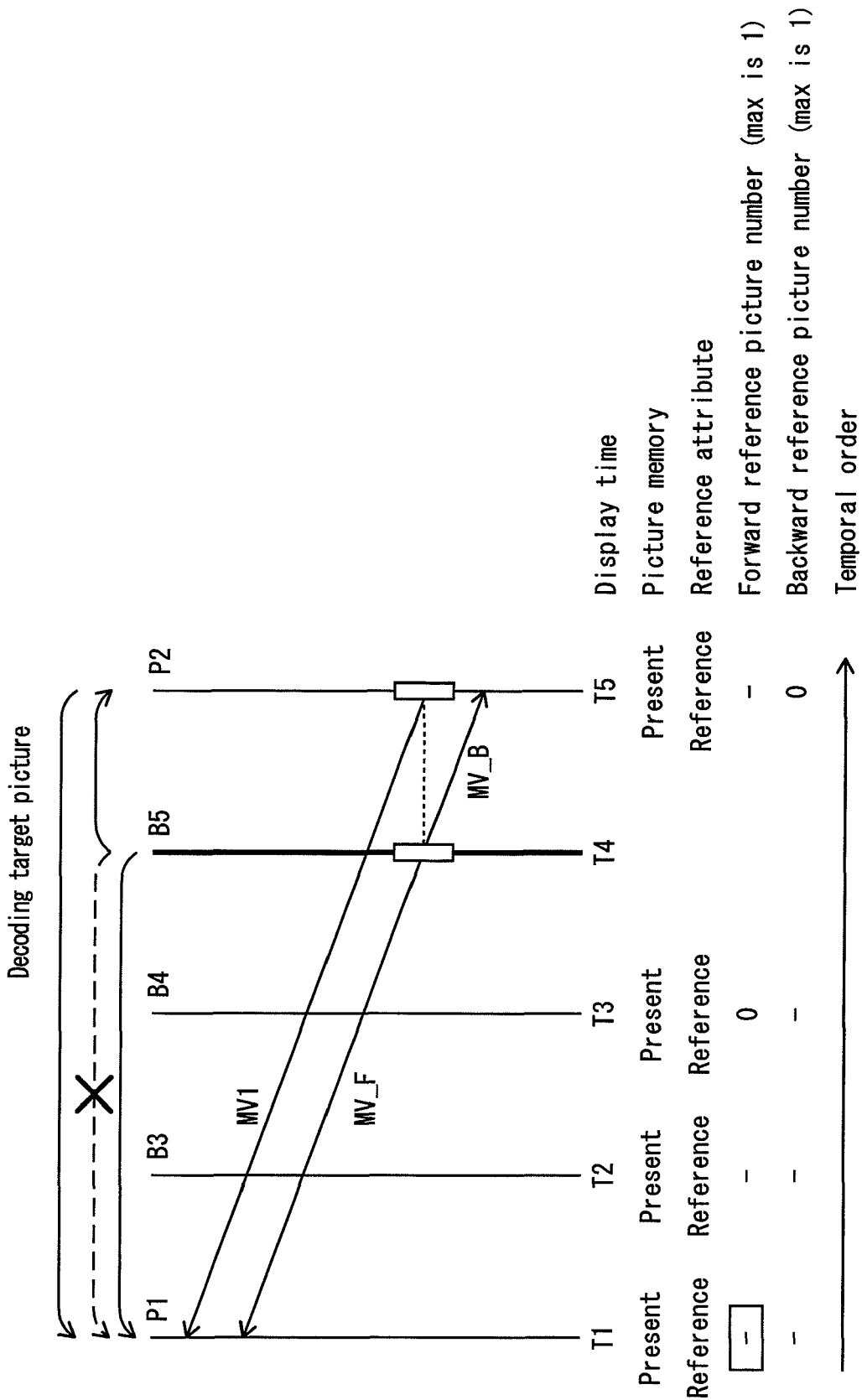

FIG. 14A

| Display number | Forward reference picture number |
|---|---|
| T1 | - |
| T2 | - |
| T3 | 0 |
| T4 | - |
| T5 | - |

FIG. 14B

| Decoding number | Forward reference picture number |
|---|---|
| 1 | - |
| 2 | - |
| 3 | - |
| 4 | 0 |

FIG. 14C

| Picture memory number | Decoding number | Forward reference picture number |
|---|---|---|
| 0 | - | - |
| 1 | - | - |
| 2 | - | - |
| 3 | 4 | 0 |

FIG. 32
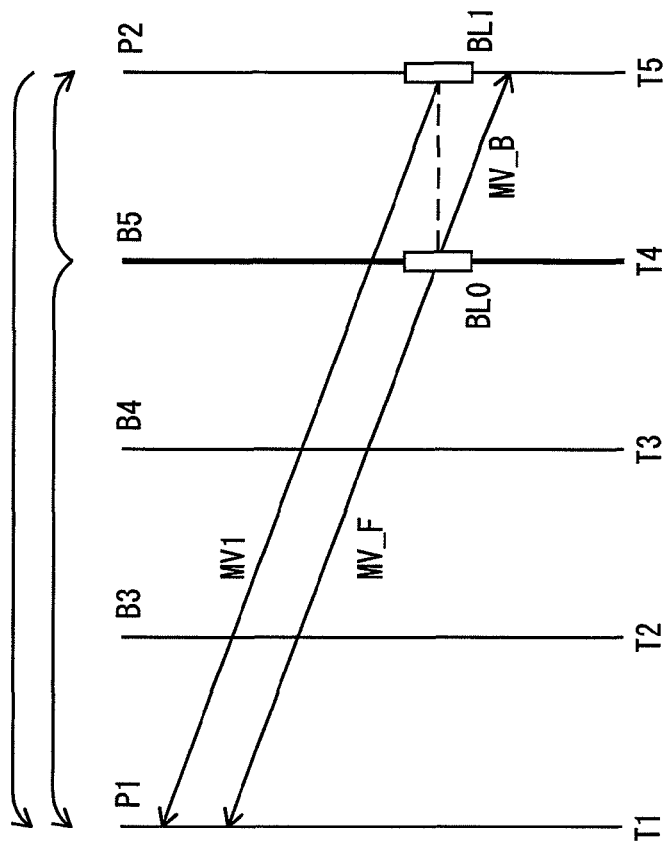
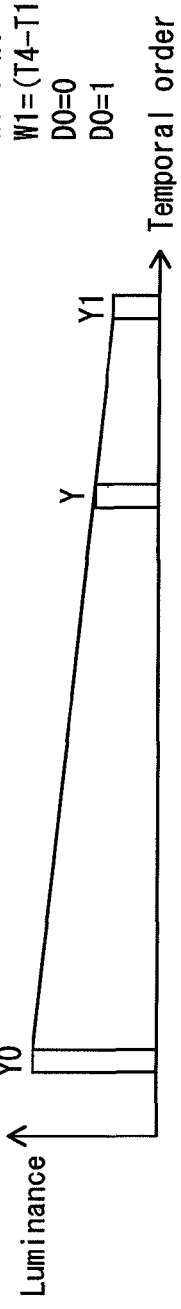

FIG. 34
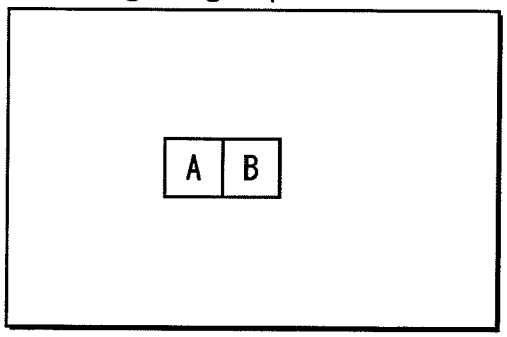
(A)
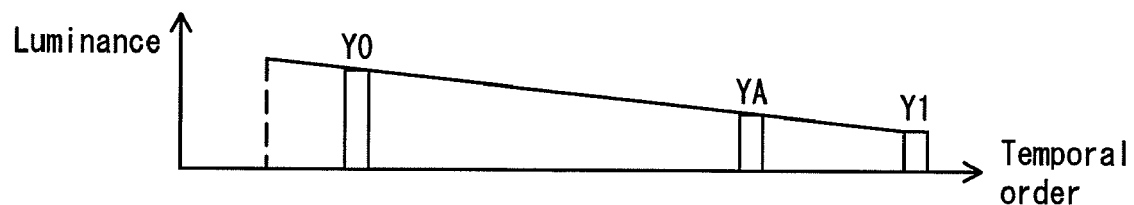
(B)
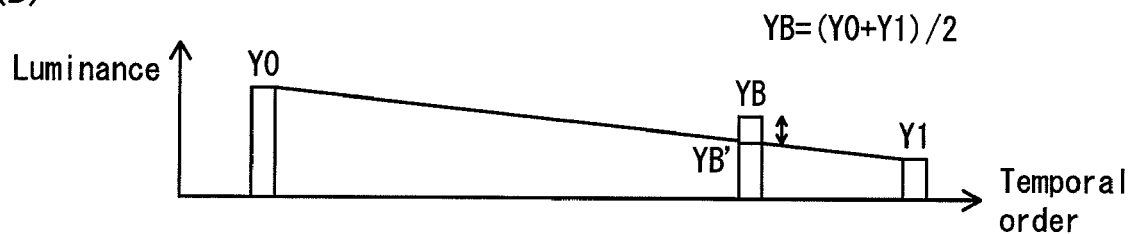

MOVING PICTURE DECODING DEVICE

TECHNICAL FIELD

The present invention relates to a moving picture decoding device for decoding pictures constituting a moving picture.

BACKGROUND ART

In general, moving pictures are encoded by compressing the information in amount by making use of the redundancy in the spatial and temporal directions, which exists in the moving pictures. Here, the inter picture prediction is used as a method that makes use of the redundancy in the temporal direction. In the inter picture prediction, a certain picture is encoded by using a reference picture for which specified is a picture existing in vicinity of the certain picture in the forward or backward direction in display time order.

More specifically, to compress the information in amount, an amount of motion is detected from the reference picture, and the redundancy in the spatial direction is reduced from the difference between a motion-compensated picture and the encoding target picture.

According to the H.264 standard that was established in recent years, the encoding is performed in units of slices.

The slice is a unit that is smaller than a picture and is composed of a plurality of macro blocks. Each picture is composed of one or more slices.

The I-slice is a slice including blocks for which the intra picture prediction is to be performed using only the encoding target picture, the I-slice not having a reference picture. Also, the P-slice is a slice that includes (i) a block for which the inter picture prediction is to be performed by referring to an already-decoded picture, and (ii) a block for which the intra picture prediction is to be performed. Further, the B-slice is a slice that includes (i) a block for which the inter picture prediction is to be performed by referring to at most two already-decoded pictures at the same time, and (ii) a block for which the intra picture prediction is to be performed.

A picture can include a plurality of types of slices. A picture including only I-slices is called I-picture; a picture including only I-slices and P-slices is called P-picture; and a picture including I-slices, P-slices and B-slices is called B-picture.

In the following, description will be made in units of pictures. However, the description could be applied to the units of slices as well.

In the H.264 standard, compared to the MPEG2 standard or the MPEG4 standard, the restrictions concerning the reference picture have been reduced significantly. The reference picture to be referred to by a block belonging to a P-picture may exist either in the forward or backward direction from the target in display time order in so far as the reference picture has already been decoded. Also, the at most two pictures to be referred to by a block belonging to a B-picture may exist either in the forward or backward direction from the target in display time order in so far as the pictures have already been decoded. Further, the reference picture may be any type of picture, and may be any of I-picture, P-picture, and B-picture.

FIG. 40 illustrates the prediction relationships among pictures in the above-described moving picture encoding methods.

In FIG. 40, the vertical lines each represent a picture, and the signs attached to the right-bottom of each picture indicate the picture types (I, P, and B). Also, the arrows indicate that the inter picture prediction decoding is performed for a picture at the start of an arrow, using a picture at the end of the arrow as the reference picture.

A B-picture can refer to at most two pictures. One of the two references to pictures is called a forward reference (L0) and the other is called a backward reference (L1).

It should be noted here that in the forward reference, a picture that exists in the forward direction in display time order is given a priority, but it should not necessarily be a picture existing in the forward direction in display time order. Similarly, in the backward reference, a picture that exists in the backward direction in display time order is given a priority, but it should not necessarily be a picture existing in the backward direction in display time order.

In the P-picture, each block thereof can refer to at most one picture, and only forward reference (L0) is possible. As is the case with the B-picture, in the P-picture, the picture should not necessarily be a picture existing in the forward direction in display time order.

For example, B-picture B9, which is the $9^{th}$ picture where picture I1 is the starting picture, uses, in the forward reference, P-picture P10 that is the $10^{th}$ picture existing after B-picture B9 in display time order, and uses, in the backward reference, P-picture P7 that is the $7^{th}$ picture existing before B-picture B9 in display time order.

In the H.264 standard, compared to the MPEG2 standard or the MPEG4 standard, the restrictions concerning the display order have also been reduced significantly. It is possible to determine the display order without depending on the decoding order, unless the picture memory for storing decoded pictures overflows.

FIG. 41 illustrates the relationships between the decoding order and the display order with respect to the pictures in the above-described moving picture encoding methods.

In FIG. 41, the numbers in the upper row indicate the decoding order of the pictures, and the numbers in the lower row indicate the display order of the pictures. In FIG. 41, the arrows in the middle part indicate the relationships between the decoding order and the display order. The display order is encoded as an attribute of each picture.

For example, P-picture P10 in FIG. 41 is displayed after B-picture B11 and P-picture P13 that are decoded after P-picture P10.

Also, in the H.264 standard, during decoding of a B-picture, an encoding mode called direct mode can be selected. In the direct mode, the encoding target block itself does not have a motion vector. There are two types of direct modes: temporal direct mode; and spatial direct mode.

In the temporal direct mode, a motion vector to be used for the encoding target block is generated by prediction, by using a motion vector of another encoded picture as a reference motion vector and performing the scaling process based on the positional relationships among pictures in the display time (see, for example, Patent Document 1).

FIG. 42 illustrates a method of generating a motion vector by prediction in the temporal direct mode.

In FIG. 42, the vertical lines each represent a picture, and the sign attached to the right-top of each picture indicate a picture type (P indicating the P-picture, and B indicating the B-picture). Also, the number attached to each picture type indicates the decoding order of the picture. In the following recitation of the present description, it is presumed that the picture numbers in the drawings are provided in accordance with the same standard.

The pictures P1, B3, B4, B5, and P2 have display time information T1, T2, T3, T4, and T5, respectively. Here will be described a case where block BL0 of picture B5 is decoded in the temporal direct mode.

Used in this case is motion vector MV1 of block BL1 (anchor block) that is at the same coordinate position as block BL0, where the block BL1 is in picture P2 (anchor picture) that is in the vicinity of picture B5 in display time and has already been decoded. The motion vector MV1 is a motion vector that was used when the block BL1 was decoded, and refers to picture P1. In this case, the following motion vectors are used when block BL0 is decoded. That is to say, motion vector MV_F is used for picture P1, and motion vector MV_B is used for picture P2.

The sizes of motion vectors MV_F and MV_B can be obtained by Equation 1 as follows, where MV represents the size of motion vectors MV1, MVf represents the size of motion vector MV_F, and MVb represents the size of motion vectors MV_B.

$$MVf=(T4-T1)/(T5-T1) \times MV$$

$$MVb=(T5-T4)/(T5-T1) \times MV \qquad \text{Equation 1}$$

The process for obtaining MVf and MVb from MV1 in this way is called scaling process. The block MBL0 is motion-compensated from pictures P1 and P2 being the reference pictures, by using motion vectors MV_F and MV_B that are obtained through the scaling process.

On the other hand, in the spatial direct mode, as is the case with the temporal direct mode, the decoding target block itself does not have a motion vector, the decoding is performed by referring to and using a motion vector that is owned by a decoded block spatially placed in the vicinity of the decoding target block (see, for example, Patent Document 2).

FIG. 43 illustrates a method of generating a motion vector by prediction in the spatial direct mode. Explained here is a case where block BL0 of picture B5 shown in FIG. 43 is decoded in the spatial direct mode. In this case, determined as candidates for motion vectors of the encoding target block are motion vectors that refer to a decoded picture that is closest to the decoding target picture in display time order, the candidates being selected from among motion vectors MVA1, MVB1, and MVC1 respectively for decoded blocks including three pixels A, B, and C in the vicinity of block BL0 being the decoding target block.

When three motion vectors are determined as the candidates as a result of this process, a central value thereof is selected as a motion vector of the decoding target block. Also, when two motion vectors are determined as the candidates as a result of this process, a mean value thereof is calculated, and the calculation result is selected as a motion vector of the decoding target block.

In the example shown in FIG. 43, motion vectors MVA1 and MVC1 are obtained by referring to picture P2, and motion vector MVB1 is obtained by referring to picture P1. Accordingly, a mean value of motion vectors MVA1 and MVC1, which refer to picture P2 being a decoded picture that is closest to the decoding target picture in display time order, is calculated, and the calculation result is motion vector MV_F being the first motion vector of the decoding target block. The second motion vector MV_B is obtained in the same manner, and in this example, motion vector MVB2, which refers to picture P3 being a decoded picture that is closest in display time order, is determined as the motion vector MV_B.

Patent Document 1: Japanese Patent Application Publication No. 11-75191

Patent Document 2: International Publication Pamphlet No. 2004/008775

DISCLOSURE OF THE INVENTION

The Problems the Invention is Going to Solve

As described above, the H.264 standard defines less restrictions for selecting reference pictures than before. For example, a B-picture can refer to any two pictures among decoded pictures stored in the picture memory. However, since the size of the picture memory for storing decoded pictures is limited, the moving picture decoding device may be designed such that the number of pictures to be stored is limited to a certain number, and the stored pictures are deleted in sequence from the oldest picture (the furthest picture in the forward direction in the display order).

In this case, there is no assurance that a reference picture that could be used when a picture was decoded can also be used when one of succeeding pictures is decoded. Decoding in the temporal direct mode is performed by using (i) a motion vector of a block (anchor block) that is located as the same position as the decoding target block in a decoded picture (anchor picture) in the vicinity of the decoding picture in display time order, and (ii) forward reference picture information thereof. In these circumstances, for the above reason, there may be a case where, when the decoding target picture is decoded, a forward reference picture of the anchor block has been deleted from the picture memory and cannot be referred to.

FIGS. 44A and 44B illustrate a case where, a forward reference picture of the anchor block cannot be used as a forward reference picture of the decoding target picture. The pictures are displayed in the order of P1, P2, B3, B4, and B5, and the pictures are decoded in the order of P1, B3, B4, B5, and P2.

FIG. 44A illustrates reference relationships when picture P2, which is to become anchor picture later, is decoded. Only picture P1 exists when picture P2 is decoded. Accordingly, picture P1 can be used as a reference picture.

FIG. 44B illustrates reference relationships among pictures when picture B5 is decoded.

Pictures P1, P2, B3 and B4 exist when picture B5 is decoded. However, one of the four pictures needs to be deleted when, for example, the capacity of the picture memory is equal to the amount of three pictures.

In this case, when all of the four pictures are reference pictures, the furthest picture in the forward direction in display order is deleted by priority. This is because the furthest picture in the forward direction in display order has the lowest possibility of being referred to by one of pictures decoded later.

In conformance with this standard, deleted is picture P1 that is the furthest picture in the forward direction in display order. After this deletion, picture P1 does not exist in the picture memory when picture B5 is decoded. This makes it impossible to decode picture B5.

Further, according to the H.264 standard, forward reference pictures of anchor blocks that are referred to by a decoding target bloc in the temporal direct mode are managed by the decoding target bloc with use of a reference picture list (RPL).

When the picture list includes pictures that can be referred to, but the number of pictures to be stored in the list is restricted, there may be a case where, when the decoding target block is decoded, a forward reference picture of the anchor block cannot be referred to because the picture is not included in the list, although the picture is stored in the picture memory physically.

Further, according to the H.264 standard, the stream can control whether to attach to or remove from a picture a reference attribute that indicates whether or not a picture can be used as a reference picture. A picture having the reference attribute can be referred to as a reference picture, but a picture from which the reference attribute has been removed (non-reference picture) cannot be referred to.

In these circumstances, there may be a case where, when the decoding target block is decoded, a forward reference picture of the anchor block cannot be referred to because the reference attribute has been removed from the forward reference picture by the control of the stream, although the picture is stored in the picture memory physically.

As described above, there may be cases where, when the decoding target block is decoded in the temporal direct mode, a forward reference picture of the anchor block cannot be referred to due to the above-mentioned problems, and the decoding results in a failure.

In view of the above-described circumstances, an object of the present invention is to ensure that the decoding is performed successfully even in a mode, such as the temporal direct mode, where the decoding target block should be decoded using a reference picture of another decoded picture.

Means to Solve the Problems

As means for solving the above-described problems, the present invention is a moving picture decoding device for decoding a plurality of pictures that constitute a moving image, comprising: a mode extracting unit operable to extract an encoding mode for each target block in the pictures; a reference judgment unit operable to, when a target block in one of the pictures is decoded in the extracted encoding mode and the extracted encoding mode is a first encoding mode, judge whether or not a reference picture for a decoded picture, which is in a vicinity of said one of the pictures in terms of display time, is usable, wherein, in the first encoding mode, the target block should be decoded using the reference picture and a reference motion vector for the decoded picture; a decoding unit operable to decode the target block using the reference picture for the decoded picture in the first encoding mode when the reference judgment unit judges that the reference picture is usable, and operable to decode the target block in a mode different from the first encoding mode when the reference judgment unit judges that the reference picture is not usable.

The first encoding mode is, for example, the temporal direct mode defined in the H.264 standard.

Effects Of The Invention

With the above-stated structure, when a decoding target block is decoded in a mode (such as the temporal direct mode) in which a reference picture of another decoded picture should be used, the decoding can be continued without suspension even in a state where a reference picture of another decoded picture cannot be used.

This makes it possible to ensure that the decoding is continued when a decoding target block is decoded in a mode, such as the temporal direct mode, in which a reference picture of another decoded picture is used.

BRIEF DESCRIPTION OF THE DRAWING

FIGS. 6A and 6B show examples of a picture management information table and a forward reference picture list for the stream shown in FIG. 5.

FIGS. 10A through 10C show examples of forward reference picture reference tables for the stream shown in FIG. 5.

FIGS. 12A and 12B show examples of a picture management information table and a forward reference picture list for the stream shown in FIG. 5.

FIG. 13 shows a stream structure for explanation of a case where a forward reference picture does not exist in the forward reference picture list in the temporal direct mode.

FIGS. 14A through 14C shows examples of forward reference picture reference tables for the stream shown in FIG. 11.

FIG. 32 shows an example of decoding by the implicit weighted prediction in the temporal direct mode.

FIG. 34 shows an example of the result of decoding by the weighted prediction performed by the moving picture decoding device 100 in Embodiment 13 of the present invention.

Figure 1:
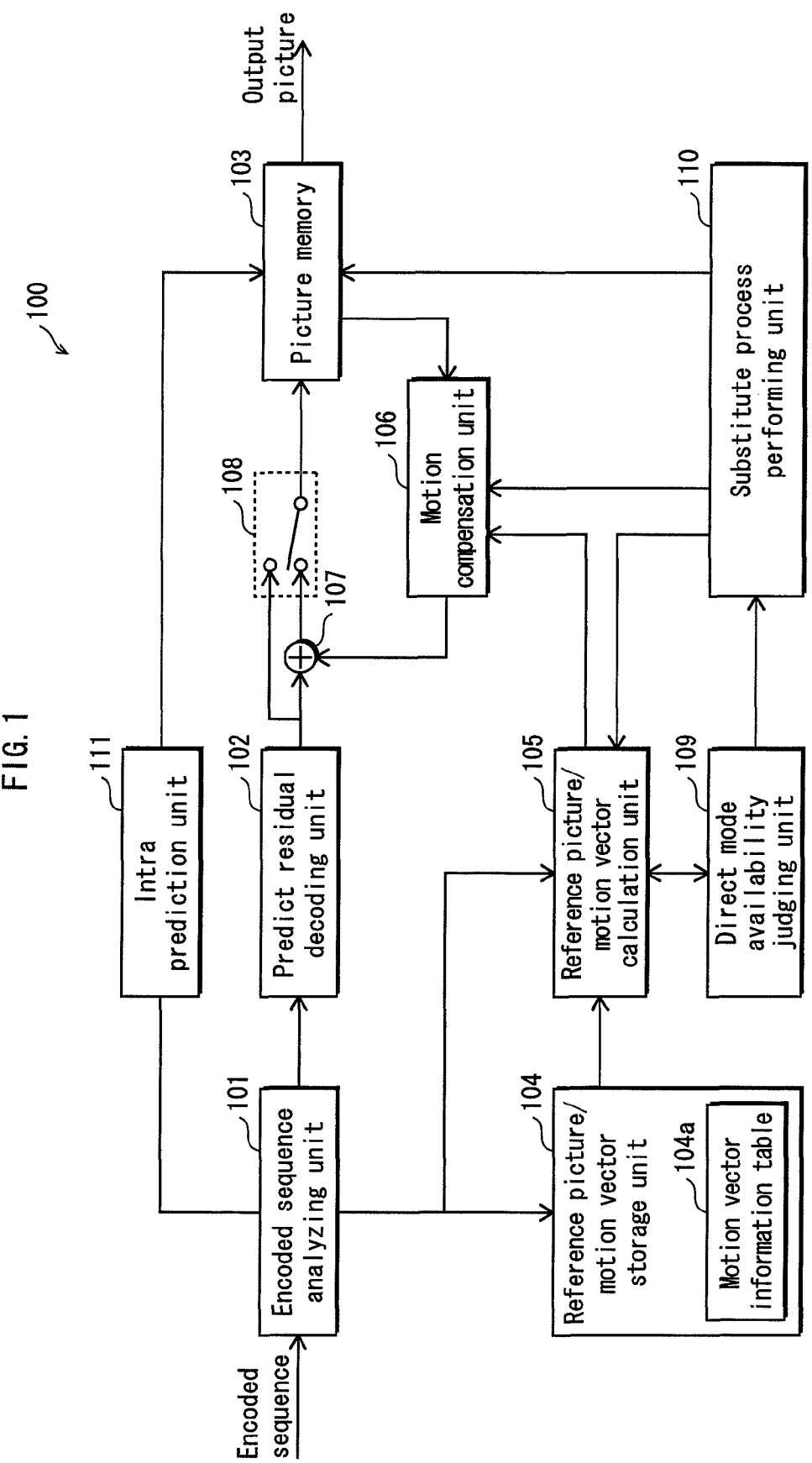
FIG. 1 shows an example of the structure of the moving picture decoding device 100 of the present invention.

DESCRIPTION OF CHARACTERS 100 moving picture decoding device
101 encoded sequence analyzing unit
102 predict residual decoding unit
103 picture memory
104 reference picture/motion vector storage unit
105 reference picture/motion vector calculation unit
106 motion compensation unit
107 addition calculating unit
108 switch unit
109 direct mode availability judging unit
110 substitute process performing unit
111 intra prediction unit
4101 transmission/reception circuit unit
4102 display control unit
4103 camera control unit
4104 operation input control unit
4105 audio processing unit
4106 modulation/demodulation circuit unit
4107 recording/reproducing unit
4108 demultiplexing unit
4109 moving picture decoding unit
4110 power circuit unit
4111 main control unit
4112 moving picture encoding unit
4113 synchronization bus
4121 antenna unit
4122 display unit
4123 camera unit
4124 operation key
4125 audio input unit
4127 storage medium
4128 audio output unit
4131 still picture decoding unit
4132 still picture encoding unit
4133 substitute process performing unit

BEST MODE FOR CARRYING OUT THE INVENTION

Embodiments of the present invention will be described in the following with reference to the attached drawings.

<Embodiment 1>

First, a moving picture decoding device 100 of Embodiment 1 will be described.

<1. Structure>

FIG. 1 is a block diagram showing the structure of the moving picture decoding device 100 conforming to the H.264 standard, in Embodiment 1.

The moving picture decoding device 100, as shown in FIG. 1, includes an encoded sequence analyzing unit 101, a predict residual decoding unit 102, a picture memory 103, a reference picture/motion vector storage unit 104, a reference picture/motion vector calculation unit 105, a motion compensation unit 106, an addition operation unit 107, a switch unit 108, a direct mode availability judging unit 109, a substitute process performing unit 110, and an intra prediction unit 111.

The encoded sequence analyzing unit 101 extracts, from an input encoded sequence (stream), various types of data, such as encoding mode information and information concerning the motion vectors used in the encoding.

The predict residual decoding unit 102 generates predict residual picture data by decoding input encoded predict residual data.

The picture memory 103 stores generated decoded data.

The reference picture/motion vector storage unit 104 stores reference pictures and motion vectors extracted by the encoded sequence analyzing unit 101, as a motion vector information table 104a.

The reference picture/motion vector calculation unit 105 calculates reference pictures and motion vectors to be used in the motion compensation, based on the encoding mode information, motion vector information, and the like extracted by the encoded sequence analyzing unit 101.

The motion compensation unit 106 generates motion compensation picture data based on the reference pictures and motion vectors calculated by the reference picture/motion vector calculation unit 105.

The addition operation unit 107 generates decoded picture data by adding together the predict residual picture data from the predict residual decoding unit 102 and the motion compensation picture data from the motion compensation unit 106.

The switch unit 108 switches between pieces of decoded picture data depending on, for each encoding mode, whether the motion compensation is used.

The direct mode availability judging unit 109 judges whether decoding in the direct mode is possible, and when it judges that decoding in the direct mode is impossible, it notifies the substitute process performing unit 110 of it.

The substitute process performing unit 110, upon receiving from the direct mode availability judging unit 109 the notification that decoding in the direct mode is impossible, performs a process that is necessary for continuing the decoding of a picture, and sends a notification to the reference picture/motion vector calculation unit 105, or the motion compensation unit 106, or the picture memory 103.

The intra prediction unit 111 generates decoded picture data by performing an intra prediction if the decoding target block in the input encoded sequence has been encoded in the intra mode.

It should be noted here that, although, according to FIG. 1, the substitute process performing unit 110 can send a notification to each of the reference picture/motion vector calculation unit 105, the motion compensation unit 106, and the picture memory 103, the substitute process performing unit 110 may send the notification only to one of them.

<2. Data Structure>

Next, the data structure of the moving picture decoding device will be described with reference to FIG. 2.

Figure 2:
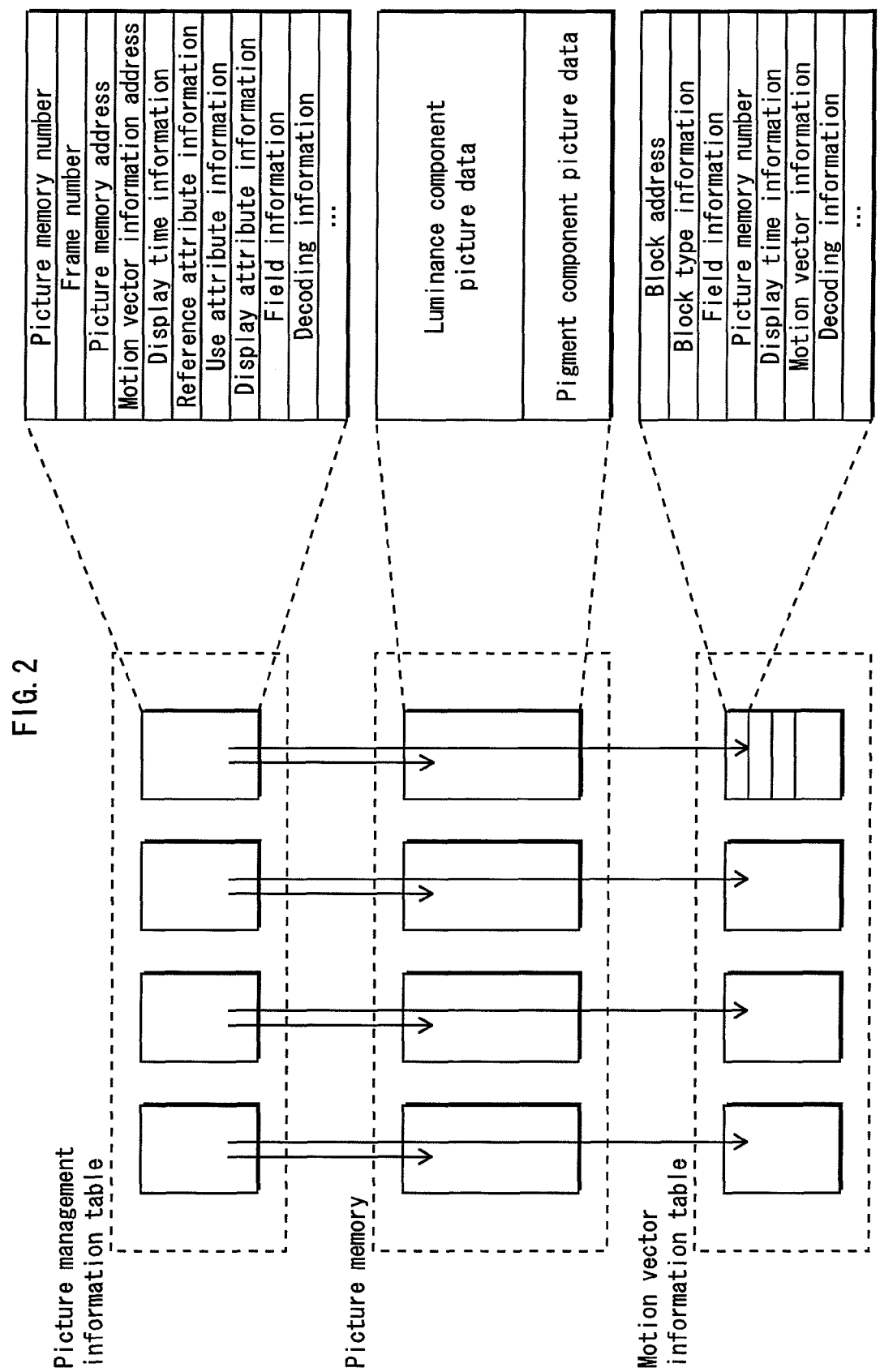
FIG. 2 shows an example of the data structure of the moving picture decoding device 100 of the present invention.

The picture memory in the middle portion of FIG. 2 corresponds to the picture memory 103, and has a luminance component and a color difference component as the decoded picture data. The picture memory 103 can store data of a plurality of pictures. The picture memory 103 stores decoded picture data which is referred to as necessary.

The motion vector information table in the lower portion of FIG. 2 corresponds to the motion vector information table 104*a* in the reference picture/motion vector storage unit 104, and holds, for each block, information required in the direct mode such as the reference picture information and the reference motion vector information. Examples of these information are a block address of the block, block type information, field information, a picture memory number of the reference picture, display time information, decoding information, and a reference motion vector. It is possible to have as many motion vector information tables 104*a* as a plurality of pictures.

The picture management information table in the higher portion of FIG. 2 holds information necessary for decoding, and has a role of connecting the picture memory 103 with the motion vector information table 104*a*. Examples of the information held by the picture management information table are a picture memory number, a frame number, a picture memory address, a motion vector information address, display time information, reference attribute information, display attribute information, use attribute information, field information, and decoding information. It is possible to have as many motion vector information tables 104*a* as a plurality of pictures. With this structure, when a picture memory number is determined, picture management information, picture memory, and motion vector information are determined uniquely in correspondence with the determined picture memory number.

<3. Operation>

Next, the decoding operation performed by the above-described moving picture decoding device will be described with reference to the flowchart of FIG. 3.

First, the encoded sequence analyzing unit 101 obtains a block type (encoding mode) from the input encoded sequence (step S201). The succeeding processing flow depends on the obtained block type.

When the obtained block type is "intra" (NO in step S202), the predict residual decoding unit 102 and the intra prediction unit 111, which is not illustrated, generate decoded picture data, and stores the generated decoded picture data into the picture memory 103 (step S212).

When the obtained block type is "inter" (YES in step S202) and is not the direct mode (NO in step S203), the reference picture/motion vector calculation unit 105 obtains a reference picture number and motion vector information from the encoded sequence analyzing unit 101 (step S204). It should be noted here that the reference picture number is a number that is assigned to a picture that can be referred to by the decoding target picture, and is determined for each decoding target picture. Also, since the motion vector information obtained from the encoded sequence analyzing unit 101 may have been compressed based on information of blocks in the vicinity of the decoding target picture, the reference picture/motion vector calculation unit 105 converts the motion vector information into a motion vector with which a reference picture can be actually obtained.

Next, the motion compensation unit 106 further converts the reference picture number into a picture memory number in which the reference picture is actually stored (step S205). Further, the motion compensation unit 106 obtains the reference picture from the picture memory 103 using the picture memory number and the motion vector (step S206).

Next, the motion compensation unit 106 further obtains a prediction picture to be used in the decoding (step S207). The prediction picture is not completely identical with the reference picture. For example, in a mode where two pictures can be referred to, as is the case with B-pictures, the prediction picture needs to be an average of two reference pictures.

Next, the addition operation unit 107 adds together the prediction picture and the predict residual picture (step S208) This completes the generation of the decoded picture data.

The decoded picture data is stored into the picture memory 103.

On the other hand, when the obtained block type is the direct mode (YES in step S203), and is the temporal direct mode (YES in step S209), the encoded sequence does not contain a reference picture number and motion vector information, and thus the reference picture/motion vector calculation unit 105 calculates a reference picture number and a motion vector based on an algorithm for the temporal direct mode (step S210). The algorithm for the temporal direct mode will be described later.

After the calculation of the reference picture number and motion vector, the processes that follow are the same as those (steps S205 through S208) that follow when the obtained block type is "inter" and is not the direct mode.

When the obtained block type is the direct mode (YES in step S203), and is the special direct mode (NO in step S209), the same steps follow as is the case with the temporal direct mode, except that they differ in the calculation method of the reference picture number and motion vector (step S211). The algorithm for the temporal direct mode used here is a conventional one, and description thereof is omitted here.

Figure 4:
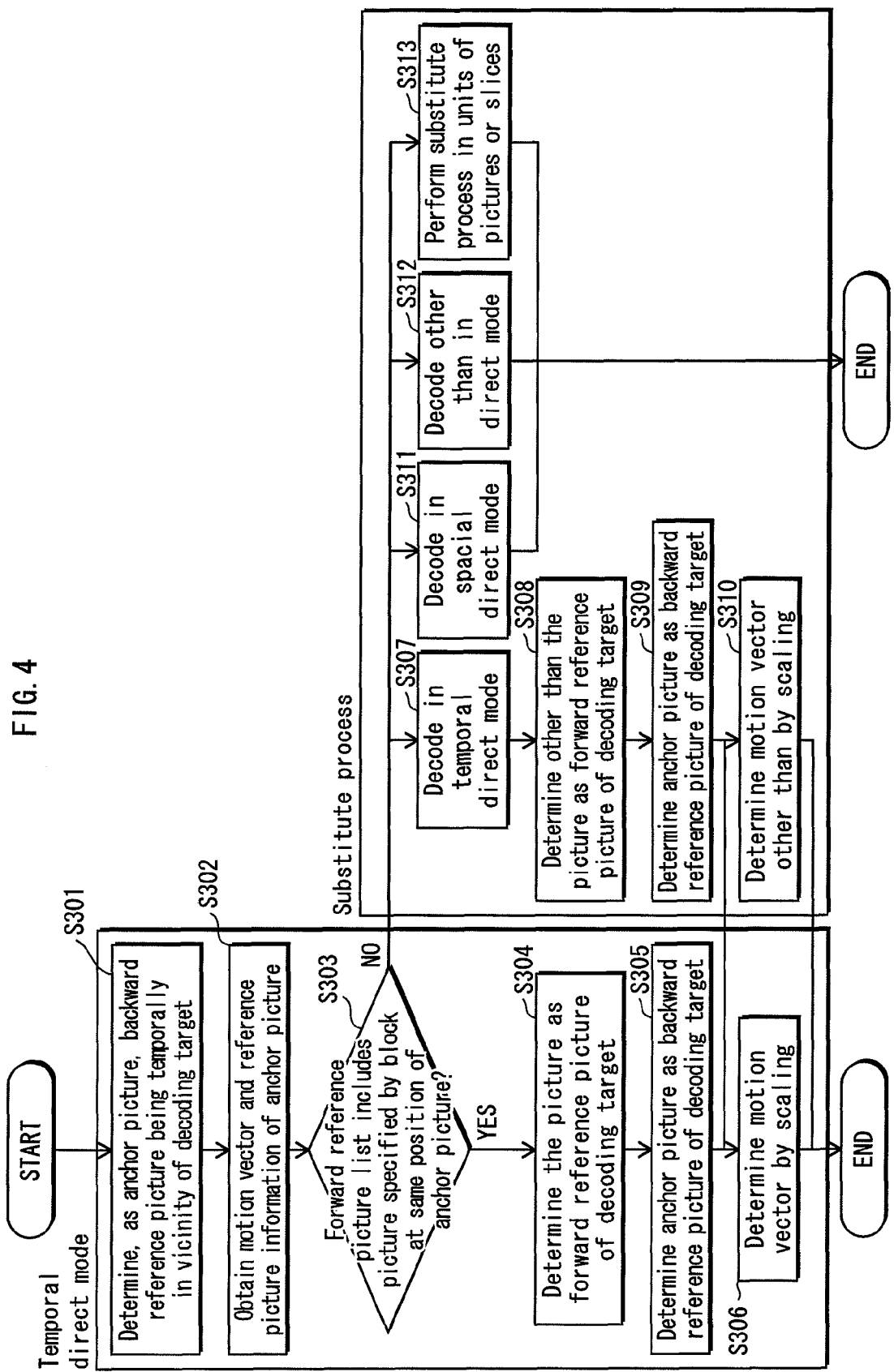
FIG. 4 shows an example of the procedure for the substitute process performed by the moving picture decoding device 100 in Embodiment 1 of the present invention.

Next, the procedures in which the reference picture/motion vector calculation unit 105 determines the reference picture number and motion vector in the temporal direct mode will be described with reference to FIG. 4.

First, the reference picture/motion vector calculation unit 105 determines, as an anchor picture, a picture in a backward reference picture list whose index number (backward reference picture number) is "0", with respect to a decoding target picture (step S301). It should be noted here that the backward reference picture numbers start with "0", and are assigned to pictures that can be referred to with respect to a decoding target picture. The backward reference picture numbers are assigned with priority (the smaller the number is, the higher the priority is) to pictures that are temporally backward of and close to the decoding target picture. Accordingly, determined as the anchor picture is often a picture that is backward of and closest to the decoding target picture in display time.

Next, obtained from the reference picture/motion vector storage unit 104 are a motion vector and forward reference picture information of a block (anchor block) of the anchor picture that is on the same coordinates as those of a decoding target block of the decoding target picture (step S302). These information can be obtained since a motion vector and forward reference picture information of a decoded picture are stored into the reference picture/motion vector storage unit 104 at the decoding. It should be noted here that the forward reference picture information obtained from the reference picture/motion vector storage unit 104 is not a forward reference picture number itself. The reference picture number is a parameter that is assigned to each decoding target picture. Therefore, the forward reference picture number when the anchor picture is decoded is different from the number for the decoding target picture, and cannot be used to identify the picture. To identify a picture, a parameter that does not change for each decoding target picture, such as a picture buffer number, display order number, or frame number, can be used. Another information can also be used in so far as it can identify a picture.

Next, the reference picture/motion vector calculation unit 105 notifies the identification information of the forward reference picture of the anchor block to the direct mode availability judging unit 109.

The direct mode availability judging unit 109 judges whether or not the forward reference picture list of the decoding target picture includes a picture having the same identification information (step S303). When the forward reference picture list includes such a picture (YES in step S303), it means that decoding in the temporal direct mode is available, and the direct mode availability judging unit 109 notifies it to the reference picture/motion vector calculation unit 105. When the forward reference picture list does not include such a picture (NO in step S303), it means that decoding in the temporal direct mode cannot be continued, and a substitute process is performed. The substitute process will be explained later.

When the decoding process in the temporal direct mode is continued, the reference picture/motion vector calculation unit 105 calculates a forward reference picture number of the picture that has the same identification information among the forward reference picture list of the decoding target picture, and determines the picture as the forward reference picture of the decoding target picture (step S304).

Next, the reference picture/motion vector calculation unit 105 determines the anchor picture as the backward reference picture of the decoding target picture (step S305). The backward reference picture number is always "0".

Next, the reference picture/motion vector calculation unit 105 determines the motion vector of the decoding target block. In the temporal direct mode, the reference picture/motion vector calculation unit 105 calculates the motion vector by performing the scaling process using the display order numbers of the forward reference picture and the backward reference picture (step S306). The scaling process is already known, and description thereof is omitted.

<4. Specific Examples>
<4-1. Specific Example 1>

Specific examples of the cases where the substitute process is required will be explained with reference to FIGS. 5-10.

Figure 5:
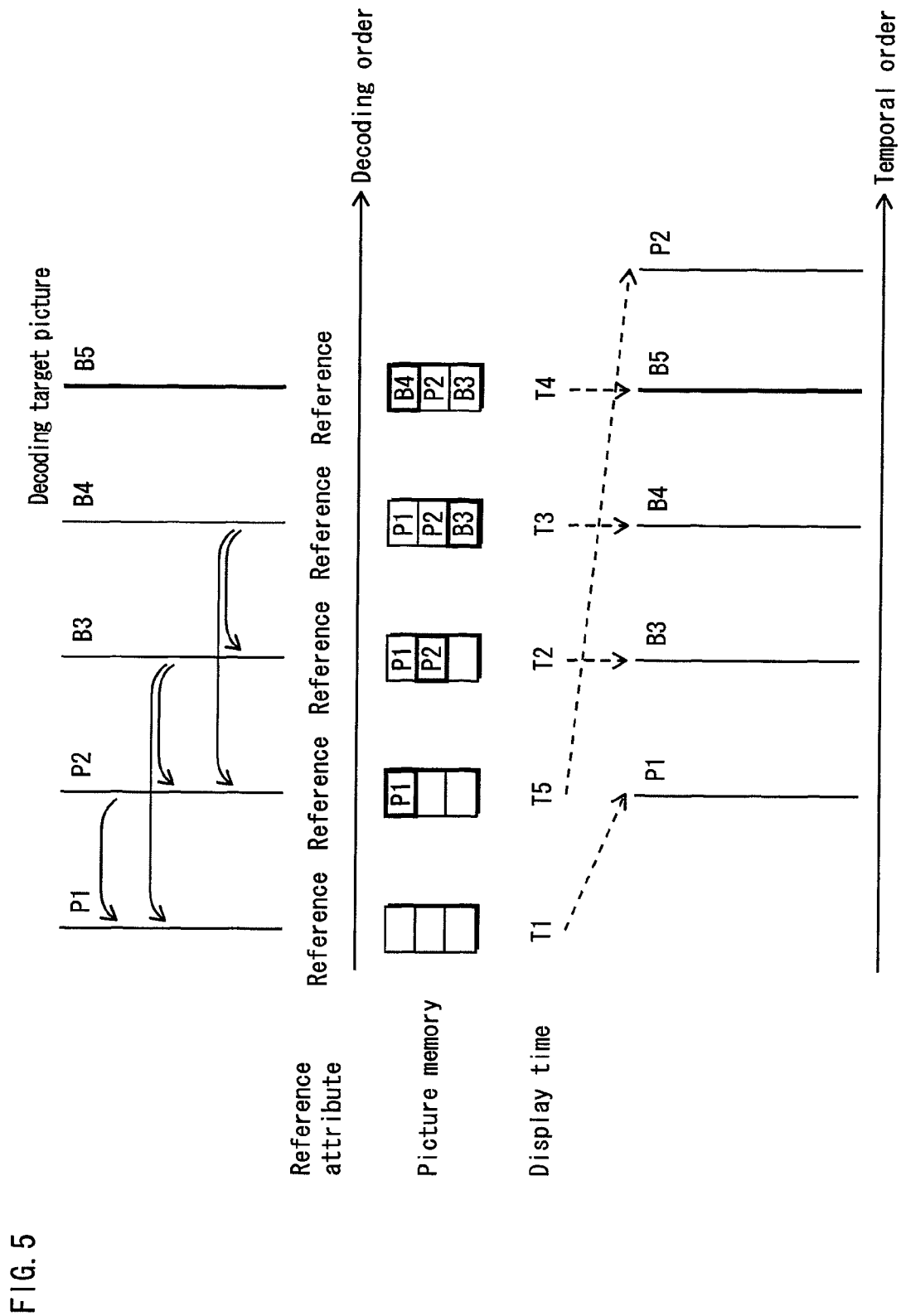
FIG. 5 shows a stream structure for explanation of a case where a forward reference picture does not exist in the picture memory in the temporal direct mode.

FIG. 5 illustrates the decoding order of the pictures in an encoded sequence (stream), relationships among display times, reference relationships among pictures, and the states of the picture memory 103.

In the upper portion of FIG. 5, pictures are arranged in the decoding order, and in the lower portion of FIG. 5, pictures are arranged in the display order. The dotted lines in the middle part of the drawing indicate correspondence between the decoding order and the display order of the pictures. The display order is encoded as the attribute of each picture.

Here, the transfer in the state of the picture memory 103 during decoding will be explained.

The size of the picture memory 103 is determined depending on the stream. It is supposed here that the capacity of the picture memory 103 is equal to the amount of three pictures excluding the decoding target picture. The picture memory numbers are "0", "1", "2" in order from the top of the drawing.

When picture P1 starts to be decoded, the picture memory 103 is empty. However, when picture P1 has been encoded as a picture having the reference attribute, the picture is stored into the picture memory 103 after the decoding (picture memory number 0).

After this, when, similarly, picture P2 and picture B3 are decoded as pictures having the reference attribute, the pictures are stored into the picture memory 103 before picture B4 is decoded (picture memory numbers 0, 1, 2).

After this, when, similarly, picture B4 is decoded as a picture having the reference attribute, this picture needs to be stored into the picture memory 103, but there is no free space in the picture memory 103 since it currently stores the three pictures.

The H.264 standard defines that a picture with the lowest priority is deleted from the picture memory. Basically, the priority is determined based on whether or not the picture has the reference attribute, or whether or not the display number is forward. In the present case, picture P1 whose display number is most forward is deleted from the picture memory.

Accordingly, when picture B5 is decoded, the picture memory stores pictures B4, P2 and B3 (picture memory numbers 0, 1, 2).

FIG. 6A shows a picture management information table when picture B5 is decoded. As one example, the decoding number and the display number are managed in correspondence with the picture memory number.

Figure 7:
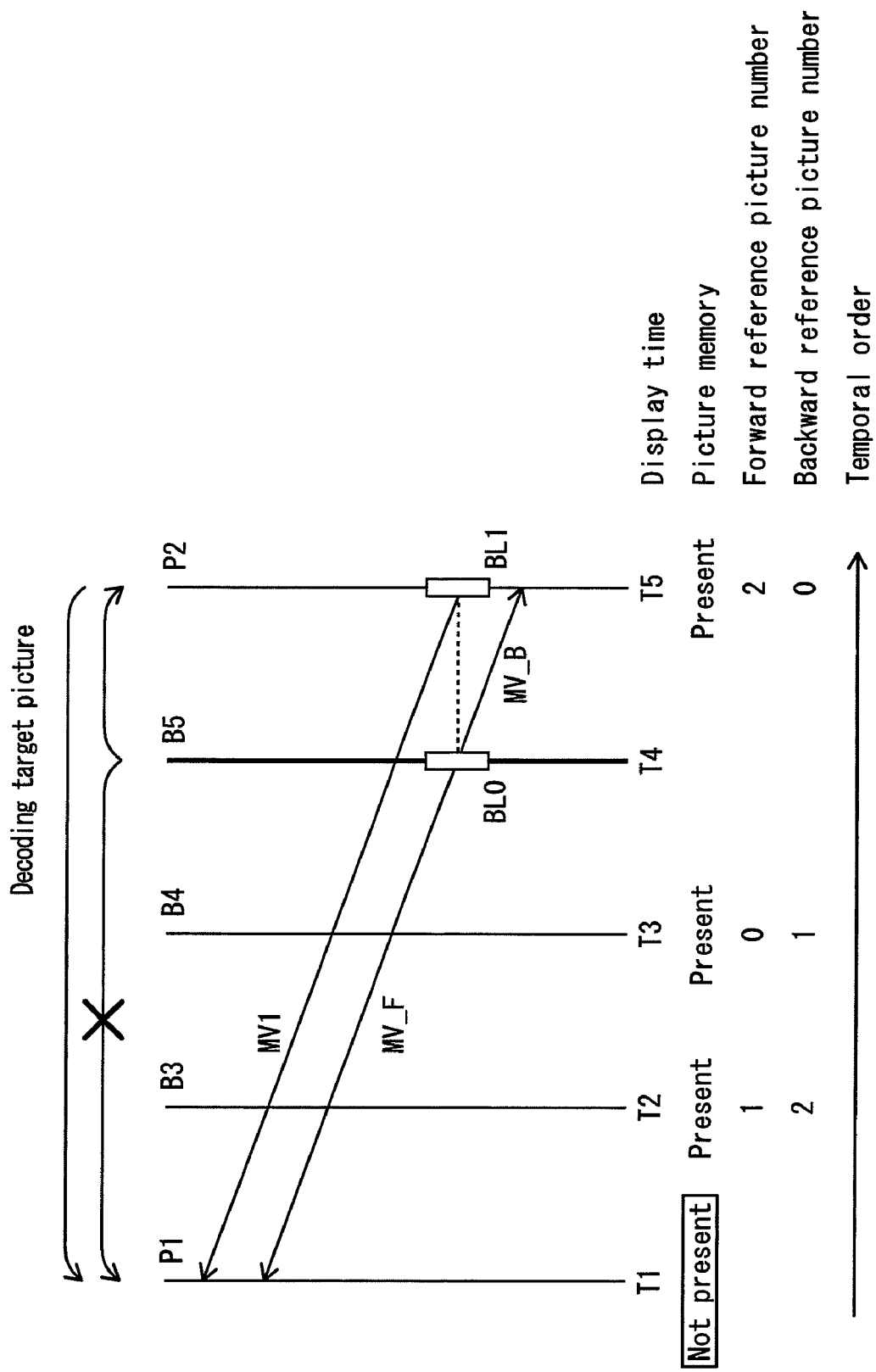
FIG. 7 shows an example of a case where a forward reference picture does not exist in the picture memory in the temporal direct mode.

FIG. 7 illustrates relationships with reference pictures when picture B5 is decoded.

When picture B5 is decoded, forward reference picture numbers are assigned to pictures that are present as reference pictures in the picture memory 103, in the order of picture B4, picture B3 and picture P2. This is because the forward reference picture numbers are assigned with priority to pictures that are forward of and closest to the decoding target picture in the display order, and then backward reference picture numbers are assigned with priority to pictures that are backward of and closest to the decoding target picture in the display order. Based on the similar standard, backward reference picture numbers are assigned in the order of picture P2, picture B4 and picture B3.

FIG. 6B shows a forward reference picture list of picture B5. The forward reference picture numbers are determined as described above, and therefore the forward reference picture list shown in FIG. 6B is obtained by copying pieces of information from the picture management information table shown in FIG. 6A in the order of the forward reference picture numbers.

In the above example, the picture memory 103 corresponds one-to-one to the reference picture list. However, in general, the maximum number of reference picture lists can be restricted. Accordingly, there may be a case where a reference picture number is not assigned even when a picture that can be referred to exists in the picture list. Also, in general, a plurality of reference picture numbers can be assigned to a same picture memory.

Picture P2 whose backward reference picture number is "0" is determined as the anchor picture. When the reference picture of the anchor block is P1, the motion vector information table stores display time T1, picture memory number 0 (at the time of decoding), decoding number 1 and the like as the reference picture information for identifying the reference picture.

Figure 8:
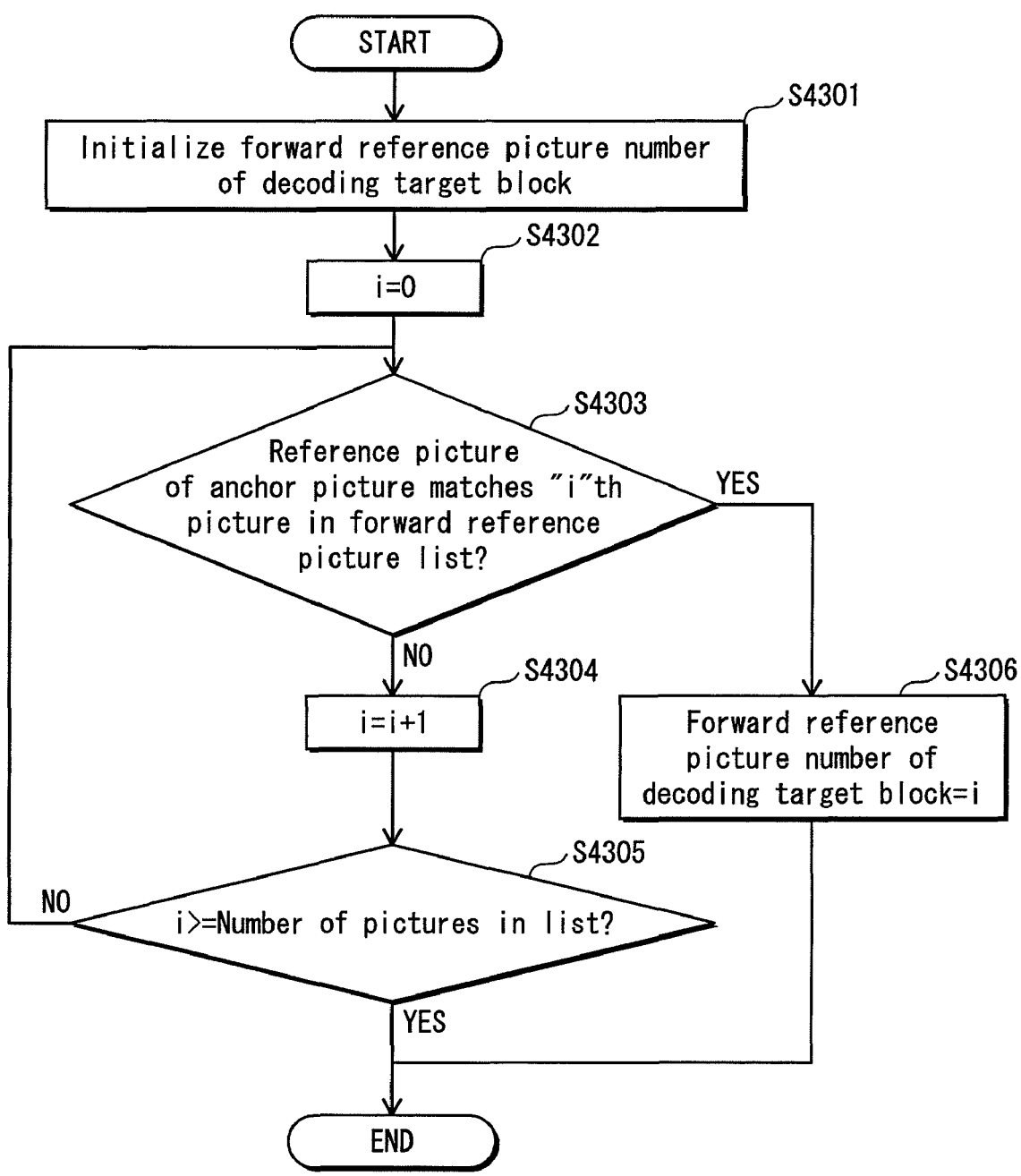
FIG. 8 shows an example of a procedure for converting the reference picture information to a forward reference picture number.

FIG. 8 shows an example of a procedure for converting the reference picture information to a forward reference picture number.

In the process shown in FIG. 8, the forward reference picture list is searched for a picture that matches the reference picture. The search should be made by referring to all the blocks of the temporal direct mode. However, according to the H.264 standard, the size of the forward reference picture list becomes "32" at the largest. In this case, it takes time for making one search. As understood from this, it is an inefficient process.

The forward reference picture list is common among all the blocks in the slice. Accordingly, when one conversion table for converting the reference picture information to a forward reference picture number is generated for each slice, the process for each block can be done by referring to the table. This makes the process efficient.

Figure 9:
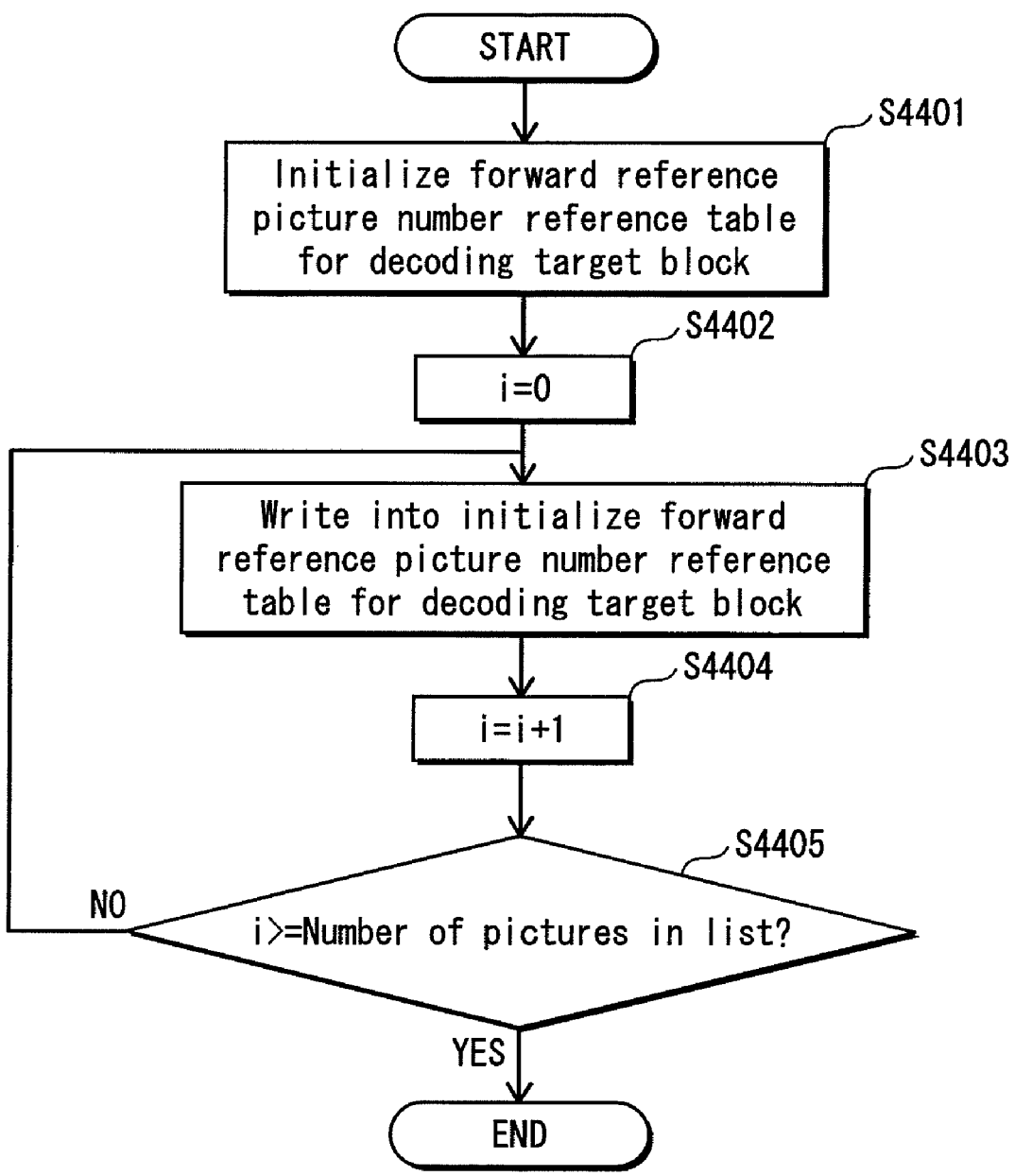
FIG. 9 shows an example of a procedure for generating the conversion table for converting the reference picture information to a forward reference picture number.

FIG. 9 shows an example of a procedure for generating the conversion table for converting the reference picture information to a forward reference picture number.

The conversion tables actually generated differ from each other depending on the information based on which the reference picture is identified. FIGS. 10A through 10C show examples of conversion tables for converting the reference picture information to a forward reference picture number when picture B5 is decoded.

FIG. 10A shows a conversion table when the reference picture is identified by the display time.

FIG. 10B shows a conversion table when the reference picture is identified by the decoding number.

FIG. 10C shows a conversion table when the reference picture is identified by the picture memory number.

Here, suppose an example case where the reference picture is identified by the display time. Although the display time of the reference picture of the anchor block is T1, it is found by referring to FIG. 10A that a forward reference picture number has not been assigned to T1.

Suppose another example case where the reference picture is identified by the decoding number. Although the decoding number of the reference picture of the anchor block is "1", it is found by referring to FIG. 10B that a forward reference picture number has not been assigned to "1".

Suppose still another example case where the reference picture is identified by the picture memory number. The picture memory number of the reference picture of the anchor block is "0". The decoding number of the anchor picture is "2". The picture whose picture memory number is "0" has decoding number "4". However, a reference picture of the anchor picture should not be decoded after the anchor picture. It is found from this that a reference picture of the anchor picture does not remain in the picture memory.

As described above, a forward reference picture is not detected. Accordingly, to continue the decoding, a certain substitute process is required.

4-2. Specific Example 2>

Other specific examples of the cases where the substitute process is required will be explained with reference to FIGS. 11-14.

Figure 11:
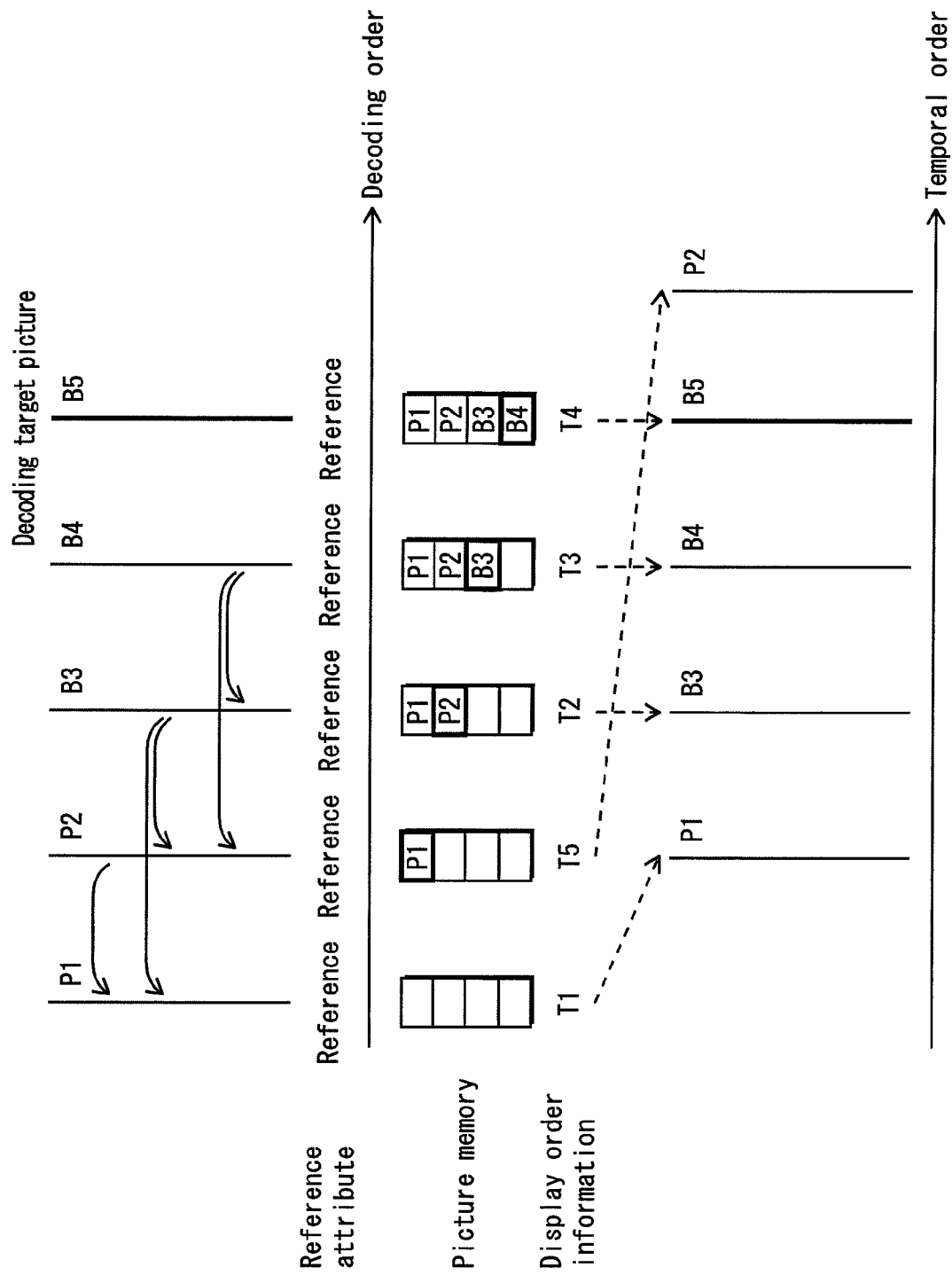
FIG. 11 shows a stream structure for explanation of a case where a forward reference picture does not exist in the forward reference picture list in the temporal direct mode.

FIG. 11 illustrates the decoding order of the pictures in an encoded sequence (stream), relationships among display times, reference relationships among pictures, and the states of the picture memory. The stream shown in FIG. 11 differs from the stream shown in FIG. 5 in that the capacity of the picture memory 103 is equal to the amount of four pictures. Due to this structure, when picture B5 is decoded, the picture memory stores all of pictures P1, P2, B3 and B4 that have already been decoded at this time (picture memory numbers 0, 1, 2, 3).

FIG. 12A shows a picture management information table when picture B5 is decoded. Since FIG. 12A is the same as FIG. 6A, description thereof is omitted.

FIG. 13 illustrates relationships with reference pictures when picture B5 is decoded.

FIG. 13 differs from FIG. 7 in that the maximum number of the forward reference picture list and the backward reference picture list is restricted to "1", as well as the size of the picture memory. The maximum number of the reference picture list can be defined by the stream.

When picture B5 is decoded, the forward reference picture number is assigned only to picture B4 having a high priority, and the backward reference picture number is assigned only to picture P2 having a high priority.

FIG. 12B shows a forward reference picture list of picture B5. Since FIG. 12B is the same as FIG. 6B, description thereof is omitted.

FIGS. 14A through 14C show examples of conversion tables for converting the reference picture information to a forward reference picture number when picture B5 is decoded.

FIG. 14A shows a conversion table when the reference picture is identified by the display time.

FIG. 14B shows a conversion table when the reference picture is identified by the decoding number.

FIG. 14C shows a conversion table when the reference picture is identified by the picture memory number.

The conversion tables are generated in the same manner as those shown in FIGS. 10A through 10C, and description thereof is omitted.

The process of converting the reference picture information to a forward reference picture number by identifying the reference picture by the display time or by the decoding number is the same as the process shown in FIG. 8, and description thereof is omitted.

Suppose an example case where the reference picture is identified by the picture memory number. Although the picture memory number of the reference picture of the anchor block is "0", it is found by referring to FIG. 14C that a forward reference picture number is not assigned to "0". Different from the case shown in FIG. 10C, the decoding number needs not be referred to.

As described above, a forward reference picture is not detected. Accordingly, to continue the decoding, a certain substitute process is required.

<5. Substitute Process>

When, as in the above-described cases, it is determined that a certain substitute process is required, in Embodiment 1, the moving picture decoding device 100 performs a substitute process in the temporal direct mode (steps S307 through S310).

<5-1. Determining Forward Reference Picture>

When a forward reference picture of the anchor block cannot be referred to as in the above-described cases, a forward reference picture of an decoding target picture to be used in the temporal direct mode cannot be determined. Here, if a forward reference picture can be determined, it is possible to continue the temporal direct mode, and as a result of this, it is possible to continue the decoding. As one example, a picture having forward reference picture number "0" is determined as the forward reference picture.

The size of the forward reference picture is defined by the maximum number specified by the stream, as well as by the number of reference pictures included in the picture list. However, in the actuality, the size of a reference picture list does not become "0". And thus there is always a picture having forward reference picture number "0". Accordingly, it is possible to continue the temporal direct mode without fail by determining a picture having forward reference picture number "0" as the forward reference picture of the decoding target block. The substitute process by the present method produces an advantage that the implementation is easy.

The procedure for converting the reference picture information of the anchor block to a forward reference picture number is performed as shown in FIG. 8 or FIG. 9.

For example, in step S4301 shown in FIG. 8, the forward reference picture number of the decoding target block may be initialized to "0". This makes it possible to perform a substitute process in the regular process and in the temporal direct mode. Also, in step S4401 shown in FIG. 9, all conversion tables for converting the forward reference picture to a forward reference picture number may be initialized to "0". This also makes it possible to perform a substitute process in the temporal direct mode.

<5-2. Determining Motion Vector>

In Embodiment 1, in step S310, the substitute process performing unit 110 uses the reference motion vector as it is, to continue the temporal direct mode.

This eliminates the necessity of the substitute process regarding the motion vector, thus facilitating the implementation.

The method of determining a motion vector recited in Embodiment 1 is effective, especially when there is little difference in the display time information between reference picture P1, which would be used conventionally, and picture B3 that is used in the present embodiment.

<5-3. Summary>

Figure 15:
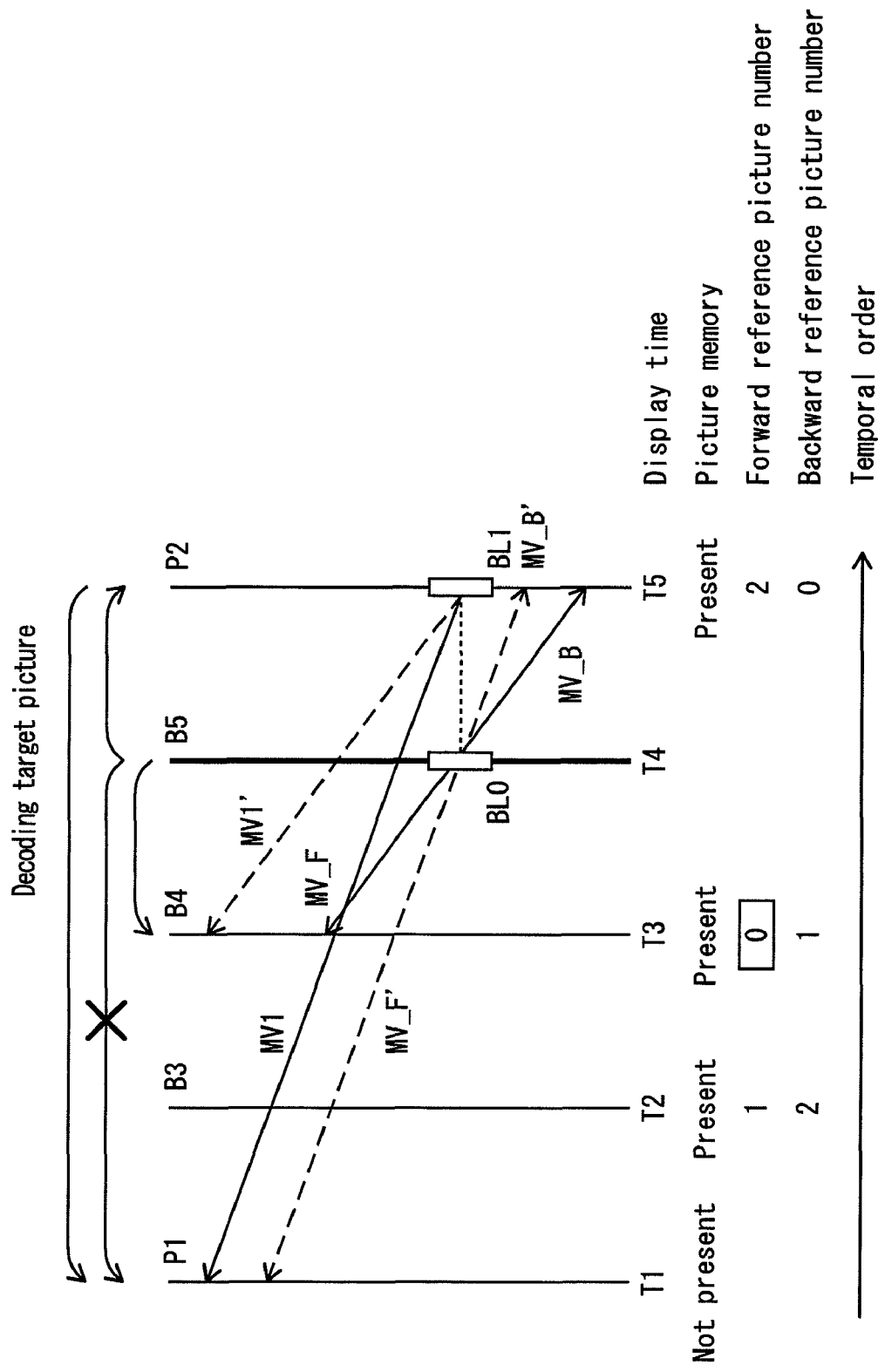
FIG. 15 shows an example of a case where the moving picture decoding device 100 in Embodiment 1 of the present invention substitutes forward reference picture number "0" for a forward reference picture.

FIG. 15 illustrates the substitute process in the temporal direct mode in Embodiment 1.

As shown in FIG. 15, the substitute process performing unit 110 continues the decoding in the temporal direct mode by using picture B4 having forward reference picture number "0" as a substitute for the forward reference picture of the decoding target block.

With the above-described operation, the moving picture decoding device 100 can continue the decoding in the temporal direct mode even if it cannot refer to the forward reference picture of the decoding target block.

<Embodiment 2>

Embodiment 2 differs from Embodiment 1 in the method of determining the forward reference picture.

The substitute process described in Embodiment 1 can be implemented easily. However, when the reference picture of the anchor block is greatly different from the picture having forward reference picture number "0" in the display time, the difference between the pictures in the image is also great. This may result in data of the reference picture that is greatly different from what is should be.

It is highly possible that the problem is solved when a picture that is closest to the proper reference picture in display order is selected as the reference picture.

In view of the above, in Embodiment 2, in step S308, the display time information of a picture referred to by the anchor block is compared with the display time information of a picture contained in the forward reference picture list, and the closest picture is determined as the forward reference picture.

Figure 16:
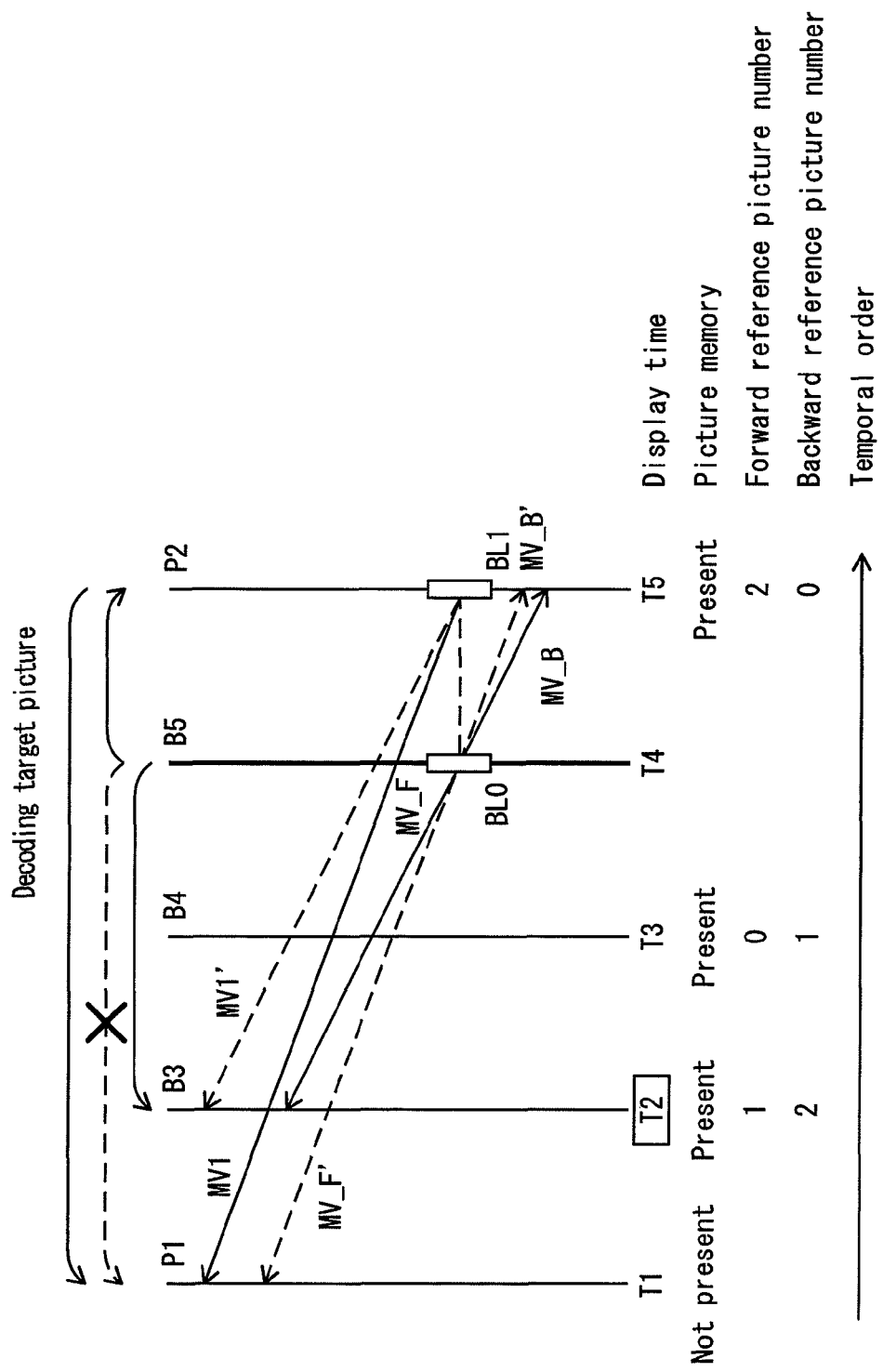
FIG. 16 shows an example of a case where the moving picture decoding device 100 in Embodiment 2 of the present invention substitutes a picture having a close display time for a forward reference picture.

FIG. 16 illustrates the substitute process in the temporal direct mode in Embodiment 2.

The picture referred to by the anchor block is picture P1, and its display order information is T1. Pictures B4, B3 and P2 are contained in the forward reference picture list. Among these, picture B3 has the display order information that is closest to T1. The substitute process performing unit 110 continues the temporal direct mode by using picture B3 as the forward reference picture. With this structure, it is possible to output a picture that is close to a picture specified by the encoded sequence, and continue the decoding.

The anchor picture can be determined as the backward reference picture (step S309) as in the regular decoding process in the temporal direct mode (steps S301 through S306).

<Embodiment 3>

Embodiment 3 differs from Embodiments 1 and 2 in the method of determining the motion vector.

In Embodiments 1 and 2, the substitute process performing unit 110 uses the reference motion vector as it is in step S310. However, with this method, as shown in FIG. 15, both forward reference vector MV_F and backward reference vector MV_B greatly differ in slant from the original reference vector MV1. When this happens, a picture that is positioned upper than the original is obtained from the forward reference picture, and a picture that is positioned lower than the original is obtained from the backward reference picture. As a result, the errors of both may be offset with each other.

Furthermore, in the substitute process in Embodiment 2, as shown in FIG. 16, when the original reference picture P1 is greatly different in display time information from picture B3 that is used in the present embodiment, both forward reference vector MV_F and backward reference vector MV_B differ in slant from the original reference vector MV1. When this happens, there is a possibility that only the decoding target block becomes a picture that lacks continuity both temporally and spatially.

In view of the above, in Embodiment 3, the substitute process performing unit 110, in step S310, sets the motion vector to "0" for a reference picture that is close to the decoding target picture in display time.

Figure 17:
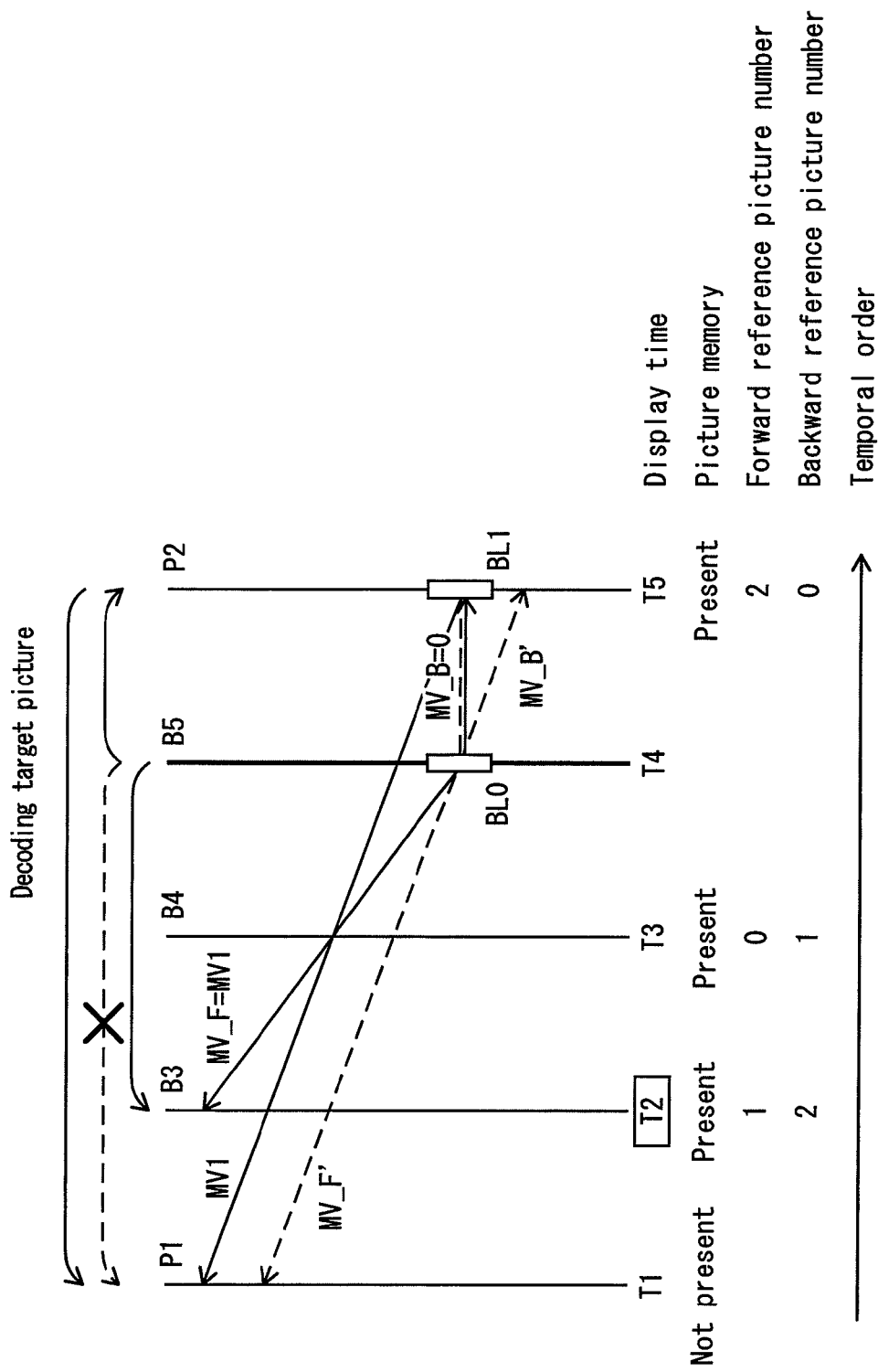
FIG. 17 shows an example of a case where the moving picture decoding device 100 in Embodiment 3 of the present invention sets one motion vector to a reference motion vector and sets the other to "0".

FIG. 17 illustrates the substitute process in the temporal direct mode in Embodiment 3.

The anchor picture is a backward reference picture having backward reference picture number "0" with respect to the decoding target picture. A picture (picture P2) that is close in display time to the decoding target picture (picture B5) is set. In such a state, it is possible to set the backward reference motion vector to "0". With regard to the forward reference picture, the display time (T2) thereof is not close to the display time (T4) of the decoding target picture. In such a case, the reference vector may be used as it is as the forward reference motion vector, or a value scaled based on the algorithm for the temporal direct mode may be used. FIG. 17 shows the case where the former method is used.

<Embodiment 4>

Embodiment 4 differs from Embodiment 3 in the method of determining the motion vector.

In Embodiment 3, the substitute process performing unit 110 does not set the motion vector to "0" with regard to the forward reference picture since the display time thereof is not close to the display time of the decoding target picture.

However, when, as in Embodiment 1, a picture having forward reference picture number "0" is determined as the forward reference picture, a reference picture that is close to the decoding target picture in display time is set in general.

In view of the above, in Embodiment 4, in step S310, the substitute process performing unit 110 sets the forward reference motion vector to "0", as well.

Figure 18:
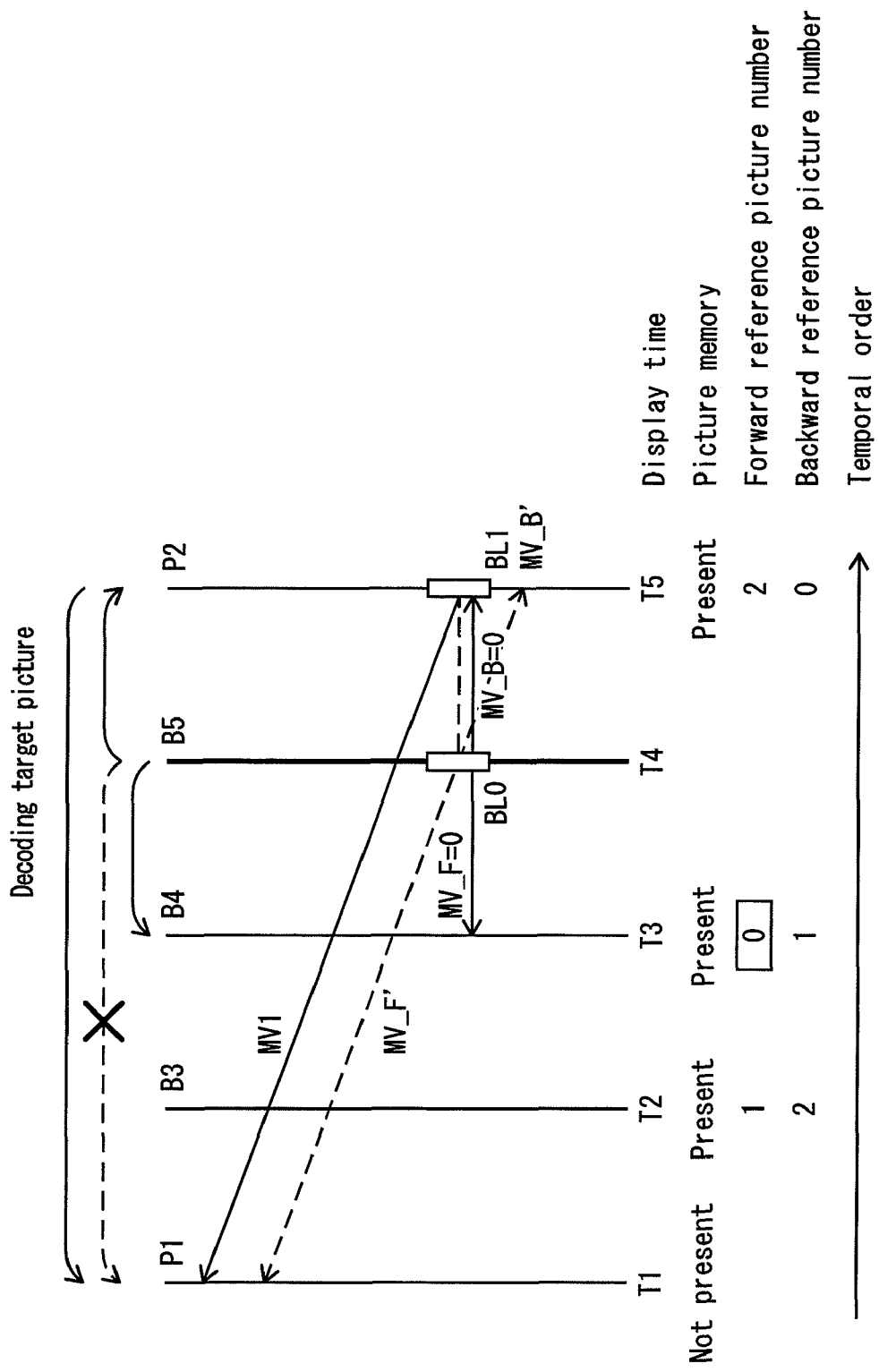
FIG. 18 shows an example of a case where the moving picture decoding device 100 in Embodiment 4 of the present invention sets a motion vector to "0".

FIG. 18 illustrates the substitute process in the temporal direct mode in Embodiment 4.

As shown in the drawing, in the present embodiment, since the decoding target picture B5 is close to both backward reference picture P2 and forward reference picture B4 in display time, both the forward reference motion vector and the backward reference motion vector are set to "0". In this case, the decoding target picture B5 has a mean value of display time between picture P2 and picture B4 both close to the target picture. This makes it possible to expect a temporal continuity.

<Embodiment 5>

Embodiment 5 differs from Embodiments 1 through 4 in the method of determining the motion vector.

According to Embodiments 1 through 4, there may be a case where a moving picture obtained as a result of decoding does not temporally change (scale) smoothly although it does originally, due to the difference in slant between the original reference motion vector and the motion vector that is actually used in reference of the decoding target block.

In view of the above, in Embodiment 5, in step S310, the substitute process performing unit 110 applies the concept of scaling in the temporal direct mode to the motion vector used in the substitute process.

Figure 19:
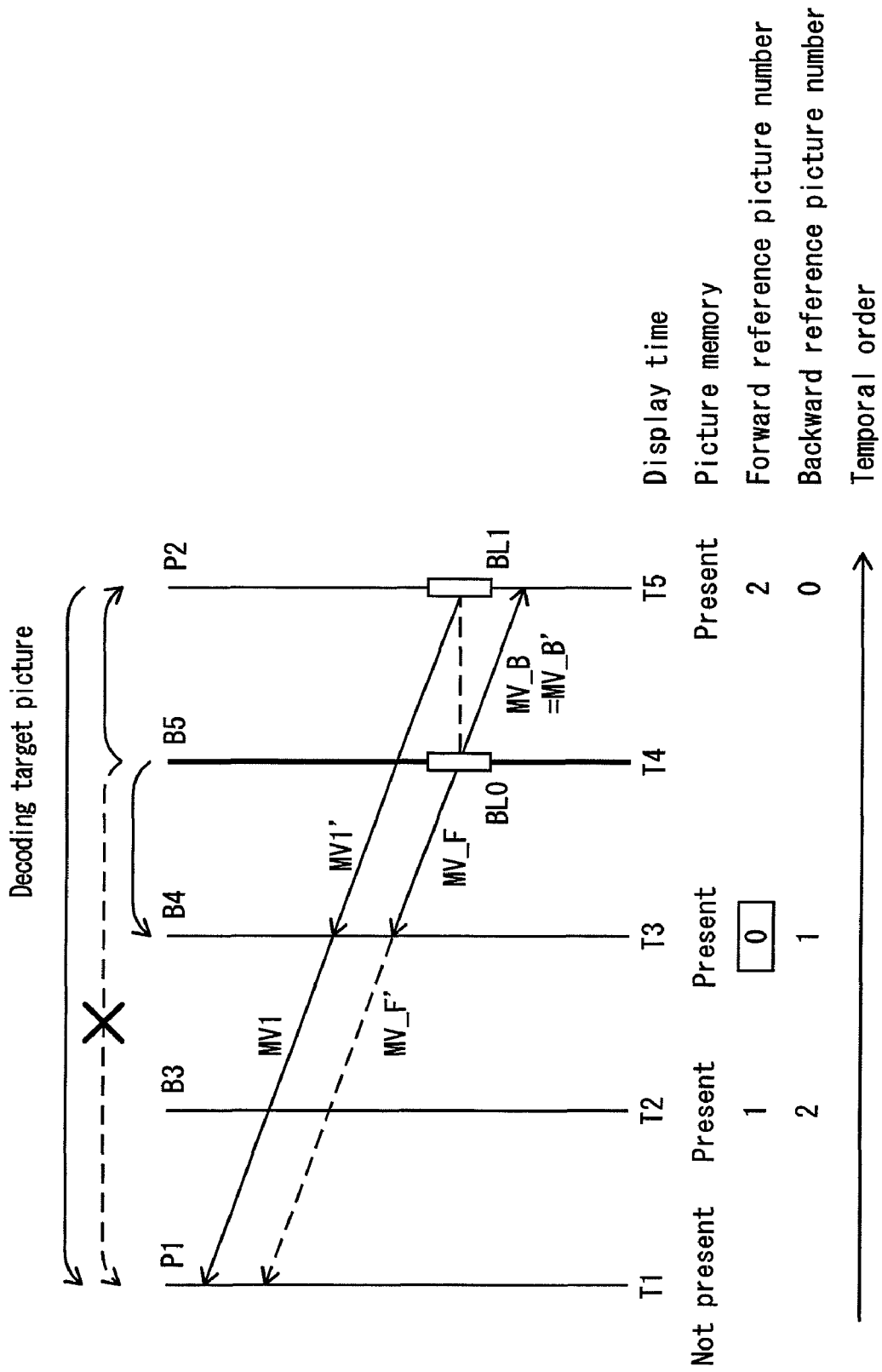
FIG. 19 shows an example of a case where the moving picture decoding device 100 in Embodiment 5 of the present invention substitutes for a motion vector only in backward reference direction.

FIG. 19 illustrates the substitute process in the temporal direct mode in Embodiment 5.

Original reference motion vectors of the decoding target block, namely forward reference vector MVf' and backward reference vector MVb' are obtained by Equation 2 as follows.

$$MVf'=(T4-T1)/(T5-T1)\times MV$$

$$MVb'=(T5-T4)/(T5-T1)\times MV \quad \text{Equation 2}$$

In Embodiment 5, since the forward reference picture is not picture P1 (display time: T1) but is picture B4 (display time: T3), the motion vector is scaled in accordance with this difference in display time.

That is to say, motion vectors after the scaling, namely forward reference vector MVf and backward reference vector MVb are obtained by Equation 3 as follows.

$$MVf=(T4-T1)/(T5-T1)\times MVf'=(T4-T3)/(T5-T1)\times MV$$

$$MVb=MVb'=(T5-T4)/(T5-T1)\times MV \quad \text{Equation 3}$$

In the calculation of MVf and MVb based on Equation 3 shown above, required are not only display numbers of the decoding target picture and the anchor picture, but display numbers of forward reference pictures respectively referred to by the anchor block and the decoding target picture.

It should be noted here that whether or not to add the prediction error in the substitute process is not defined here. The prediction error may be added in the same manner as in the regular process, or the prediction error may not be converted since it is the substitute process.

<Embodiment 6>

Embodiment 6 differs from Embodiments 1 through 5 in the method of performing the substitute process.

In Embodiments 1 through 5, the substitute process performing unit 110 performs the substitute process in the temporal direct mode (steps S307 through S310). In Embodiment 6, the substitute process performing unit 110 performs the substitute process in the spatial direct mode (step S311).

In the spatial direct mode, as in the temporal direct mode, reference pictures and motion vectors are not necessary for the streams. Also, in the spatial direct mode, the forward reference picture of the anchor block needs not be present. Accordingly, even if the temporal direct mode is not available, the spatial direct mode can be performed as a substitute process (step S311)

Figure 43:
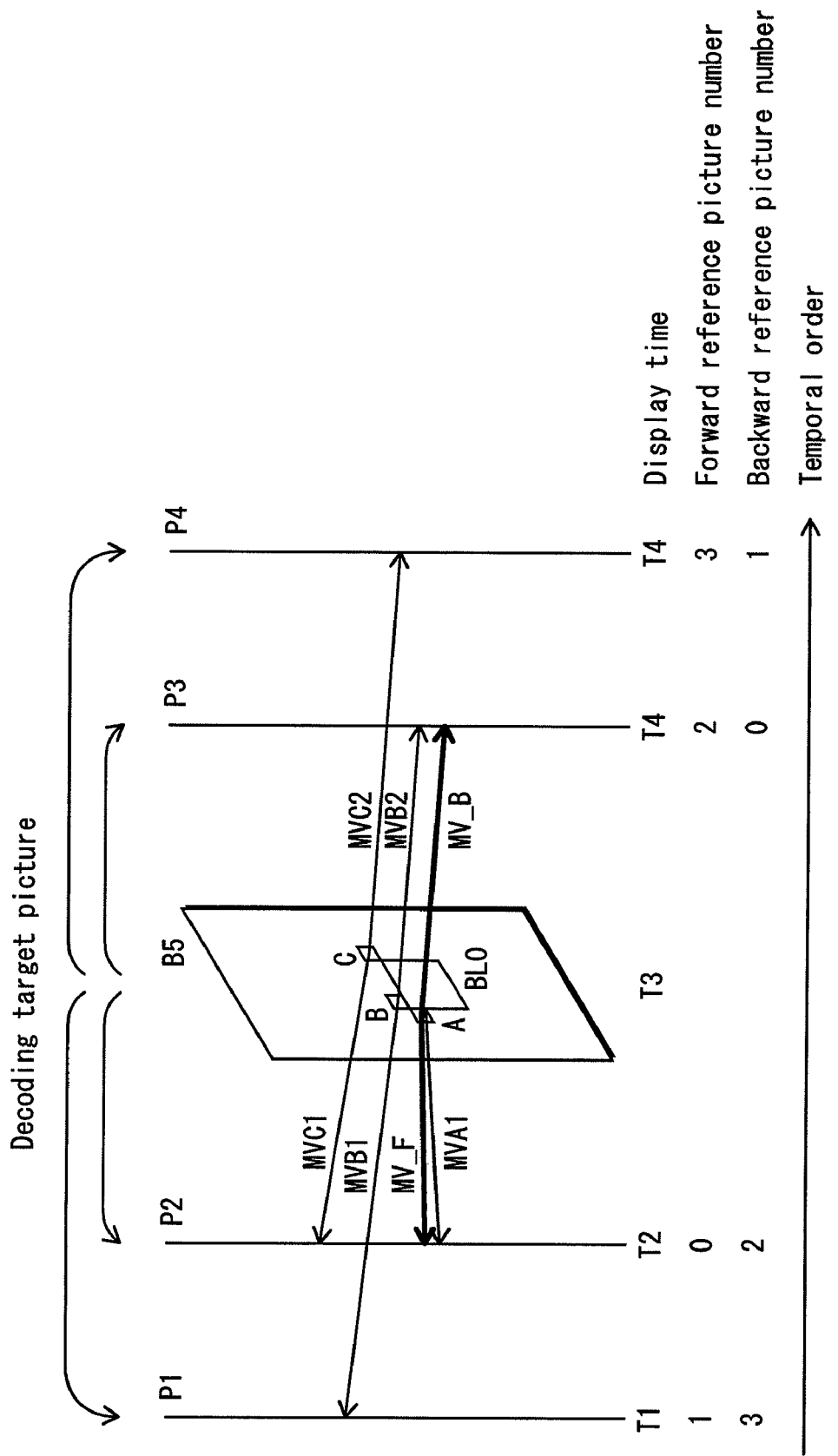
FIG. 43 shows an example of decoding in the temporal direct mode.
Figure 44A:
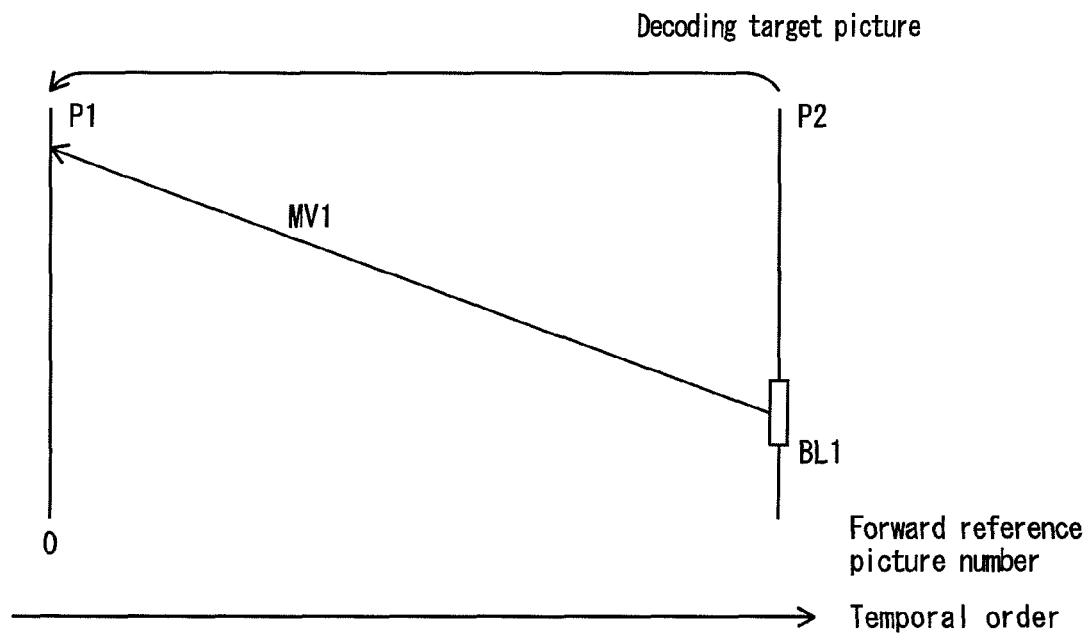
FIG. 44 shows an example of a case where decoding in the temporal direct mode is not possible.
Figure 44B:
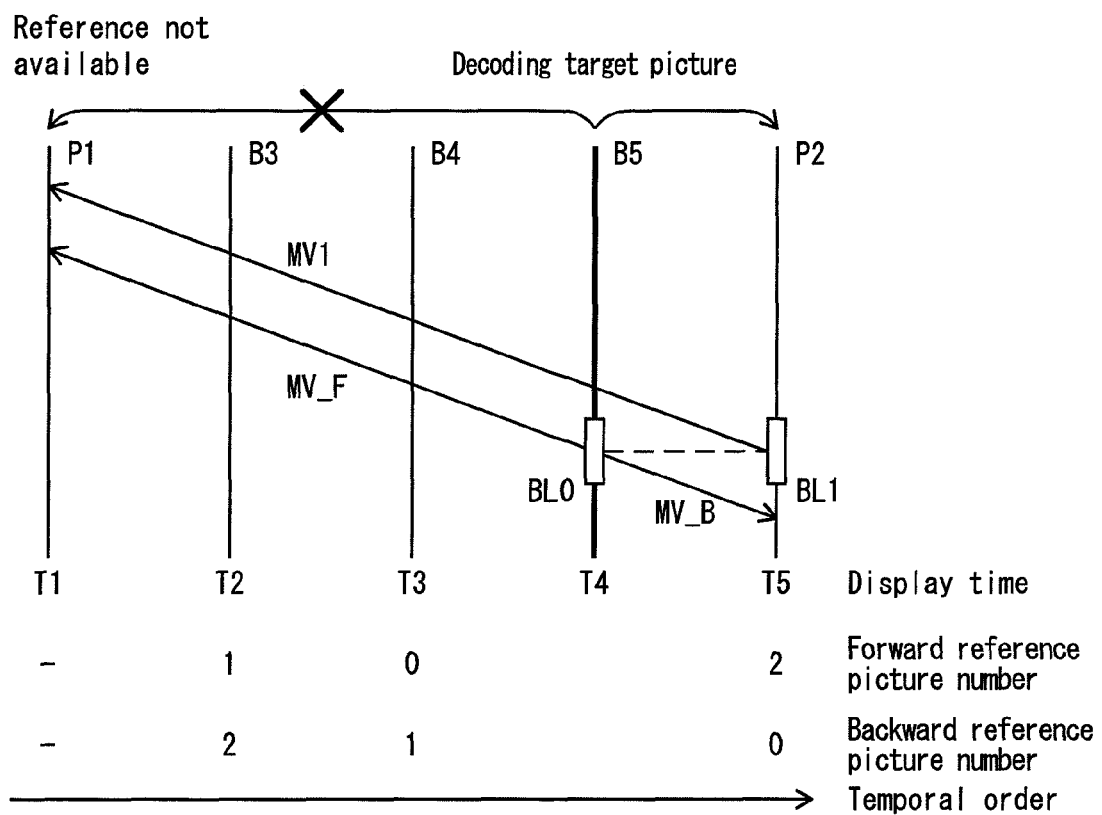

The method of realizing the spatial direct mode is the same as that of a conventional technology shown in FIG. 43, and thus description thereof is omitted here.

It should be noted here that whether or not to add the prediction error in the substitute process is not defined here. The prediction error may be added in the same manner as in the regular process, or the prediction error may not be converted since it is the substitute process.

<Embodiment 7>

Embodiment 7 differs from Embodiments 1 through 6 in the method of performing the substitute process.

In Embodiments 1 through 5, the substitute process performing unit 110 performs the substitute process in the temporal direct mode (steps S307 through S310), and in Embodiment 6, the substitute process performing unit 110 performs the substitute process in the spatial direct mode (step S311). In Embodiment 7, the substitute process performing unit 110 performs the substitute process by a method other than direct modes (step S312).

For example, in the direct modes, only the bi-directional reference (forward reference and backward reference) is performed. However, for B-pictures, only the forward reference or only the backward reference may be performed.

Making use of the above, in step S312, the substitute process performing unit 110 performs decoding by referring to only a backward reference picture that can be referred to, not referring to a forward reference picture.

Figure 20:
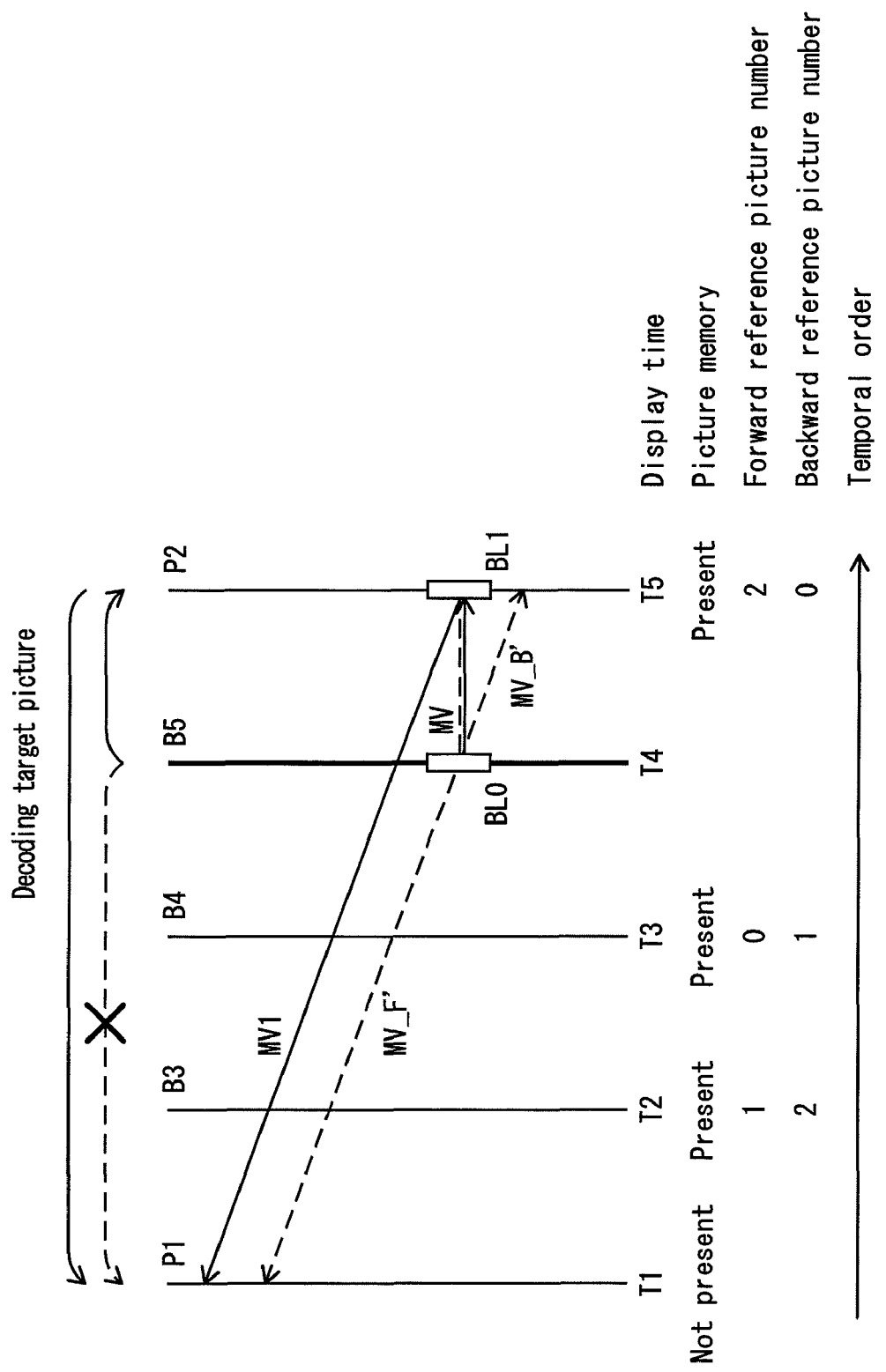
FIG. 20 shows an example of a case where the moving picture decoding device 100 in Embodiment 7 of the present invention substitutes for a motion vector only in backward reference direction.

FIG. 20 illustrates the substitute process in which the motion compensation is performed only with the backward reference.

In the present embodiment, as shown in the drawing, the decoding target block of decoding target picture B5 is decoded in a decoding mode in which only the backward reference (picture P2) is performed. In this case, the reference motion vector can be determined by the same method as that used in the substitute process in the temporal direct mode described in Embodiments 1 through 5. FIG. 20 shows, as one example, a backward reference in the method where the motion vector is set to "0" (Embodiment 4).

It should be noted here that whether or not to add the prediction error in the substitute process is not defined here. The prediction error may be added in the same manner as in the regular process, or the prediction error may not be converted since it is the substitute process.

<Embodiment 8>

Embodiment 8 differs from Embodiments 1 through 7 in the method of performing the substitute process.

According to the approaches taken in Embodiments 1 through 7, the moving picture decoding device 100 continues the decoding by applying the substitute process only to the decoding target block of the decoding target picture (steps S307 through S312).

However, the fact that such a substitute process is required for a certain block means that a similar substitute process might be required for an adjacent block. Furthermore, there is a possibility that an error is inserted into part of an encoded sequence input into the moving picture decoding device 100 for some reason, resulting in an erroneous decoding. When this happens, a substitute process that is restricted to a specific block may output a decoding result that is greatly different from an expected result.

In view of the above, in Embodiment 8, the substitute process performing unit 110 performs the substitute process in units of slices or pictures (step S313), in place of steps S307 through S312.

The substitute process is performed in the present embodiment as follows. That is to say, decoding a stream corresponding to a target picture is stopped, and the substitute process described in any of Embodiments 1 through 7 is performed with respect to all the blocks belonging to the target picture or with respect to all the blocks belonging to a target slice.

The substitute process performing unit 110 may adopt any other method, such as a method of copying data of a picture that has been decoded most recently, or a method of copying data of a picture that has been displayed most recently.

Figure 21:
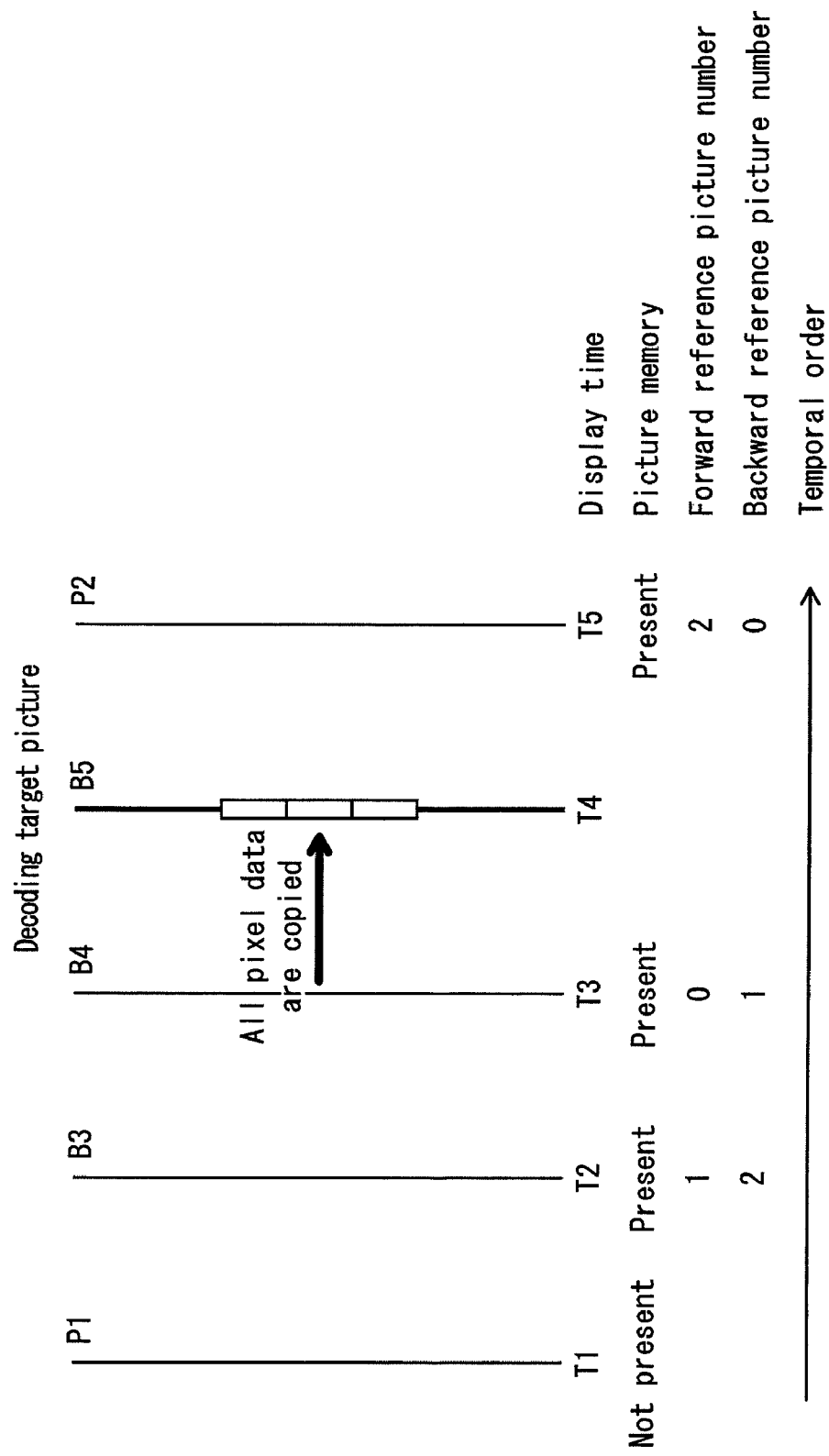
FIG. 21 shows an example of a case where the moving picture decoding device 100 in Embodiment 8 of the present invention performs an all-pixel copy as the substitute process.

FIG. 21 shows an example of the method of copying data of a picture that has been decoded most recently.

In this example, the pictures are decoded in the order of P1, P2, B3, B4, B5. The picture decoded immediately before picture B5 is picture B4. When a substitute process occurs in picture B5, a decoding result with high continuity between pictures is obtained when pixel data of picture B4 is copied to picture B5. This method can be applied to slices, as well as to pictures.

<Embodiment 9>

Embodiment 9 differs from Embodiments 1 through 8 in the condition under which the substitute process performing unit 110 performs the substitute process.

Figure 22:
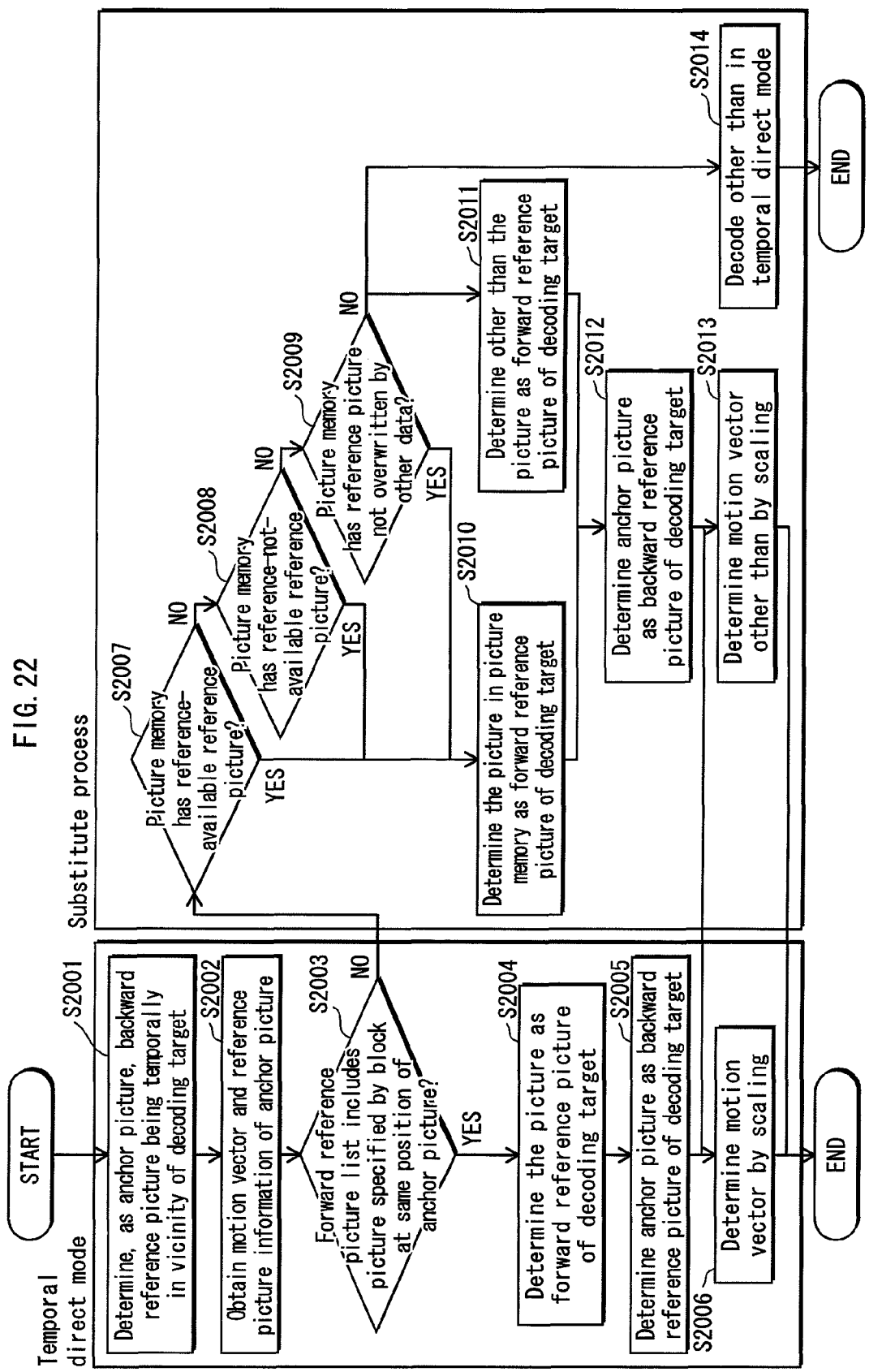
FIG. 22 shows an example of the procedure of the substitute process performed by the moving picture decoding device 100 in Embodiment 9 of the present invention.

FIG. 22 is a flowchart showing the operation of the substitute process performing unit 110 in Embodiment 9.

Figure 3:
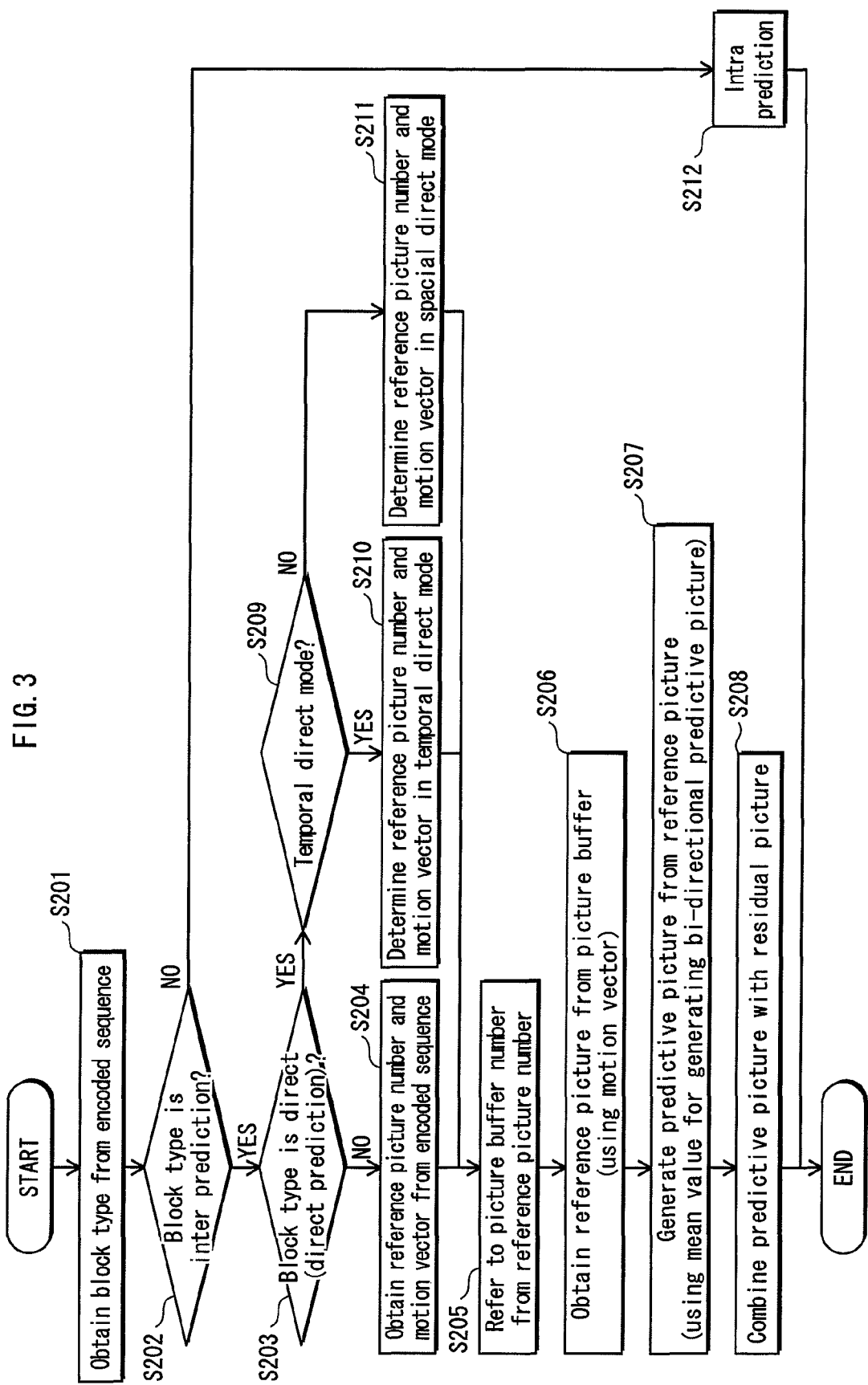
FIG. 3 shows an example of the procedure for decoding performed by the moving picture decoding device 100 in Embodiment 1 of the present invention.

Steps S2001 through S2006 in FIG. 22 are the same as steps S301 through S306 in FIG. 3 described in Embodiment 1, and description thereof is omitted here.

In the following, the substitute process (steps S2007 through S2014) will be described.

<1. Condition 1>

When it is judged in step S2003 that the substitute process needs to be performed (NO in step S2003), it is not always the case that the reference picture data itself has already been lost from the picture memory 103.

For example, the maximum number of pictures to be included in the forward reference picture list is determined from the stream. As a result, even if a reference picture exists in the picture memory 103 in a state where the reference picture can be referred to, the reference picture may not be included in the forward reference picture list.

The H.264 standard originally defines that in the above-described case, the reference picture, which exists in the picture memory 103 physically, should not be referred to and should not be decoded.

To solve the above-described problem, the substitute process performing unit 110 checks whether or not a forward reference picture of the anchor block exists in the picture memory 103 in a state where it can be referred to, and when the substitute process performing unit 110 confirms that the forward reference picture exists in such a state, the substitute process performing unit 110 performs the substitute process to determine the confirmed forward reference picture as the forward reference picture of the decoding target picture (not conforming to the original standard), and then performs the subsequent processes in the same manner as in the regular temporal direct mode (step S2007, steps S2010 through S2013)

Here will be described the process of steps S2007 and S2010 with reference to FIGS. 23 and 24.

Figure 23:
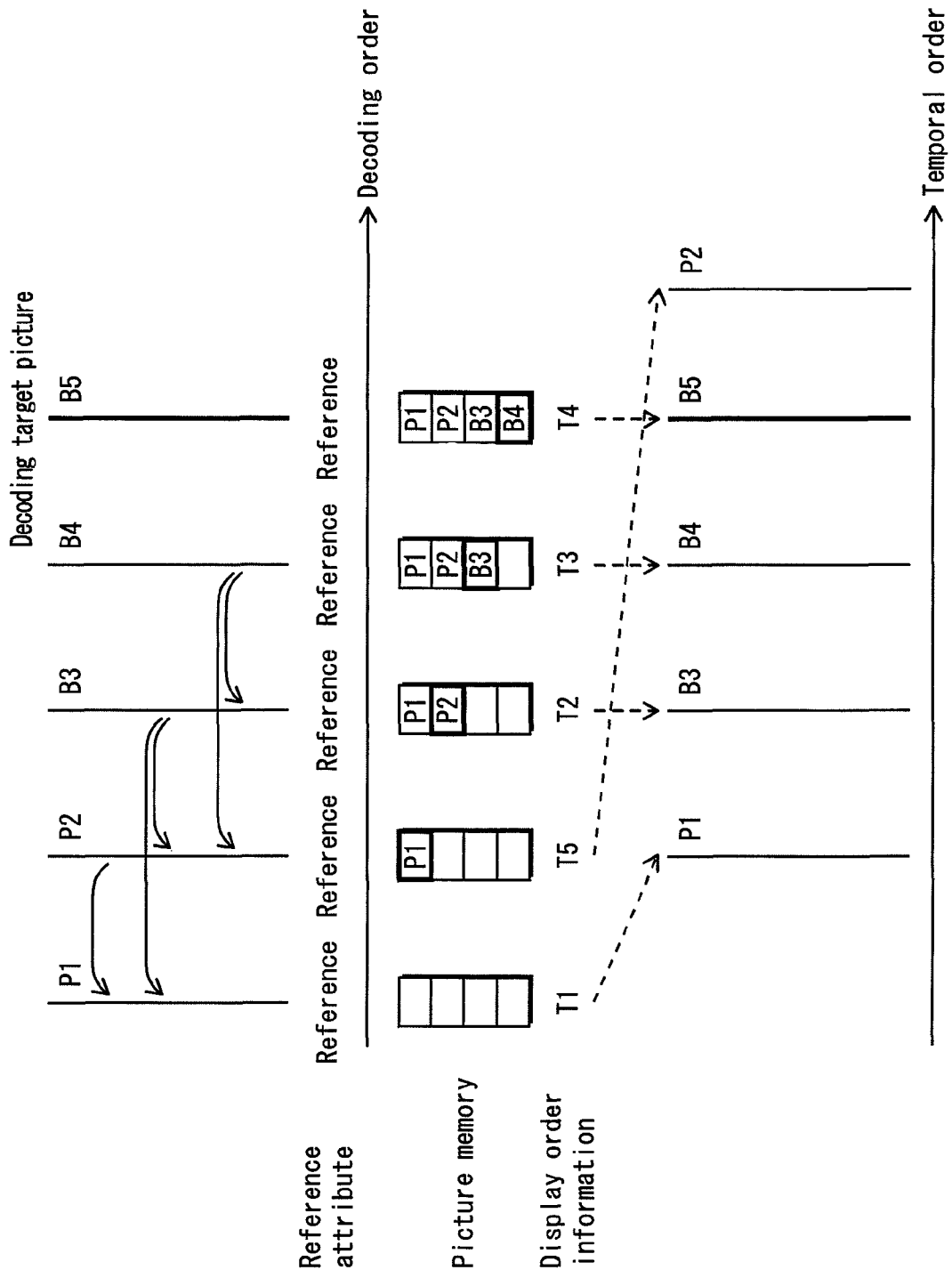
FIG. 23 shows a stream structure for explanation of a case where a forward reference picture does not exist in the forward reference picture list in the temporal direct mode.

FIG. 23 illustrates the decoding order of the pictures in a stream, relationships among display times, reference relationships among pictures, and the states of the picture memory 103.

When the capacity of the picture memory 103 is equal to the amount of four pictures, and when all of pictures P1, P2, B3 and B4 have the reference attribute, all of pictures P1, P2, B3 and B4 have been stored in the picture memory when picture B5 is decoded.

Figure 24:
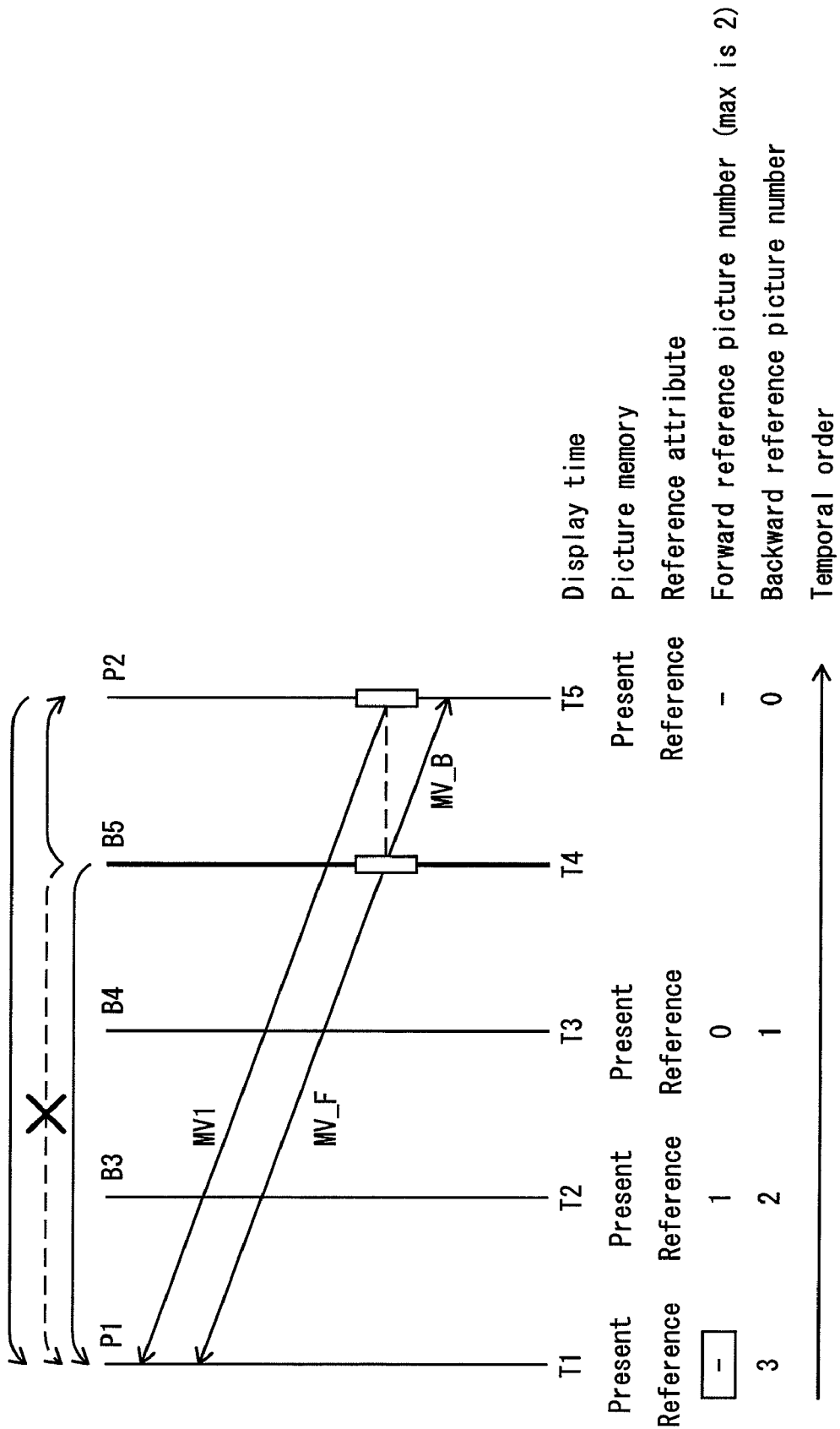
FIG. 24 shows a stream structure for explanation of a case where a forward reference picture does not exist in the forward reference picture list in the temporal direct mode.

FIG. 24 illustrates the case where the decoding target picture for the above-described stream is picture B5, and picture B5 is decoded in the temporal direct mode. When the stream defines that the maximum number of pictures to be included in the forward reference picture list is "2", only pictures B4 and B3 exist in the forward reference picture list when picture B5 starts to be decoded. The forward reference picture of the anchor block of picture B5 is picture P1, which is not included in the forward reference picture list. Accordingly, the substitute process needs to be performed.

As shown in FIG. 23, when picture B5 starts to be decoded, picture P1 has been stored in the picture memory 103 in a state where it can be referred to. Thus using it as the reference picture, the substitute process can be performed.

<2. Condition 2>

The picture memory 103 may be controlled by the stream.

That is to say, according to the H.264 standard, a picture memory control command can be embedded into a stream to remove the reference attribute from a picture (to make it non-reference) at a timing when another picture is decoded.

While a picture has the reference attribute, the picture can be referred to by other pictures, but once the attribute is changed to non-reference, the picture cannot be referred to by pictures that are decoded thereafter. After the attribute of a picture is changed to non-reference, whether to delete the picture from the picture memory 103 is determined based on the display attribute of the picture.

According to the H.264 standard, the decoding order and the display order can be determined arbitrarily. Accordingly, when a picture that was decoded later needs to be displayed earlier, it is necessary to keep the picture stored in the picture memory 103 as a precautionary measure, even when the picture is not to be used as a reference picture (the display attribute becomes non-display).

In the above-stated case, the picture exists in the picture memory 103 although the reference attribute thereof has been changed to non-reference.

For the above-stated circumstances, there may be a case where, even though a reference picture of the decoding target block exists in the picture memory 103, the reference picture cannot be referred to when the decoding target block is decoded because, at the time of the decoding, the reference attribute has not been assigned to the reference picture (non-reference).

To solve the problem, in the present embodiment, even though a forward reference picture of the anchor block existing in the picture memory 103 has the non-reference attribute, the substitute process performing unit 110 performs the substitute process to determine the existing forward reference picture as the forward reference picture of the decoding target picture (not conforming to the original standard), and then performs the subsequent processes in the same manner as in the regular temporal direct mode (step S2008, steps S2010 through S2013).

Here will be described the process of steps S2008 and S2010 with reference to FIGS. 25 and 26.

Figure 25:
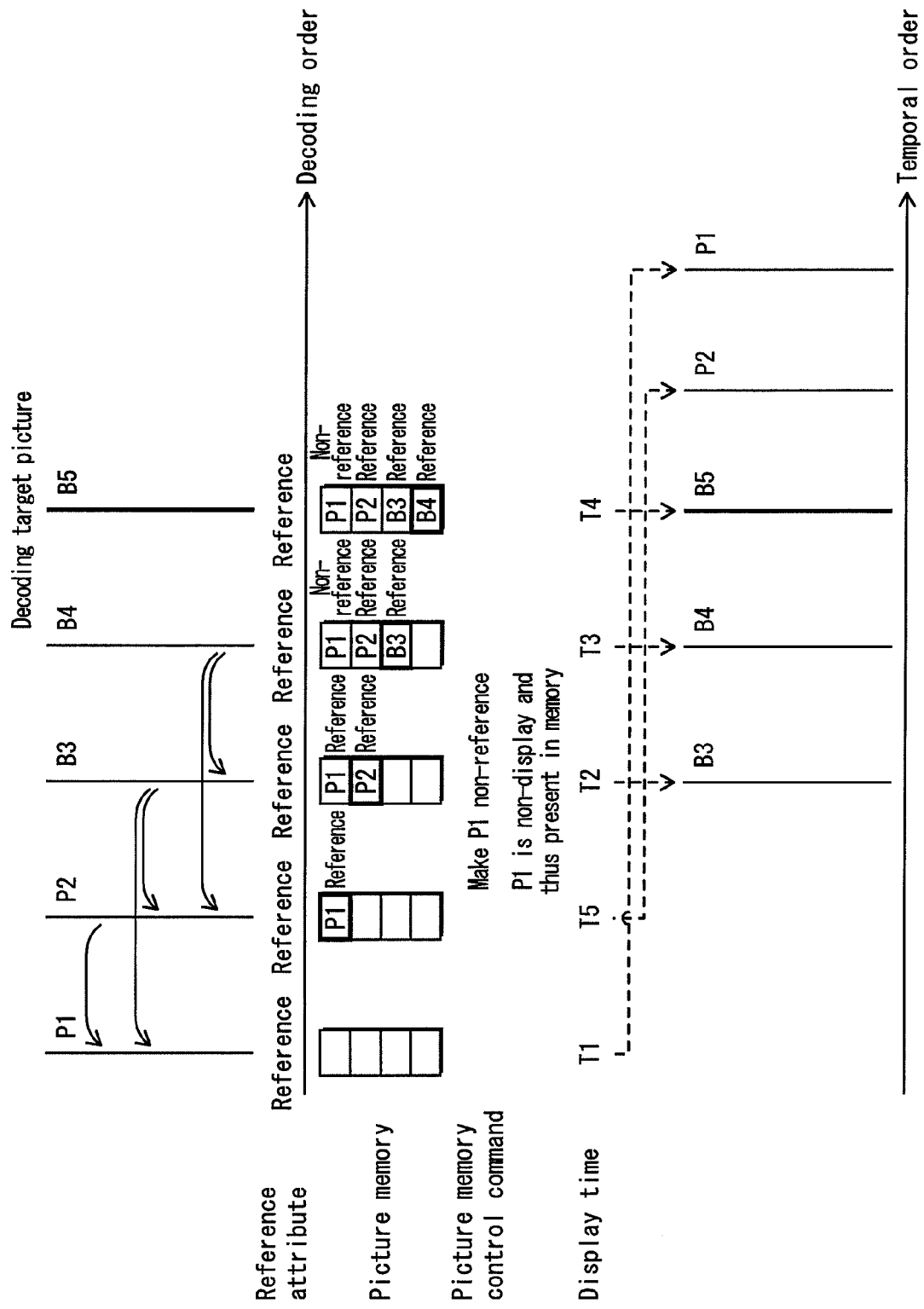
FIG. 25 shows a stream structure for explanation of a case where a forward reference picture is a non-reference picture.

FIG. 25 illustrates the decoding order of the pictures in a stream, relationships among display times, reference relationships among pictures, and the states of the picture memory 103.

It is assumed that the capacity of the picture memory 103 is equal to the amount of four pictures, and that all of pictures P1, P2, B3 and B4 have the reference attribute. When, during decoding of picture B3, it is found that the picture memory control command instructs for making picture P1 non-reference, picture P1 is made non-reference. However, at this time, pictures B4 and B5 that should be displayed before picture P1 have not been decoded yet, and thus the display attribute of picture P1 is non-display, and the use attribute of picture P1 is "in use". When picture B5 starts to be decoded, pictures P2, B3 and B4 are stored in the picture memory 103 in a state where they can be referred to, and picture P1 is stored in the picture memory 103 in a state where it cannot be referred to (non-reference).

Figure 26:
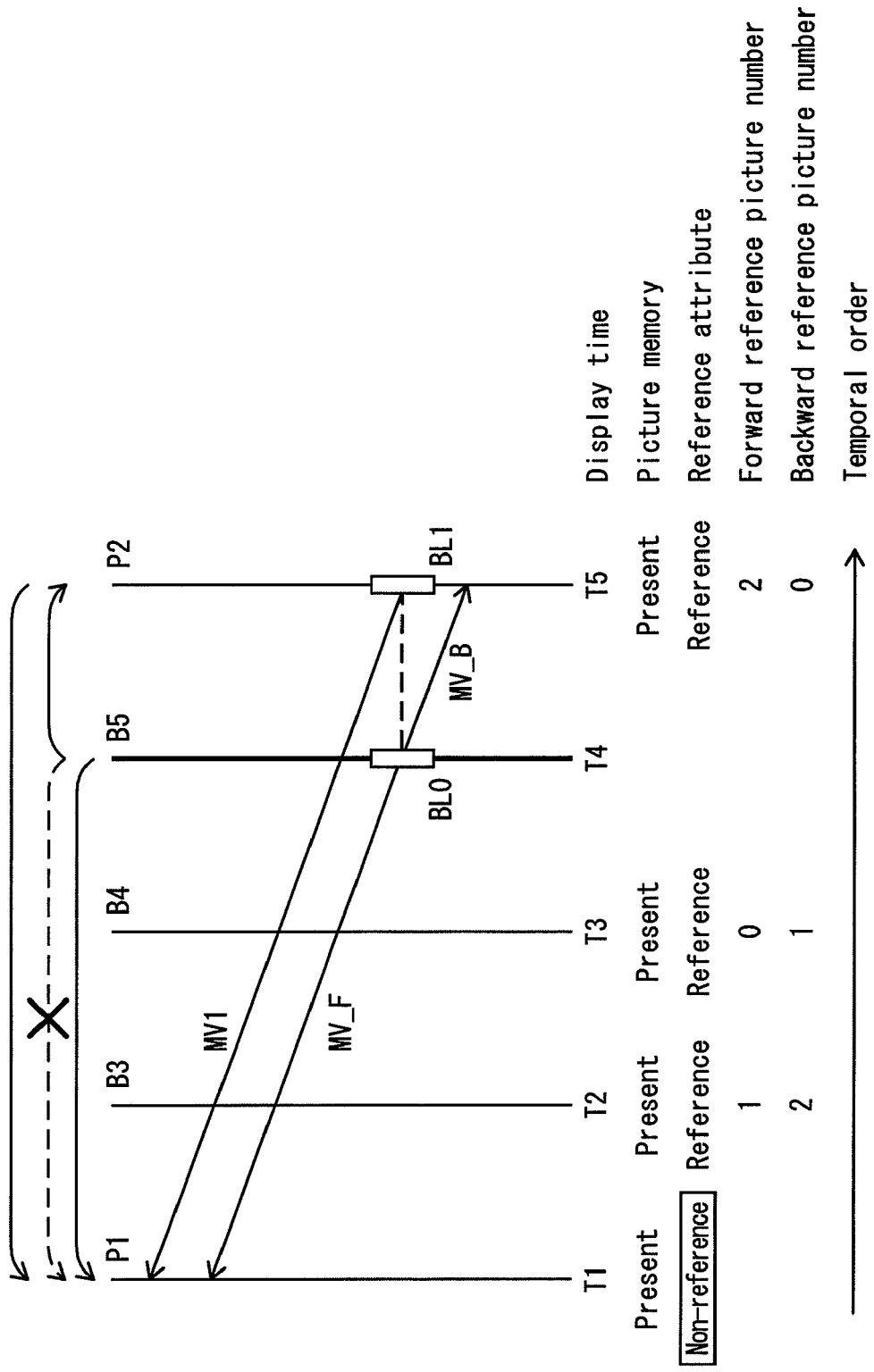
FIG. 26 shows an example of the substitute process performed by the moving picture decoding device 100 in Embodiment 9 when a forward reference picture is a non-reference picture.

FIG. 26 illustrates the case where the decoding target picture for the above-described stream is picture B5, and picture B5 is decoded in the temporal direct mode.

Since picture P1 is "non-reference", it is not included in the forward reference picture list of picture B5. The forward reference picture of the anchor block of picture B5 is picture P1, which is not included in the forward reference picture list. Accordingly, the substitute process needs to be performed.

As shown in FIG. 25, when picture B5 starts to be decoded, picture P1 is stored in the picture memory 103 in a state where it cannot be referred to (non-reference), but as "in use". Thus regarding it as the reference picture, the substitute process can be performed.

<3. Condition 3>

When a picture has already been displayed (its display attribute is "displayed") at the time when the reference attribute of the picture is changed to "non-attribute", there is no need to keep the picture stored in the picture memory 103. In this case, the picture memory is opened (the use attribute is "unused")

However, after the use attribute is changed to "unused" when the picture memory is opened, all information necessary for referring to the picture, such as pixel information of the picture, remain in the picture memory 103 unless another picture overwrites its area.

However, according to the H.264 standard, when the picture is specified as the forward reference picture of the anchor picture, it becomes impossible to perform decoding by referring to the reference picture although the reference picture exists in the picture memory 103.

To solve the problem, in the present embodiment, even though the use attribute of a reference picture existing in the picture memory 103 has been changed to "unused", the substitute process performing unit 110 determines the picture in the picture memory 103 as the forward reference picture of the decoding target picture (not conforming to the original standard), and then performs the subsequent processes in the same manner as in the regular temporal direct mode (step S2009, steps S2010 through S2013).

Here will be described the process of steps S2009 and S2010 with reference to FIGS. 27 and 28.

Figure 27:
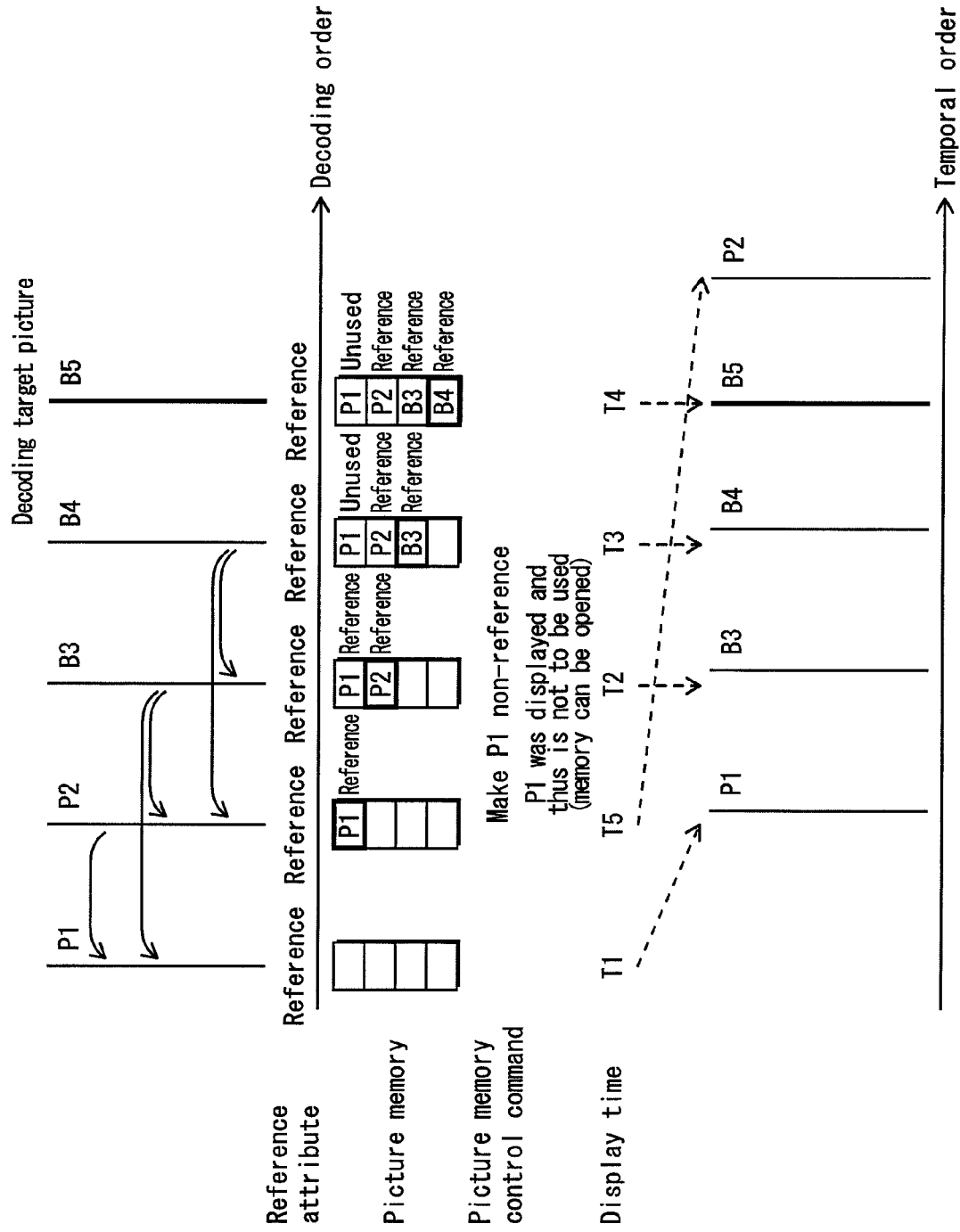
FIG. 27 shows a stream structure for explanation of a case where a forward reference picture is an unused picture in the temporal direct mode.

FIG. 27 illustrates the decoding order of the pictures in a stream, relationships among display times, reference relationships among pictures, and the states of the picture memory 103.

It is assumed that the capacity of the picture memory 103 is equal to the amount of four pictures, and that all of pictures P1, P2, B3 and B4 have the reference attribute.

When, during decoding of picture B3, it is found that the picture memory control command instructs for making picture P1 non-reference, the display attribute of picture P1 is changed to "displayed" and the use attribute is set to "unused" because there is no picture that needs to be displayed before picture P1.

After pictures B3 and B4 are decoded, the pictures should be stored into a picture buffer. However, since there is a free space, other than an area used for picture P1, for storing two pictures, the free space is first used for storing the pictures.

Accordingly, when picture B5 starts to be decoded, pictures P2, B3 and B4 are stored in the picture memory 103 in a state where they can be referred to, and picture P1 is stored (although in the "unused" area) in the picture memory 103.

Figure 28:
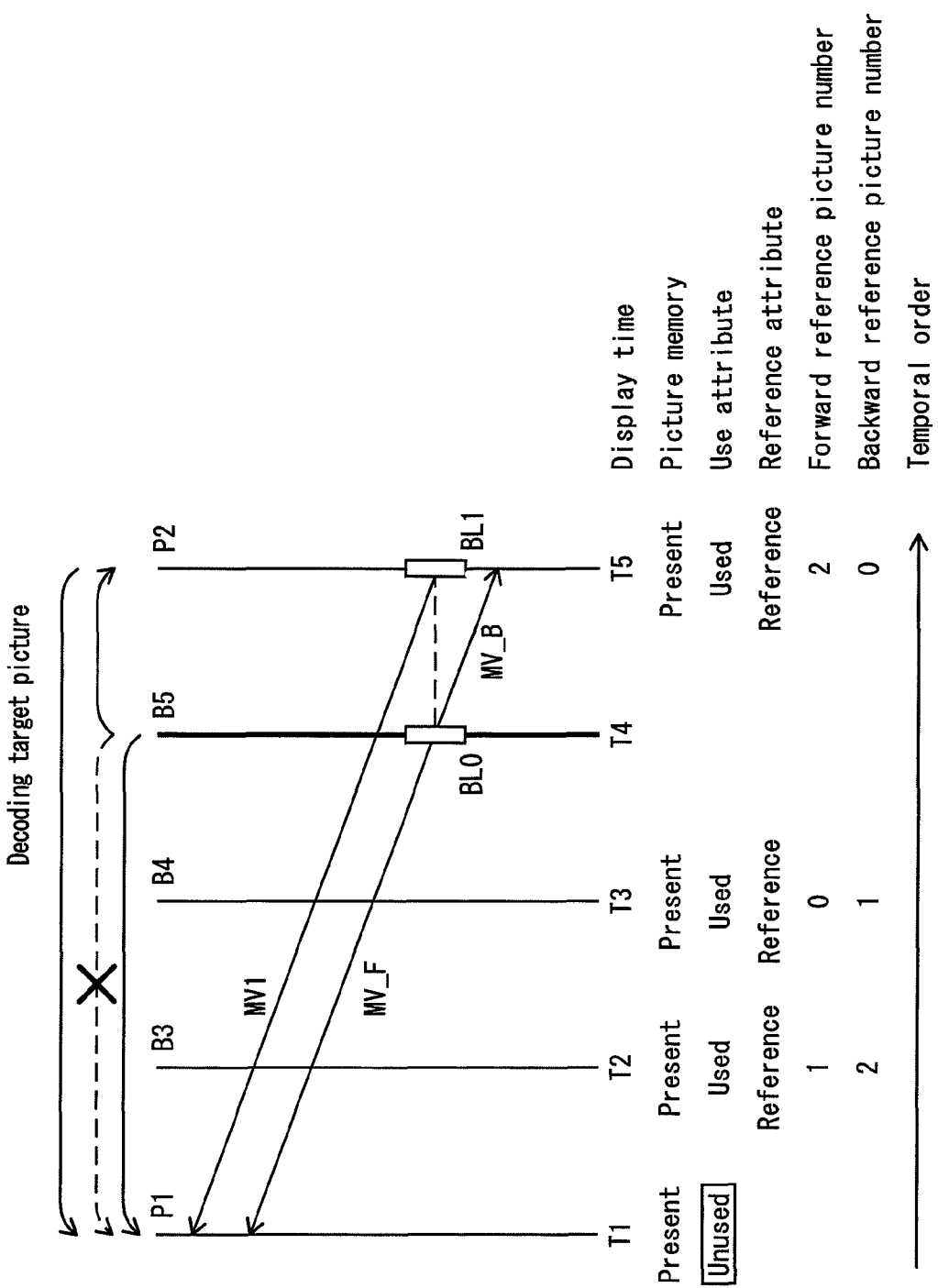
FIG. 28 shows an example of the substitute process performed by the moving picture decoding device 100 in Embodiment 9 when a forward reference picture is an unused picture in the temporal direct mode.

FIG. 28 illustrates the case where the decoding target picture for the above-described stream is picture B5, and picture B5 is decoded in the temporal direct mode.

Since picture P1 is "unused", it is not included in the forward reference picture list of picture B5. The forward reference picture of the anchor block of picture B5 is picture P1, which is not included in the forward reference picture list. Accordingly, the substitute process needs to be performed.

As shown in FIG. 27, when picture B5 starts to be decoded, picture P1 is stored (although in the "unused" area) in the picture memory 103. Thus regarding it as the reference picture, the substitute process can be performed.

<4. Others>

When there is no reference picture in the picture memory 103, the substitute process can be performed in the manner described in any of Embodiments 1-8 (step S2011 or S2014).

<Embodiment 10>

Embodiment 10 differs from Embodiment 9 in the method for performing the substitute process.

In Embodiment 9, in step S2010, a picture not assigned with a reference picture number is determined as the reference picture.

However, the H.264 standard presumes that a reference picture is always included in the reference picture list. For example, it defines that, in the temporal direct mode, a forward reference picture number of a picture used as a reference picture should be obtained without fail.

Therefore, with no reference picture number, the motion compensation cannot be continued.

To solve the problem, in Embodiment 10, the moving picture decoding device 100 performs the substitute process.

Figure 29:
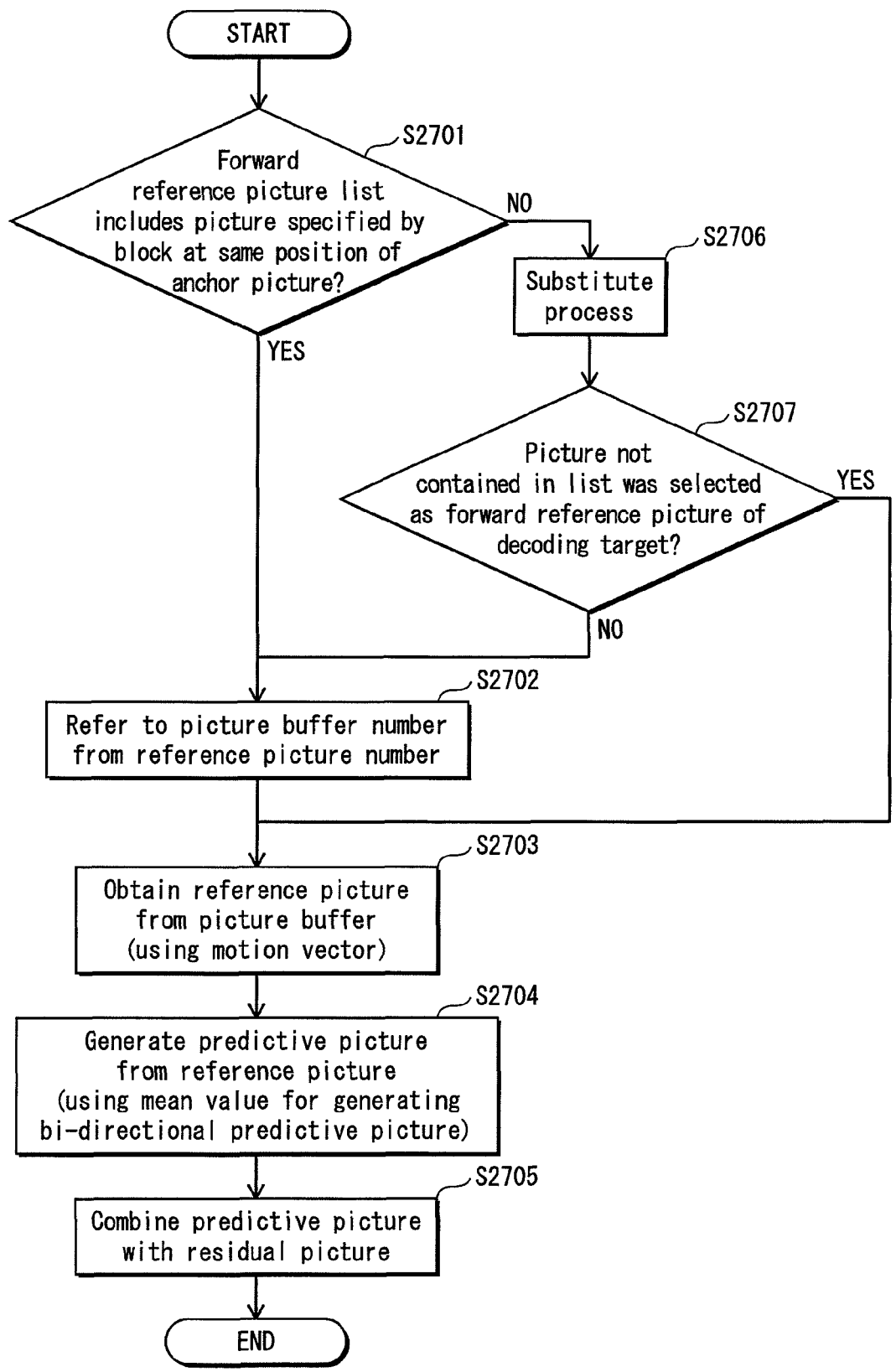
FIG. 29 shows an example of the procedure of decoding performed by the moving picture decoding device 100 in Embodiment 10 of the present invention.

FIG. 29 is a flowchart showing one example of the operation of the moving picture decoding device 100.

In the present embodiment, the substitute process branches depending on the result of a judgment on whether a picture not contained in the reference picture list was selected as a forward reference picture of the decoding target (step S2707).

When it is judged that a picture contained in the reference picture list was selected as the forward reference picture (NO in step S2707), the picture buffer number is referred to from the reference picture number (step S2702). On the other hand, when it is judged that a picture not contained in the reference picture list was selected as the forward reference picture (YES in step S2707), namely, when there is no reference picture number, the above-described process (step S2702) is skipped such that the succeeding process for the motion compensation can be performed in the same manner as in the regular motion compensation.

<Embodiment 11>

Embodiment 11 differs from Embodiment 10 in the method for performing the substitute process.

Here will be described another example of the operation of the moving picture decoding device 100.

Figure 30:
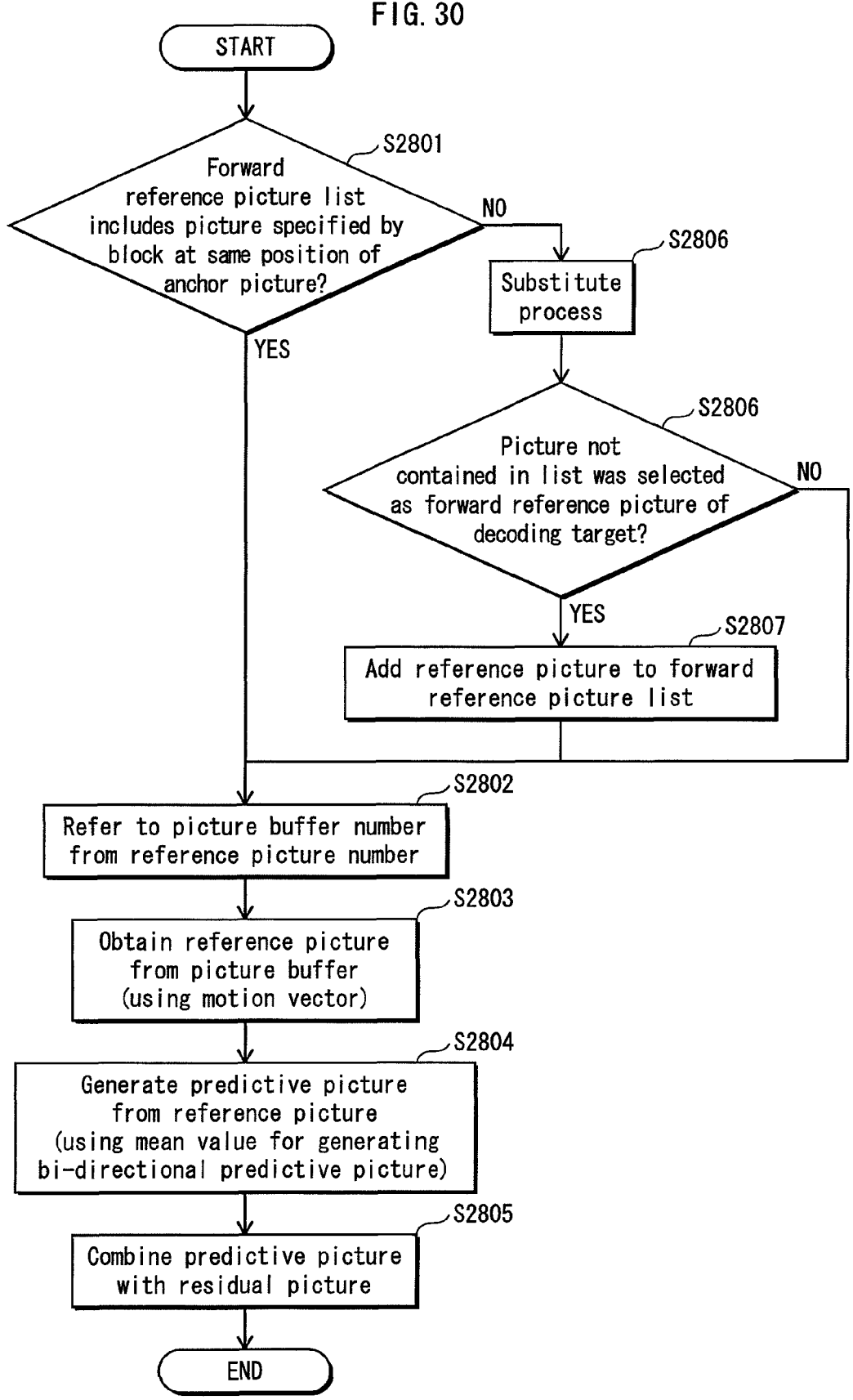
FIG. 30 shows an example of the procedure of decoding performed by the moving picture decoding device 100 in Embodiment 11 of the present invention.

FIG. 30 is a flowchart showing one example of the operation of the moving picture decoding device 100.

In the present embodiment, a reference picture number is newly assigned to a picture that is not included in the reference picture list (step S2807) such that the succeeding process for the motion compensation can be performed in the same manner as in the regular motion compensation.

It should be noted here that Embodiments 10 and 11 show examples of methods in which the motion compensation is performed using a reference picture that has no reference picture number, and that the motion compensation may be performed by any other method in so far as the above-described problem can be solved.

<Embodiment 12>

Embodiment 12 differs from Embodiments 1 through 11 in that it performs the substitute process by taking into consideration the weighted prediction defined in the H.264 standard.

The weighted prediction is used for predicting the brightness (luminance) of the picture, and is characterized by its effectiveness on pictures that are changing gradually in brightness (especially, fade-in or fade-out pictures).

The weighted prediction defined in the H.264 has two modes: explicit weighted mode; and implicit weighted mode.

The explicit weighted mode is used for embedding a weight coefficient for reference picture into the stream. The implicit weighted mode is used for determining a weight coefficient for reference picture by a ratio in display time with the reference picture, as is the case with the scaling process in the temporal direct mode.

That is to say, with regards to a B-picture, when the weighted prediction is not performed, a pixel value is obtained from a mean value of both reference pictures. On the other hand, when the weighted prediction is performed, a pixel value is obtained by multiplying both reference pictures by a predetermined coefficient.

<10-1. Explicit Weighted Prediction>

Figure 31:
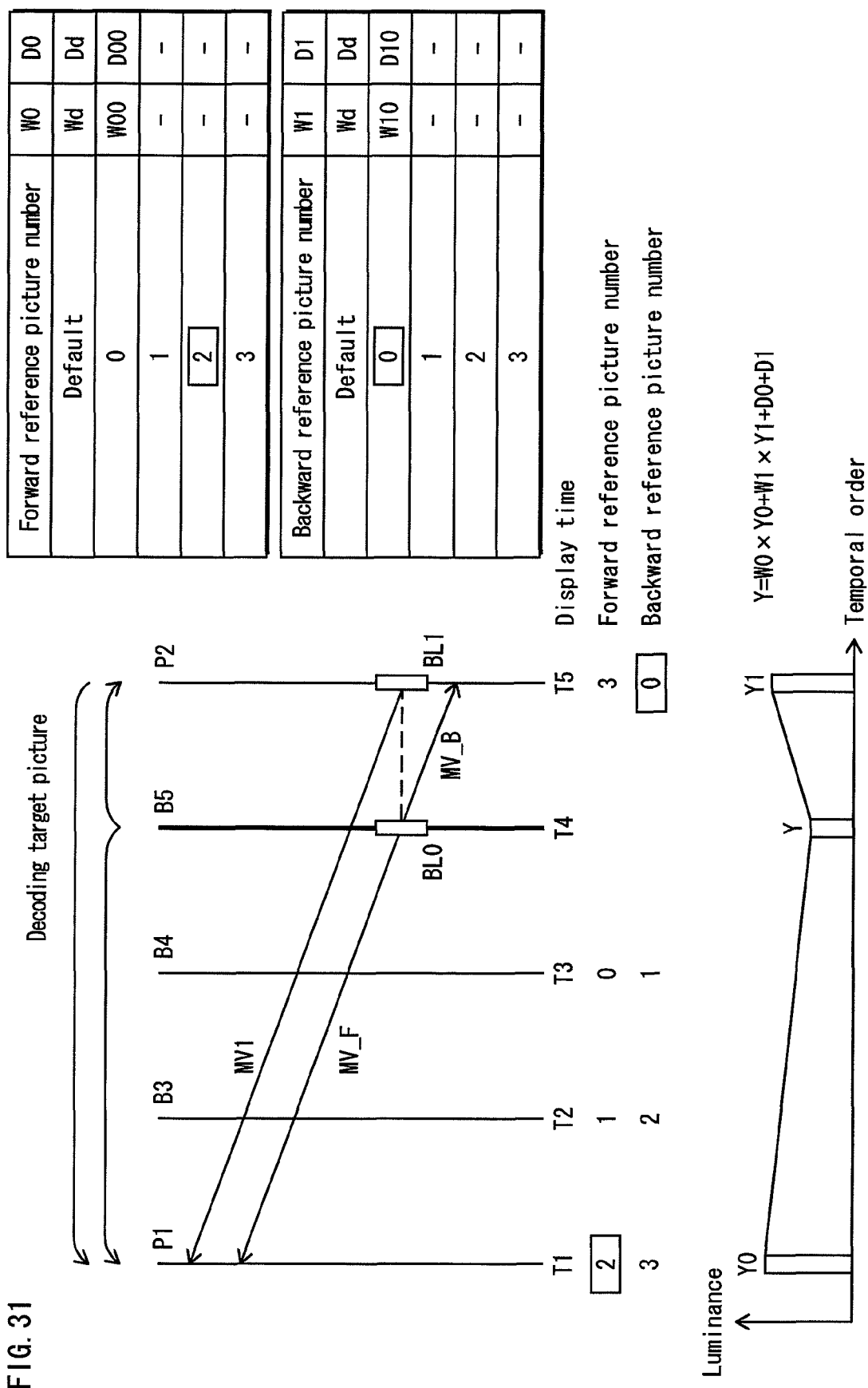
FIG. 31 shows an example of decoding by the explicit weighted prediction in the temporal direct mode.

FIG. 31 illustrates the explicit weighted prediction.

Suppose here that the decoding target picture is picture B5, and that in the temporal direct mode, pictures P1 and P2 are determined as the reference pictures, where picture P1 has forward reference picture number "2", and picture P2 has backward reference picture number "0".

In the explicit weighted prediction, weight coefficients are embedded into the stream, in correspondence with each reference picture number. In this process, default weight coefficients are embedded as well. Accordingly, one of the default weight coefficients is assigned to a reference picture number that was not specified.

For example, in the case shown in FIG. 31, default weight coefficients Wd and Dd are assigned to weight coefficients W0 and D0 for forward reference in accordance with the H.264 standard since the forward reference picture number is "2" and no weight coefficient has been assigned to the stream.

Also, in the case shown in FIG. 31, weight coefficients W10 and D10 specified by the stream are assigned to weight coefficients W1 and D1 for backward reference since the backward reference picture number is "0".

Here, pixel value (luminance) Y of the decoding target block is obtained by Equation 4 as follows, where "Y0" represents the luminance of the forward reference picture, and "Y1" represents the luminance of the backward reference picture.

$$Y = W0 \times Y0 + W1 \times Y1 + D0 + D1 \qquad \text{Equation 4}$$

<10-2. Implicit Weighted Prediction>

FIG. 32 illustrates the implicit weighted prediction.

Suppose here that the decoding target picture is picture B5, and that in the temporal direct mode, pictures P1 and P2 are determined as the reference pictures, where picture P1 has forward reference picture number "2", and picture P2 has backward reference picture number "0".

In the implicit weighted mode, a weight coefficient is determined by performing the scaling process for display time with the reference picture.

Here, pixel value (luminance) Y of the decoding target block is obtained by Equation 5 as follows, where "T4" represents the display time of picture B5, "T1" represents the display time of picture P1, and "T2" represents the display time of picture P2.

$$Y = W0 \times Y0 + W1 \times Y0 + D0 + D1, \qquad \text{Equation 5}$$

where $$W0 = 1 - W1$$

$$W1 = (T4 - T1)/(T5 - T4)$$

$$D0 = 0$$

$$D0 = 1$$

As understood from the above explanation, the weighted prediction defined in the H.264 standard depends on the reference picture numbers.

<10-3. Operation>

Figure 33:
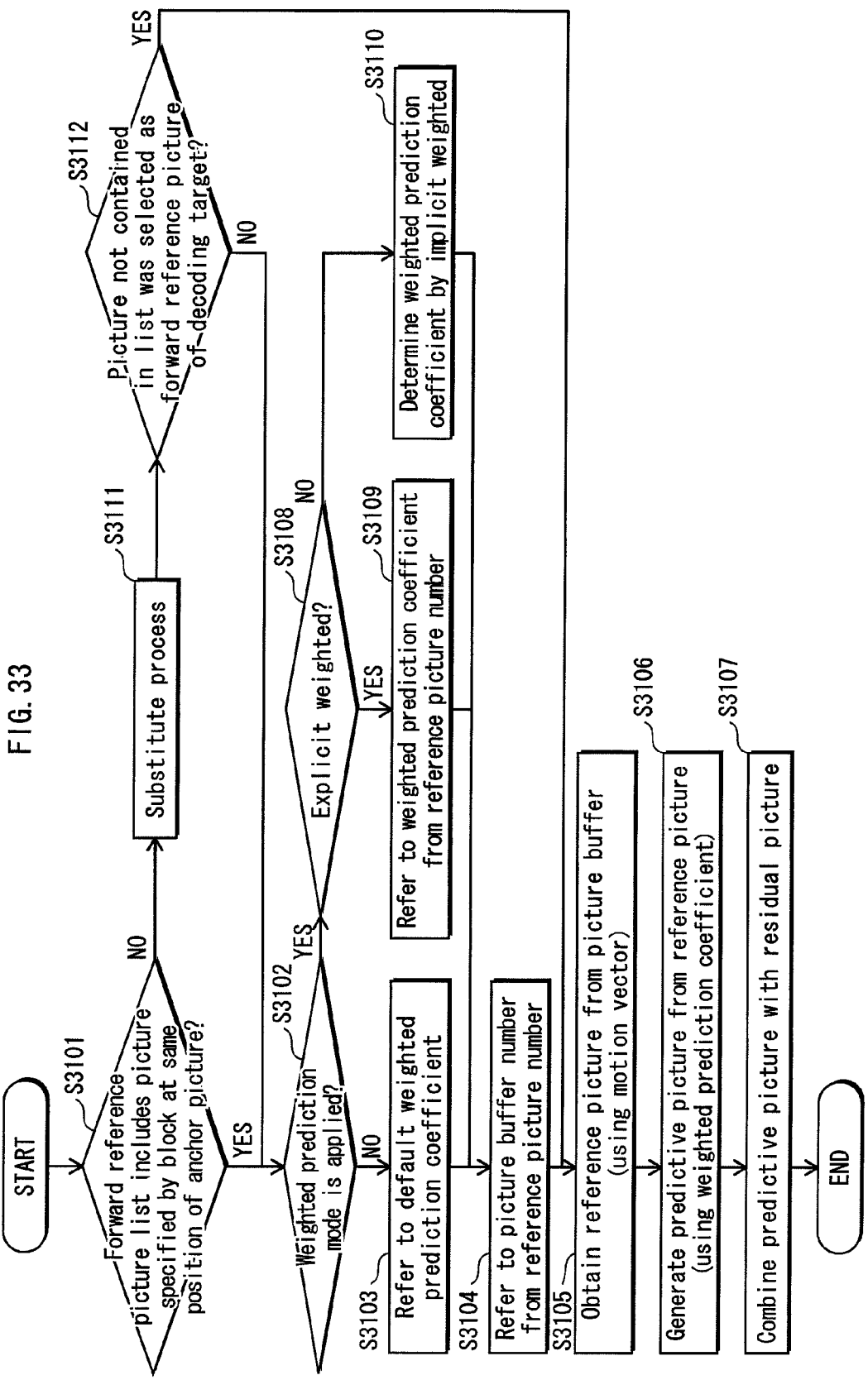
FIG. 33 shows an example of the procedure of decoding by the weighted prediction performed by the moving picture decoding device 100 in Embodiment 12 of the present invention.

FIG. 33 shows process flow of the motion compensation using the weighted prediction, where decoding is performed without assigning a reference picture.

When it is judged that the reference picture determined in the substitute process is not included in the forward reference picture list (YES in step S3112), it is impossible to perform the process for determining a coefficient necessary for the weighted prediction (steps S3102, S3108, S3103, S3109, and S3110), for the reason stated above.

When this happens, the motion compensation is performed without using a weighted prediction coefficient, and thus, in step S3106, the motion compensation is performed using a mean value of the forward reference and the backward reference.

<Embodiment 13>

Embodiment 13 differs from Embodiment 12 in the substitute process in which the weighted prediction is used.

FIG. 34 illustrates an influence generated when the weighted prediction fails to be applied in the substitute process.

Each block has a possibility that a reference picture is changed. Accordingly, there may be a case where, among blocks A and B adjacent to each other, block A can be decoded in a regular process, but block B cannot, and should be decoded in the substitute process.

Suppose here that the weighted prediction can be applied to block A, and as shown in part (A) of FIG. 34, the luminance thereof is "YA", and that the weighted prediction cannot be applied to block B, and as shown in part (B) of FIG. 34, the luminance thereof is "YB", although the luminance should actually be "YB'".

Since block A and block B are adjacent, it is expected that YA and YB are close to each other. However, in the moving picture decoding device 100 of the present embodiment, there is a possibility that the luminance difference becomes YB-YA (≈YB-YB') and a prominent picture degradation occurs to only the block (block B) that was subjected to the substitute process.

<1. Operation 1>

Figure 35:
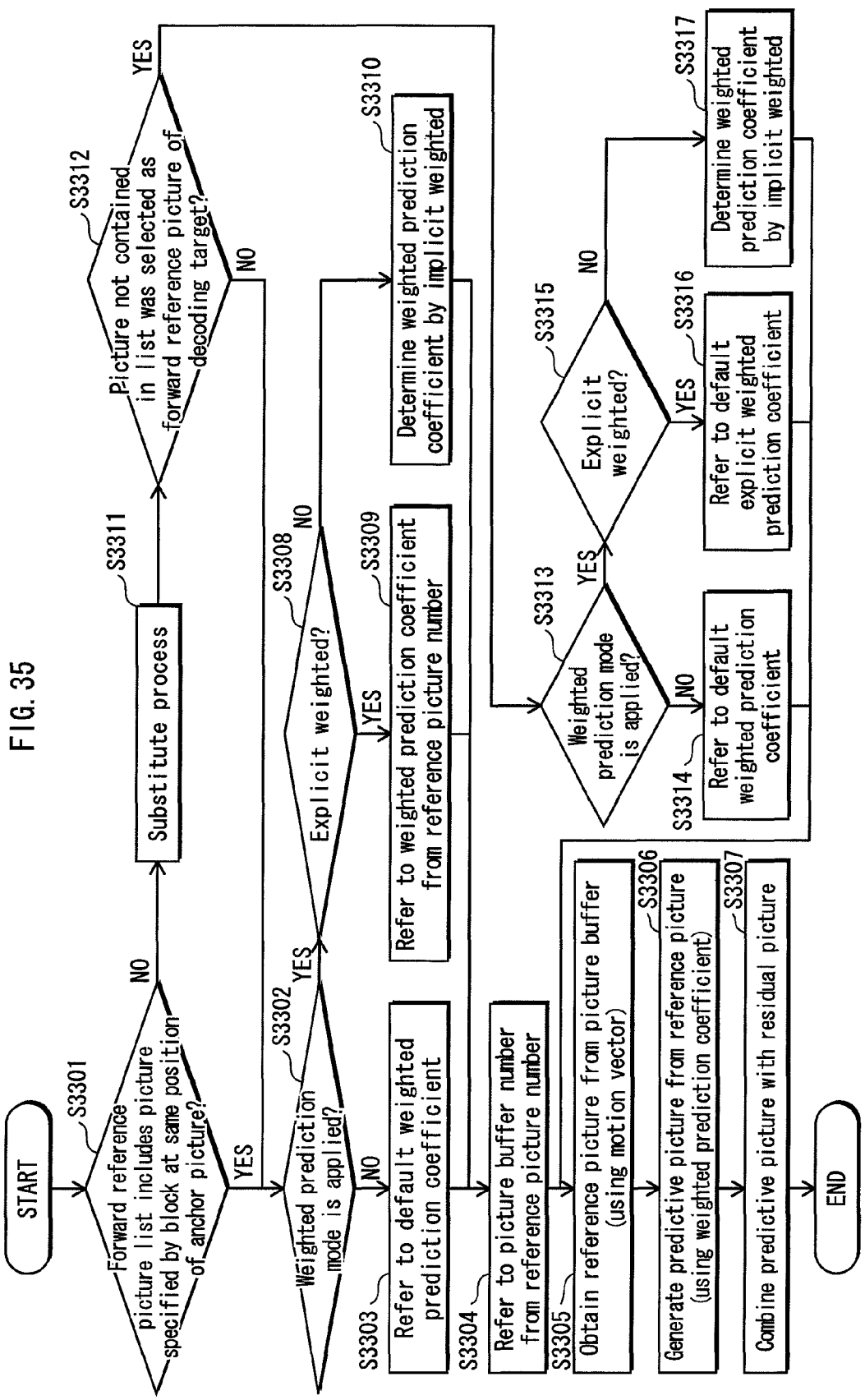
FIG. 35 shows an example of the procedure of decoding by the weighted prediction performed by the moving picture decoding device 100 in Embodiment 13 of the present invention.

FIG. 35 shows one example of the operation of the moving picture decoding device 100 in which the above-described problem is taken into consideration.

A difference from Embodiment 12 is that the weighted prediction is applied even when the reference picture assigned by the substitute process is not included in the forward reference picture list. It should be noted here that, as described above, the explicit weighted prediction presumes that the reference picture number is assigned, thus it is impossible to perform it in the substitute process in the same manner as in the regular process.

In view of this, in Embodiment 13, the process is continued by applying the default values (Wd, Dd) of the explicit weighted prediction coefficients that are included in the stream, to the reference picture assigned by the substitute process.

The implicit weighted prediction can be processed in the same manner as the regular process since it does not depend on the reference picture number. Therefore, with this structure, the motion compensation using the weighted prediction can be performed even in the substitute process.

<2. Operation 2>

Figure 36:
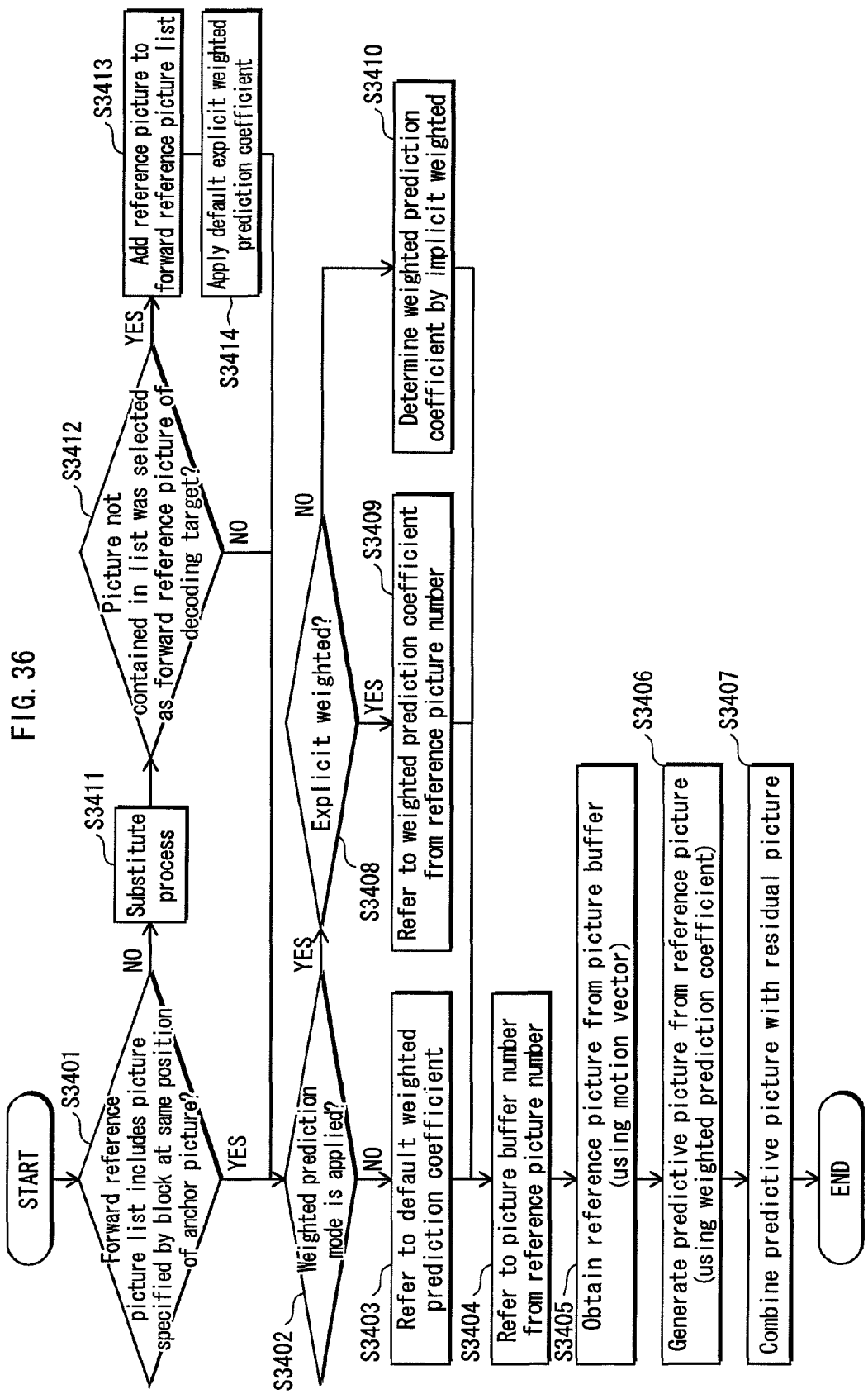
FIG. 36 shows an example of the procedure of decoding by the weighted prediction performed by the moving picture decoding device 100 in Embodiment 13 of the present invention.

FIG. 36 shows another example of the operation of the moving picture decoding device 100.

A difference from Embodiment 12 is that, when the reference picture assigned by the substitute process is added into the forward reference picture list, the process is continued after the default values (Wd, Dd) of the explicit weighted prediction coefficients are applied as the weighted prediction coefficients of the added forward reference picture number.

With this structure, the motion compensation using the weighted prediction can be performed even in the substitute process.

<3. Examples>

Figure 37:
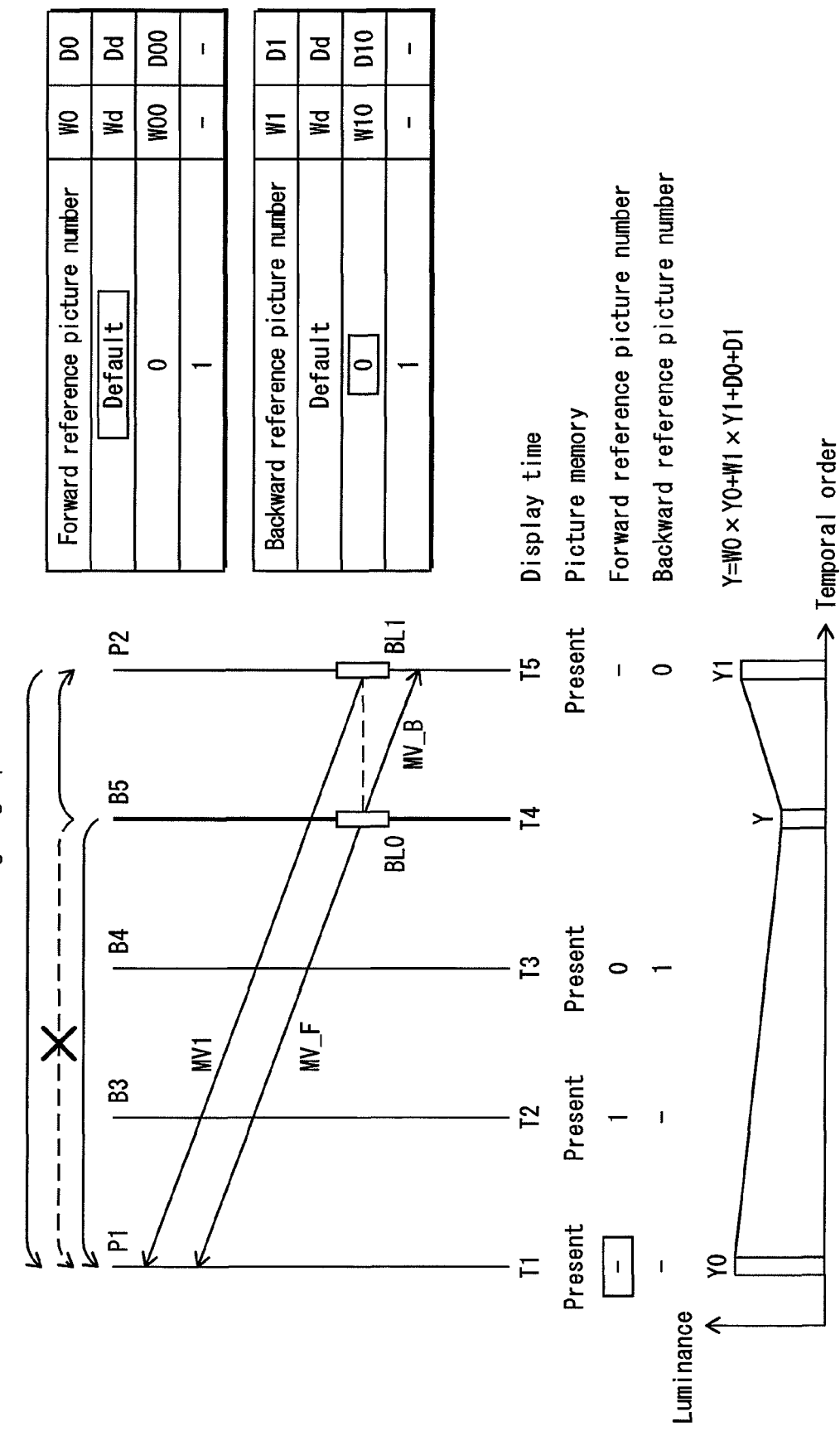
FIG. 37 shows an example of the explicit weighted prediction performed in the substitute process by the moving picture decoding device 100 in Embodiment 13 of the present invention.

Decoding procedures based on the above-described Operations 1 and 2 will be described with reference to an example shown in FIG. 37.

Suppose here that the decoding target picture is picture B5, the maximum number of pictures to be included in the forward reference picture list is "2", and the temporal direct mode and the explicit weighted prediction mode have been specified.

Also suppose here that, in the temporal direct mode and in the substitute process thereof, pictures P1 and P2 are determined as the reference pictures of picture B5, where picture P1 has forward reference picture number "2", and picture P2 has backward reference picture number "0".

There is a reference picture number for the backward reference picture. As a result, the weighted prediction coefficient table is referred to and coefficients W10 and D10 are assigned as weighted prediction coefficients.

There is not a reference picture number for the forward reference picture. As a result, the weighted prediction coefficient table is not referred to. However, there are default values (Wd, Dd) of the weighted prediction coefficients, and these default values are applied.

There is a difference in timing between the operation shown in FIG. 35 (determining the weighted prediction coefficients) and the operation shown in FIG. 36 (adding the reference picture number) However, weighted prediction coefficients applied by both operations should be the same.

<Embodiment 14>

Embodiment 14 describes an example case where the moving picture decoding device 100 is implemented in a mobile phone.

Figure 38:
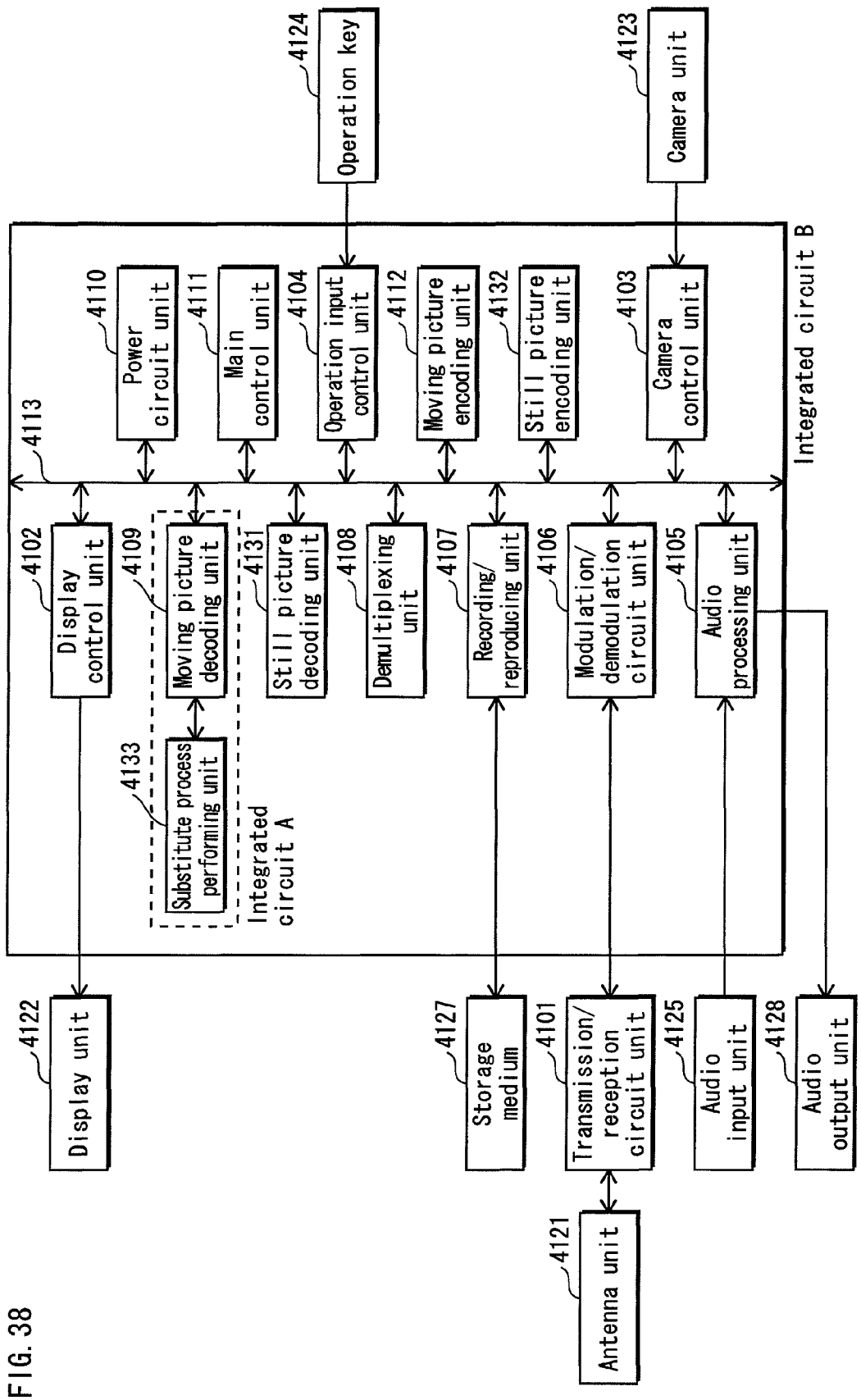
FIG. 38 shows the structure of the mobile phone in Embodiment 14 of the present invention.

FIG. 38 shows the structure of the mobile phone of Embodiment 14.

The mobile phone of Embodiment 14 includes a main control unit 4111 configured to control as a whole the components of the main body equipped with a display unit 4122 and operation keys 4124.

The main control unit 4111 is connected, via a synchronization bus 4113, to a power circuit unit 4110, an operation input control unit 4104, a moving picture encoding unit 4112, a still picture encoding unit 4132, a camera control unit 4103, a display control unit 4102, a moving picture decoding unit 4109, a still picture decoding unit 4131, a demultiplexing unit 4108, a recording/reproducing unit 4107, a modulation/demodulation circuit unit 4106, and an audio processing unit 4105.

The moving picture decoding unit 4109 has the same structure as the moving picture decoding device 100 which performs the operations described in Embodiments 1 through 13. The moving picture decoding unit 4109 generates generated moving picture data by decoding bit streams of picture data by a decoding method described in any of the embodiments, and supplies the generated picture to the display unit 4122 via the display control unit 4102.

Also, when necessity for the substitute process arises when a moving picture is decoded, the moving picture decoding unit 4109 notifies it to the substitute process performing unit 4133.

After the substitute process is performed, the substitute process performing unit 4133 notifies the moving picture decoding unit 4109 of it.

It should be noted here that the components of the main body may be realized as one or more integrated circuits.

For example, only the moving picture decoding unit 4109 and the substitute process performing unit 4133 may be realized as an integrated circuit (integrated circuit A). Further, the moving picture decoding unit 4109 and the substitute process performing unit 4133 and the other components may be realized as an integrated circuit (integrated circuit B). Any other structures are also possible.

With such a structure, when a mobile phone has received a bit stream in a form of, for example, digital broadcast waves, the mobile phone can continue the display without stopping decoding the moving picture being the broadcast program.

<Embodiment 15>

Embodiment 15 differs from Embodiment 14 in the method for performing the substitute process.

In Embodiment 14, the substitute process is applied only to the moving picture decoding unit 4109. However, in many devices such as mobile phones, the moving pictures having been decoded by the moving picture decoding unit 4109 are displayed on the display unit 4122. Accordingly, the substitute process may not necessarily be applied only to the moving picture decoding unit 4109 as far as the display unit 4122 can have the same effect.

For example, as the substitute process to be performed when decoding cannot be continued, a previously displayed picture may be kept to be output. This produces the same effect. This is achieved when the substitute process performing unit 4133 sends to the display control unit 4102 a notification that a display of a previously displayed picture is continued.

Figure 39:
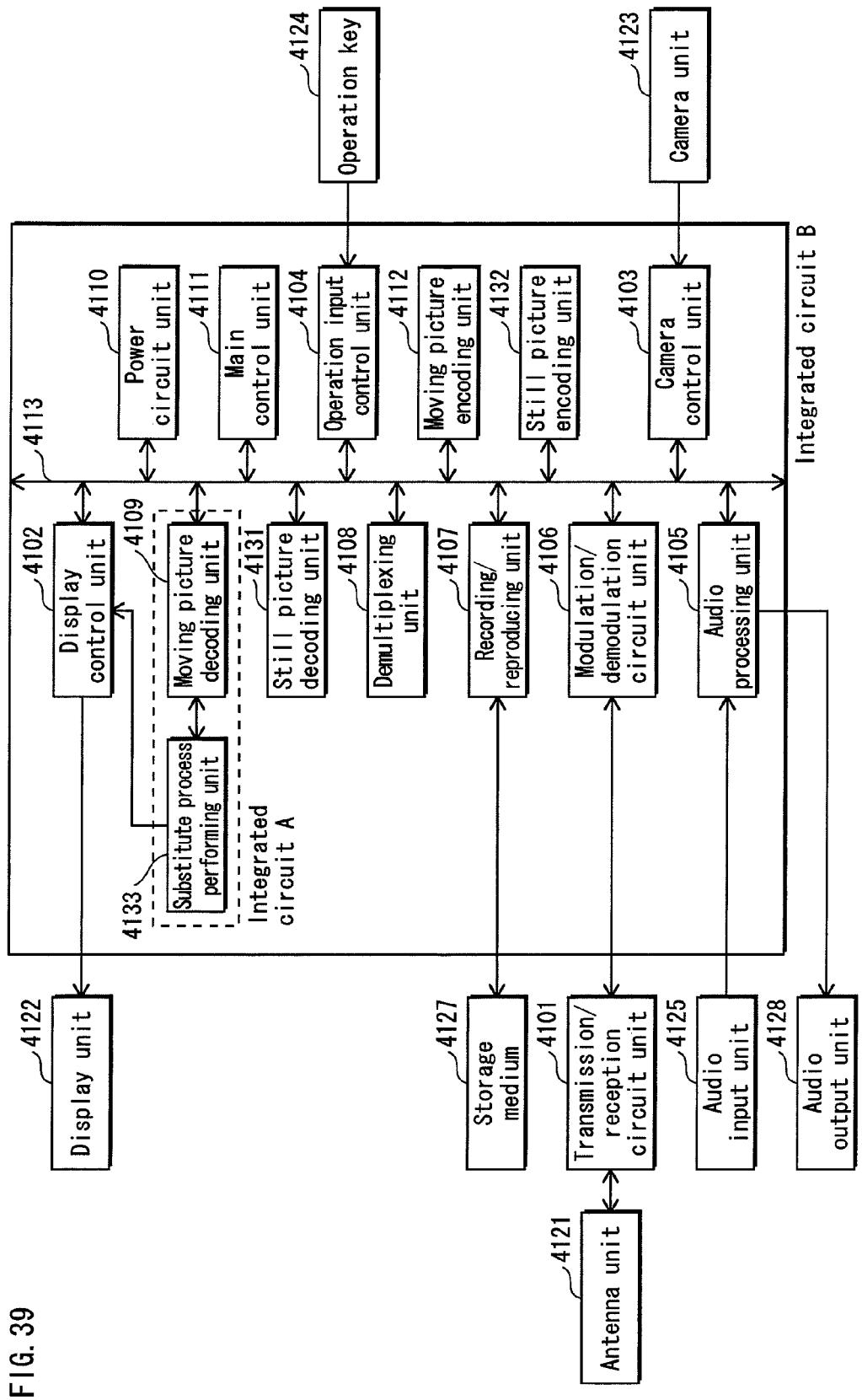
FIG. 39 shows the structure of the mobile phone in Embodiment 15 of the present invention.
Figure 40:
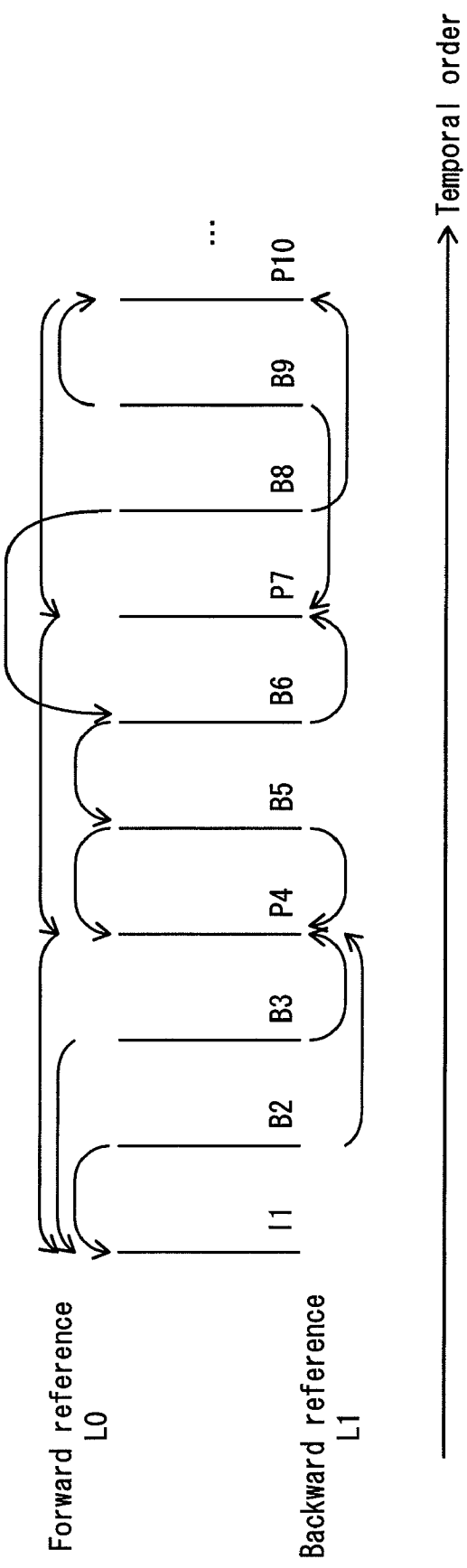
FIG. 40 illustrates relationships among reference pictures in compliance with the H.264 standard.
Figure 41:
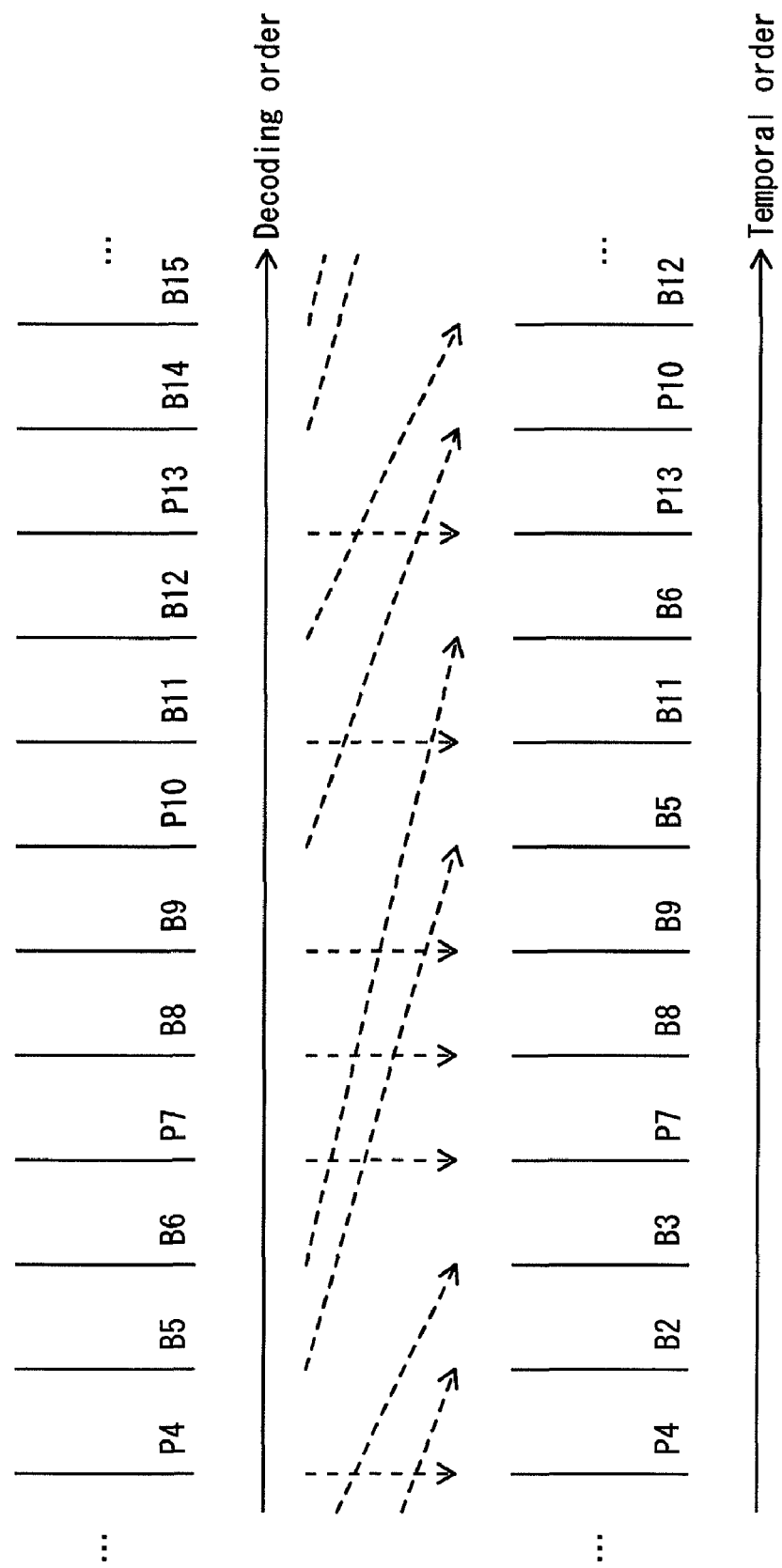
FIG. 41 illustrates the relationships between the decoding order and the display order in compliance with the H.264 standard.
Figure 42:
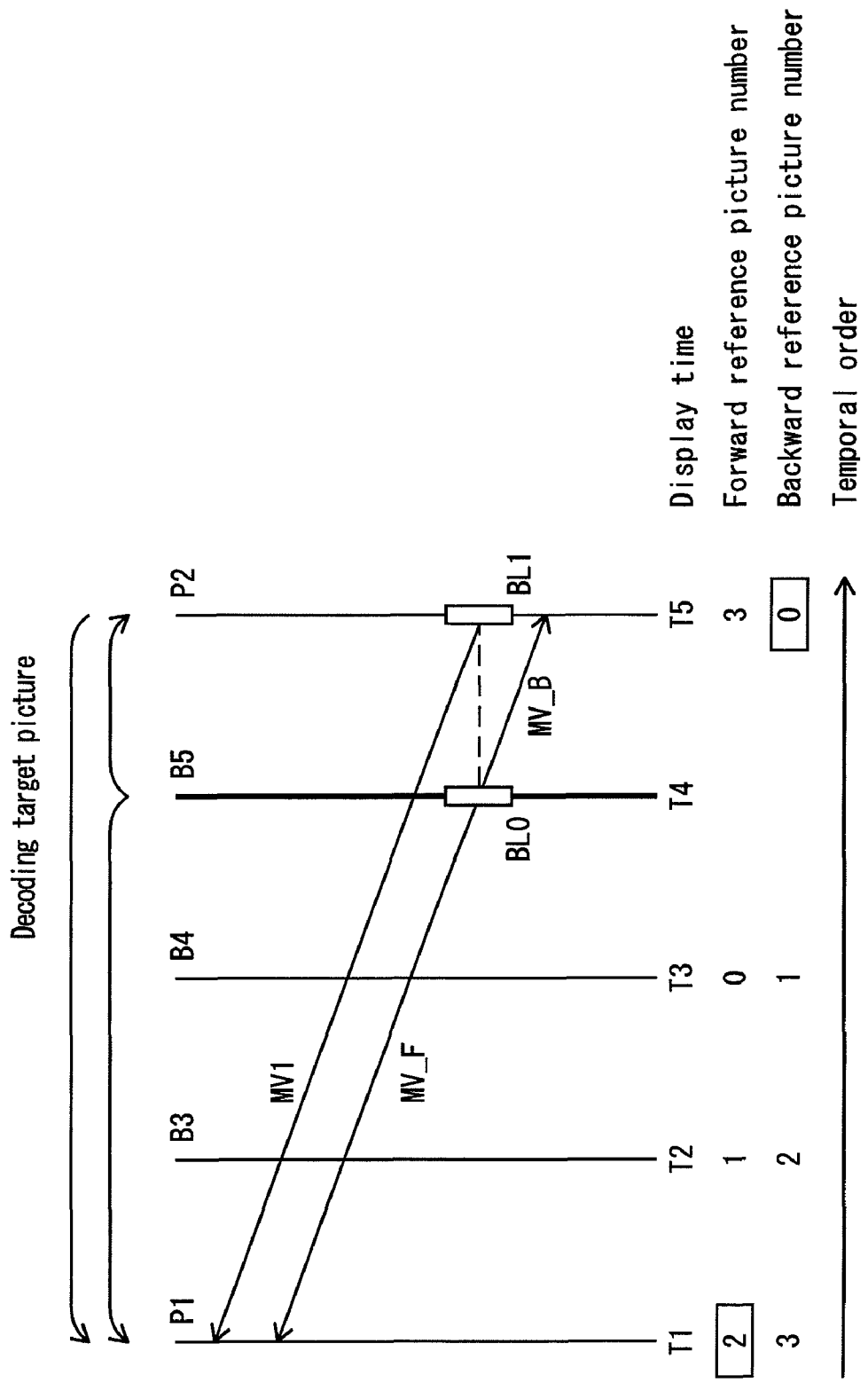
FIG. 42 shows an example of decoding in the temporal direct mode.

FIG. 39 shows the structure of the mobile phone of Embodiment 15.

A difference from Embodiment 14 is that a notification can be sent from the substitute process performing unit 4133 to the display control unit 4102.

It should be noted here that the components of the main body may be realized as one or more integrated circuits. For example, only the moving picture decoding unit 4109 and the substitute process performing unit 4133 may be realized as an integrated circuit (integrated circuit A). Further, the moving picture decoding unit 4109 and the substitute process performing unit 4133 and the other components may be realized as an integrated circuit (integrated circuit B). Any other structures are also possible.

With a structure composed of the integrated circuits A and B, a transfer of a notification from the substitute process performing unit 4133 to the display control unit 4102 is realized as a transfer between the integrated circuits.

More specifically, the integrated circuit A is provided with a terminal for use for notifying the necessity of the substitute process, and the display control unit 4102 changes the operation based on the notification received via the terminal.

It should be noted here that the substitute process in which a previously displayed picture may be kept to be output may be replaced with another substitute process as far as the same effect can be obtained.

The substitute process may be performed onto both the display control unit 4102 and the moving picture decoding unit 4109, as well as onto only the display control unit 4102.

<Modifications>

The substitute processes described in Embodiments 1 through 11 may be modified in various ways.

For example, the substitute process performing unit 110, in step S312, may perform a substitute process in which it copies picture data of a block in a decoded picture, which is immediately before the target in decoding order, that is placed at the same position as the decoding target block.

<Supplementary Notes>

(1) Each of the operations recited in Embodiments 1 through 15 may be realized by recording a program describing the process of the operation onto a recording medium such as a flexible disk, an optical disc, an IC card, or a ROM cassette, and causing the moving picture decoding device 100 to read the recording medium.

The program describing the process of the operation may be realized without being recorded on a recording medium. Namely, the program may be downloaded into the moving picture decoding device 100 from a network such as the Internet and be executed by the moving picture decoding device 100.

(2) In Embodiments 1 through 15, it is presumed that each picture is decoded as having the frame structure. However, each picture may be decoded as having the field structure. Also, when the frame structure and the field structure are combined adaptably with each other, they can be processed in the same manner.

(4) Embodiments 1 through 15 are described based on the H.264 standard. However, not limited to this, they can be applied to other moving picture encoding methods having similar restrictions.

(5) Embodiments 14 and 15 are described based on a mobile phone as one example. However, the present invention is not limited to this.

For example, the moving picture decoding device 100 can be applied to every device that deals with moving pictures, such as a DVD device, a set top box, a digital television, an automobile, or a security system.

Industrial Applicability

The moving picture decoding device of the present invention can broadly be applied to moving picture decoding devices that support a mode where the decoding target block is decoded using reference pictures of another decoded picture.

The invention claimed is:

1. A moving picture decoding device for decoding a plurality of pictures constituting a moving image, the moving picture decoding device comprising:
    a mode extracting unit which extracts, as an extracted encoding mode, an encoding mode for each target block of the plurality of pictures;
    a reference judgment unit which, when a target block of one picture of the plurality of pictures is decoded in the extracted encoding mode and the extracted encoding mode is a first encoding mode, judges whether or not a reference picture, for a decoded picture which is in a vicinity of the one picture of the plurality of pictures in terms of a display time, is usable, the first encoding mode requiring the target block of the one picture to be decoded using the reference picture and a reference motion vector for the decoded picture;
    a decoding unit which (i) decodes the target block of the one picture using the reference picture for the decoded picture and in the first encoding mode, when the reference judgment unit judges that the reference picture is usable, and (ii) decodes the target block of the one picture in a mode different from the first encoding mode requiring the target block of the one picture to be decoded using the reference picture, when the reference judgment unit judges that the reference picture is not usable; and
    a picture storage unit which stores a decoded picture each time a picture of the plurality of pictures is decoded by the decoding unit,
    wherein each picture of the plurality of pictures includes a reference picture list identifying one or more pictures of the plurality of pictures that can be referred to when decoding is performed in the first encoding mode, and
    wherein the reference judgment unit judges that the reference picture is usable when the reference picture is stored in the picture storage unit, regardless of whether or not the reference picture is identified by the reference picture list of the one picture of the plurality of pictures as a picture that can be referred to when the decoding is performed in the first encoding mode.

2. The moving picture decoding device of claim 1,
    wherein a reference attribute, when set in a respective picture of the plurality of pictures, indicates that the respective picture can be referred to as a reference picture from another picture of the plurality of pictures, and
    wherein the reference judgment unit judges that the reference picture is usable, when the reference picture is stored in the picture storage unit, regardless of whether or not the reference attribute is set in the reference picture.

3. The moving picture decoding device of claim 1, wherein, when the reference judgment unit judges that the reference picture is not usable, the decoding unit decodes the target block of the one picture in the first encoding mode, using one or more pictures, of the plurality of pictures, stored in the picture storage unit that are different from the reference picture.

4. The moving picture decoding device of claim 3, wherein the decoding unit decodes the target block of the one picture using a picture, from among pictures stored in the picture storage unit, that is closest to the one picture of the plurality of pictures in a display time order.

5. The moving picture decoding device of claim 1, wherein, when the reference judgment unit judges that the reference picture is not usable, the decoding unit decodes the target block of the one picture in a second encoding mode requiring the target block of the one picture to be decoded using another decoded block which (i) is in a spatial vicinity of the target block of the one picture and (ii) is in the one picture of the plurality of pictures.

6. The moving picture decoding device of claim 1,
wherein, when decoding in the first encoding mode, the decoding unit decodes the target block of the one picture using the reference picture and a backward reference picture that is placed after the one picture of the plurality of pictures in terms of the display time, and
wherein, when the reference judgment unit judges that the reference picture is not usable, the decoding unit decodes the target block of the one picture using the backward reference picture without using the reference picture.

7. The moving picture decoding device of claim 1, wherein, when the reference judgment unit judges that the reference picture is usable, the decoding unit decodes the target block of the one picture using a weighted prediction defined according to an MPEG (Moving Picture Experts Group) standard.

8. The moving picture decoding device of claim 1, wherein, when the reference judgment unit judges that the reference picture is usable, the decoding unit decodes the target block of the one picture using an explicit weighted prediction defined according to an MPEG (Moving Picture Experts Group) standard, using a value specified for the explicit weighted prediction.

9. The moving picture decoding device of claim 1, wherein, when the reference judgment unit judges that the reference picture is not usable, the decoding unit decodes the target block of the one picture by performing a motion compensation using the reference motion vector and one or more pictures, of the plurality of pictures, stored in the picture storage unit.

10. The moving picture decoding device of claim 1, wherein, when the reference judgment unit judges that the reference picture is not usable, the decoding unit decodes the target block of the one picture by performing a motion compensation using one or more pictures, of the plurality of pictures, stored in the picture storage unit without using a motion vector.

11. The moving picture decoding device of claim 1, wherein, when the reference judgment unit judges that the reference picture is not usable, the decoding unit decodes the target block of the one picture by performing a motion compensation using one or more pictures, of the plurality of pictures, stored in the picture storage unit and using one or more reference motion vectors owned by the one or more pictures of the plurality of pictures.

12. The moving picture decoding device of claim 1, wherein, when the reference judgment unit judges that the reference picture is not usable, the decoding unit decodes the target block of the one picture by calculating a motion vector of the target block of the one picture based on a relationship in the display time between the reference picture and one or more pictures, of the plurality of pictures, stored in the picture storage unit, and by performing a motion compensation using the calculated motion vector and the one or more pictures of the plurality of pictures.

13. The moving picture decoding device of claim 1, further comprising:
a display unit which displays the moving image output from the decoding unit as a result of decoding; and
a display control unit which controls the display of the moving image on the display unit,
wherein the display control unit controls the display of the moving image in different mangers depending on a judgment result of the reference judgment unit.

14. A moving picture decoding method for decoding a plurality of pictures constituting a moving image, the moving picture decoding method comprising:
storing a decoded picture each time a picture of the plurality of pictures is decoded;
extracting, as an extracted encoding mode, an encoding mode for each target block of the plurality of pictures;
judging, when a target block of one picture of the plurality of pictures is decoded in the extracted encoding mode and the extracted encoding mode is a first encoding mode, whether or not a reference picture, for a decoded picture which is in a vicinity of the one picture of the plurality of pictures in terms of a display time, is usable, the first encoding mode requiring the target block of the one picture to be decoded using the reference picture and a reference motion vector for the decoded picture; and
decoding (i) the target block of the one picture using the reference picture for the decoded picture and in the first encoding mode, when the judging judges that the reference picture is usable, and (ii) the target block of the one picture in a mode different from the first encoding mode requiring the target block of the one picture to be decoded using the reference picture, when the judging judges that the reference picture is not usable,
wherein each picture of the plurality of pictures includes a reference picture list identifying one or more pictures of the plurality of pictures that can be referred to when decoding is performed in the first encoding mode, and
wherein the judging judges that the reference picture is usable when the reference picture is stored in the storing, regardless of whether or not the reference picture is identified by the reference picture list of the one picture of the plurality of pictures as a picture that can be referred to when the decoding is performed in the first encoding mode.

15. A non-transitory computer-readable recording medium having a program recorded thereon, the program for causing a moving picture decoding device to perform a moving picture decoding process, the moving picture decoding device decoding a plurality of pictures constituting a moving image, the moving picture decoding process causing a computer to execute a method comprising:
storing a decoded picture each time a picture of the plurality of pictures is decoded;
extracting, as an extracted encoding mode, an encoding mode for each target block of the plurality of pictures;
judging, when a target block of one picture of the plurality of pictures is decoded in the extracted encoding mode and the extracted encoding mode is a first encoding mode, whether or not a reference picture, for a decoded picture which is in a vicinity of the one picture of the plurality of pictures in terms of a display time, is usable, the first encoding mode requiring the target block of the one picture to be decoded using the reference picture and a reference motion vector for the decoded picture; and decoding (i) the target block of the one picture using the reference picture for the decoded picture and in the first encoding mode, when the judging judges that the reference picture is usable, and (ii) the target block of the one picture in a mode different from the first encoding mode requiring the target block of the one picture to be decoded using the reference picture, when the judging judges that the reference picture is not usable, wherein each picture of the plurality of pictures includes a reference picture list identifying one or more pictures of the plurality of pictures that can be referred to when decoding is performed in the first encoding mode, and wherein the judging judges that the reference picture is usable when the reference picture is stored in the storing, regardless of whether or not the reference picture is identified by the reference picture list of the one picture of the plurality of pictures as a picture that can be referred to when the decoding is performed in the first encoding mode.

16. An integrated circuit for use in a moving picture decoding device for decoding a plurality of pictures constituting a moving image, the integrated circuit comprising:

a mode extracting unit which extracts, as an extracted encoding mode, an encoding mode for each target block of the plurality of pictures;

a reference judgment unit which, when a target block of one picture of the plurality of pictures is decoded in the extracted encoding mode and the extracted encoding mode is a first encoding mode, judges whether or not a reference picture, for a decoded picture which is in a vicinity of the one picture of the plurality of pictures in terms of a display time, is usable, the first encoding mode requiring the target block of the one picture to be decoded using the reference picture and a reference motion vector for the decoded picture;

a decoding unit which (i) decodes the target block of the one picture using the reference picture for the decoded picture and in the first encoding mode, when the reference judgment unit judges that the reference picture is usable, and (ii) decodes the target block of the one picture in a mode different from the first encoding mode requiring the target block of the one picture to be decoded using the reference picture, when the reference judgment unit judges that the reference picture is not usable; and a picture storage unit which stores a decoded picture each time a picture of the plurality of pictures is decoded by the decoding unit, wherein each picture of the plurality of pictures includes a reference picture list identifying one or more pictures of the plurality of pictures that can be referred to when decoding is performed in the first encoding mode, and wherein the reference judgment unit judges that the reference picture is usable when the reference picture is stored in the picture storage unit, regardless of whether or not the reference picture is identified by the reference picture list of the one picture of the plurality of pictures as a picture that can be referred to when the decoding is performed in the first encoding mode.

* * * * *